(12) United States Patent
Karni

(10) Patent No.: US 11,440,660 B1
(45) Date of Patent: Sep. 13, 2022

(54) SYSTEMS AND METHODS FOR LOADING AND UNLOADING A CARGO AIRCRAFT UTILIZING A CURVED PATH

(71) Applicant: ZSM HOLDINGS LLC, Dover, DE (US)

(72) Inventor: Etan D. Karni, Boulder, CO (US)

(73) Assignee: ZSM HOLDINGS LLC, Dover, DE (US)

( * ) Notice: Subject to any disclaimer, the term of this patent is extended or adjusted under 35 U.S.C. 154(b) by 0 days.

(21) Appl. No.: 17/465,782

(22) Filed: Sep. 2, 2021

Related U.S. Application Data

(63) Continuation of application No. PCT/US2021/021794, filed on Mar. 10, 2021.

(51) Int. Cl.
B64D 9/00 (2006.01)

(52) U.S. Cl.
CPC .................................. B64D 9/003 (2013.01)

(58) Field of Classification Search
CPC combination set(s) only.
See application file for complete search history.

(56) References Cited

U.S. PATENT DOCUMENTS

| | | | |
|---|---|---|---|
| 2,134,260 A | 10/1938 | Nickerson | |
| 2,998,948 A | 9/1961 | Sisk | |
| 3,374,972 A | 3/1968 | Webb, Sr. | |
| 3,741,504 A * | 6/1973 | Alberti | B64D 9/003 414/536 |
| 4,256,012 A * | 3/1981 | Cowart | B64D 1/08 89/1.51 |
| 4,500,299 A * | 2/1985 | Kelley | A63H 27/00 446/6 |
| 6,808,142 B2 * | 10/2004 | Oki | B64C 1/20 244/137.1 |
| 6,848,650 B2 * | 2/2005 | Hoisignton | B64D 9/00 244/100 R |
| 7,507,061 B2 * | 3/2009 | Wells | B65D 88/129 410/46 |
| 8,121,786 B2 | 2/2012 | Morbey et al. | |

(Continued)

OTHER PUBLICATIONS

International Search Report and Written Opinion for Application No. PCT/US20/49787, dated Nov. 30, 2020 (20 pages).

(Continued)

*Primary Examiner* — Assres H Woldemaryam
(74) *Attorney, Agent, or Firm* — Barnes & Thornburg LLP

(57) ABSTRACT

Systems, methods, and vehicles for loading and unloading cargo into or out of a large transport vehicle, such as an aircraft, utilizing a curved path are described. The systems and methods include one or more support structures disposed, either permanently or removably, within a cargo bay of the transport vehicle to form a curved path extending into an aft portion of the cargo bay. During loading, the payload can move in the aft direction while concurrently rotating about a center point of an arc. In some embodiments, the cargo bay can include a kinked portion disposed between a proximal and aft portions of the cargo bay, with the curved path extending at least through the kinked portion and into the aft portion. Methods, systems, and components thereof for assembling a cargo, unloading cargo from a large transport vehicle, and disassembling a cargo are also provided.

30 Claims, 31 Drawing Sheets

(56) References Cited

U.S. PATENT DOCUMENTS

| | | | |
|---|---|---|---|
| 2004/0200930 A1 | 10/2004 | Bays-Muchmore et al. | |
| 2008/0219830 A1* | 9/2008 | Wells | B64D 9/00 |
| | | | 410/52 |
| 2009/0173824 A1 | 7/2009 | Perez-Sanchez | |
| 2010/0252682 A1 | 10/2010 | Pahl | |
| 2015/0183519 A1 | 7/2015 | Llamas Sandin | |
| 2016/0311512 A1* | 10/2016 | Sankrithi | B64C 1/061 |
| 2018/0029707 A1 | 2/2018 | Levron | |
| 2018/0273176 A1* | 9/2018 | Paunicka | B64C 39/024 |
| 2020/0207475 A1 | 7/2020 | Dobberfuhl et al. | |

OTHER PUBLICATIONS

International Search Report and Written Opinion for Application No. PCT/US2021/021792, dated May 20, 2021 (12 Pages).

International Search Report and Written Opinion for PCT/US2021/021794, dated May 27, 2021 (11 pages).

No Author Listed. "747-400/-400ER Freighters" StartupBeoing. May 2010.

No Author Listed. Antonov Airlines Brochure. Jul. 2019. [online] retrieved from <URL: https://www.antonov-airlines.com/wp-content/uploads/2019/07 /Antonov-Airlines- brochure.pdf>.

No Author Listed. C-130J Super Hercules Brochure, Lockheed Martin.

No Author Listed. DHC-4 A Caribou Brochure, The De Havilland Canada. Nov. 1962.

No Author Listed. Piasecki H-21 Helicopter, Wikipedia. Website. Accessed Oct. 29, 2021. url: <https://en.wikipedia.org/wiki/Piasecki_H-21>.

* cited by examiner

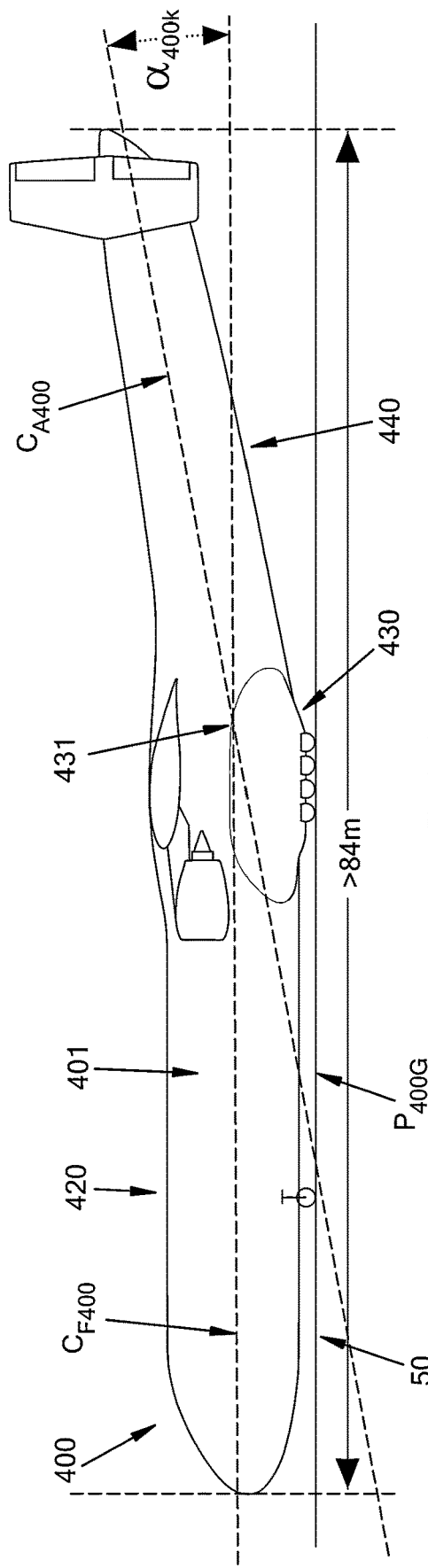
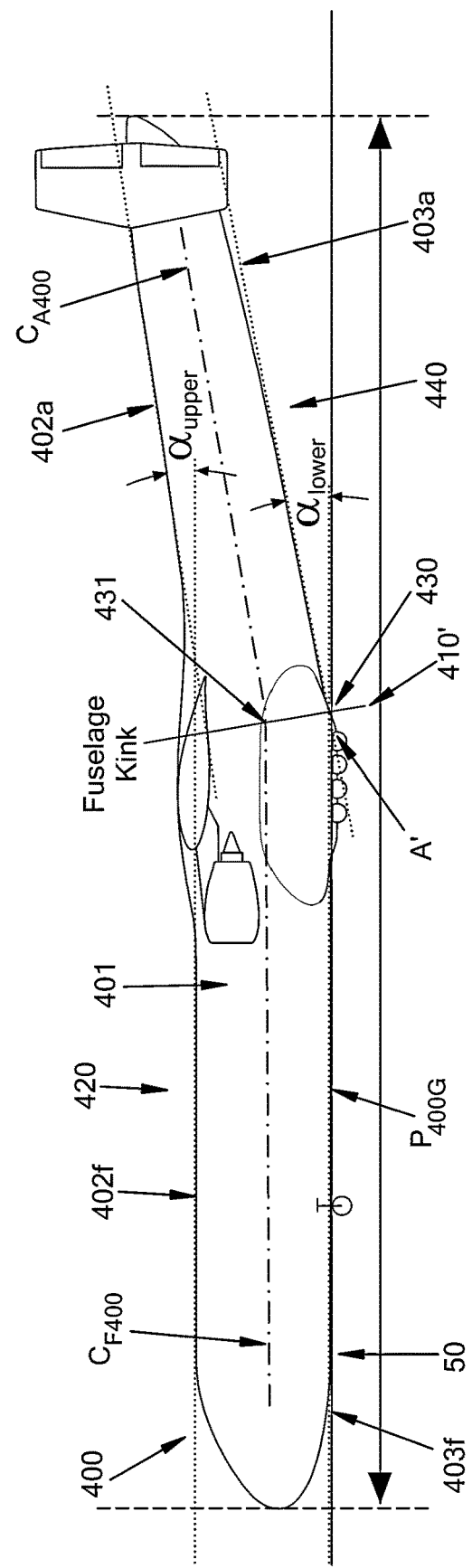
FIG. 2A
FIG. 2B

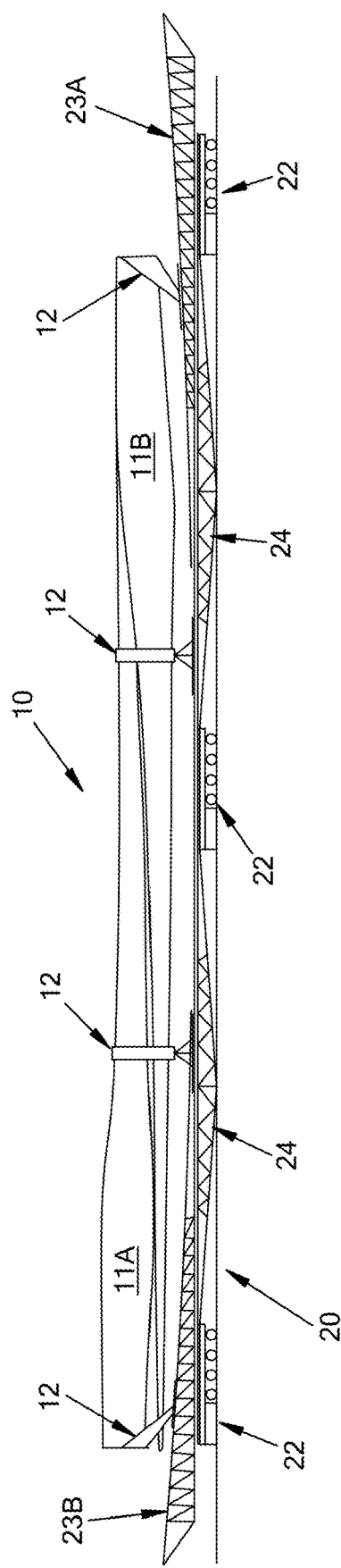
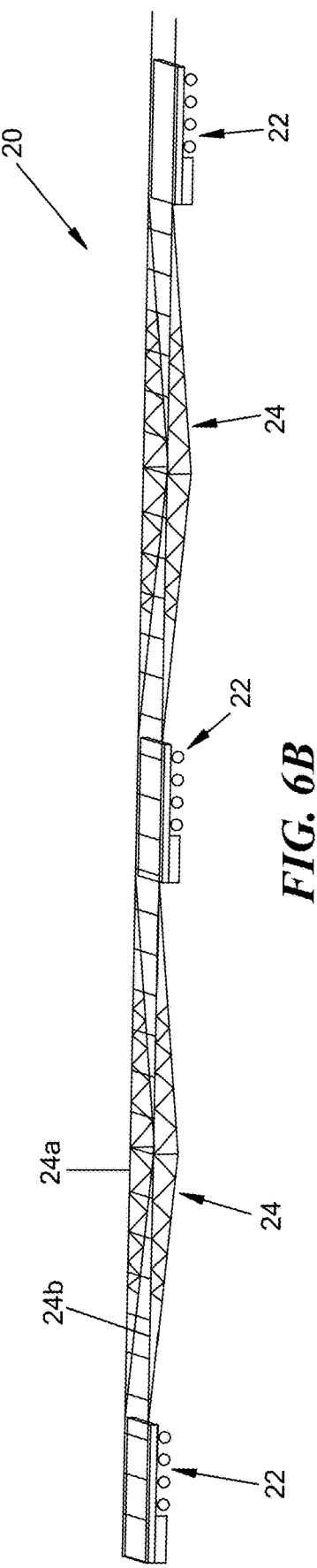
FIG. 6A
FIG. 6B

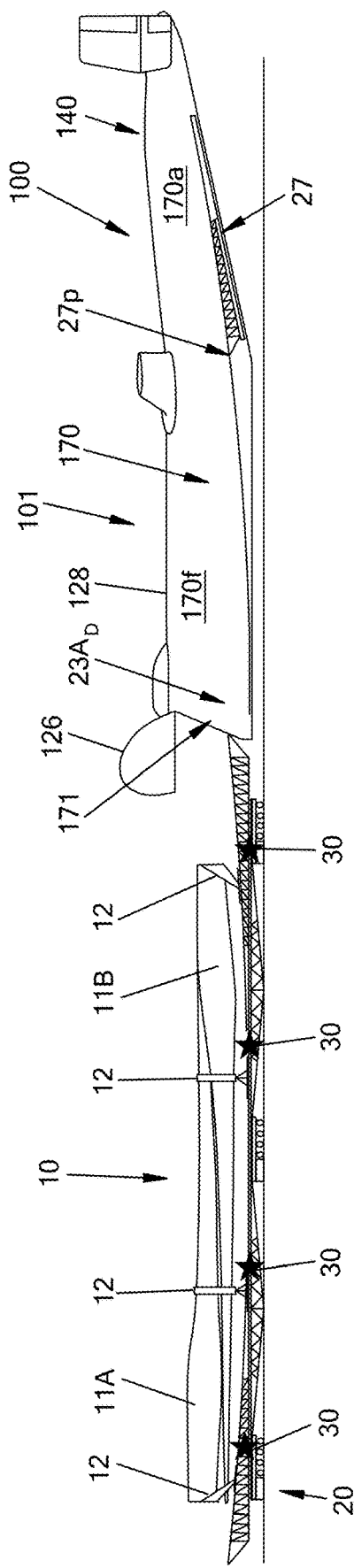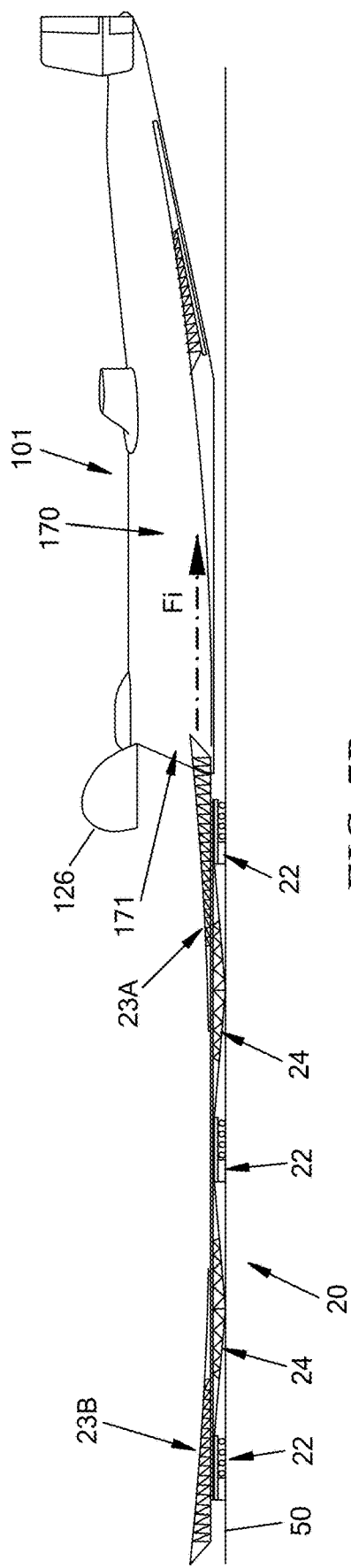
FIG. 7A
FIG. 7B

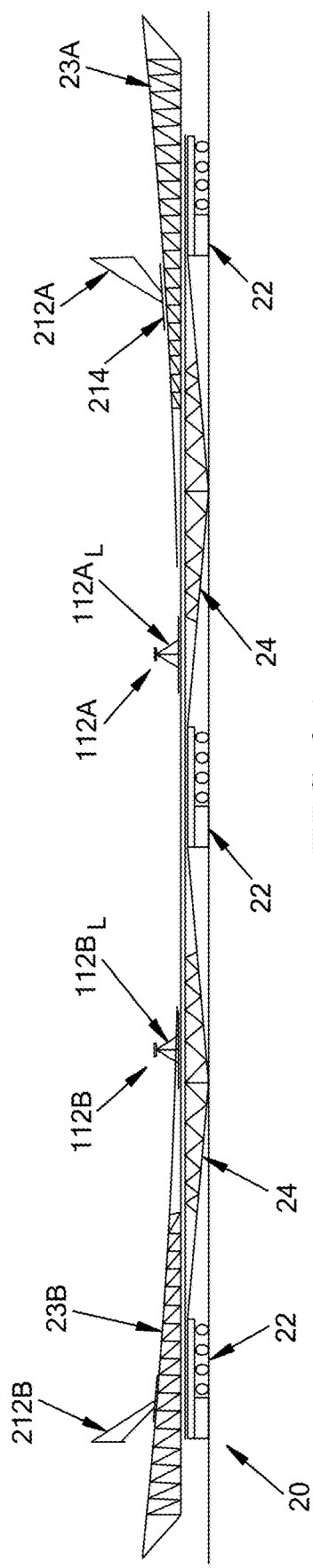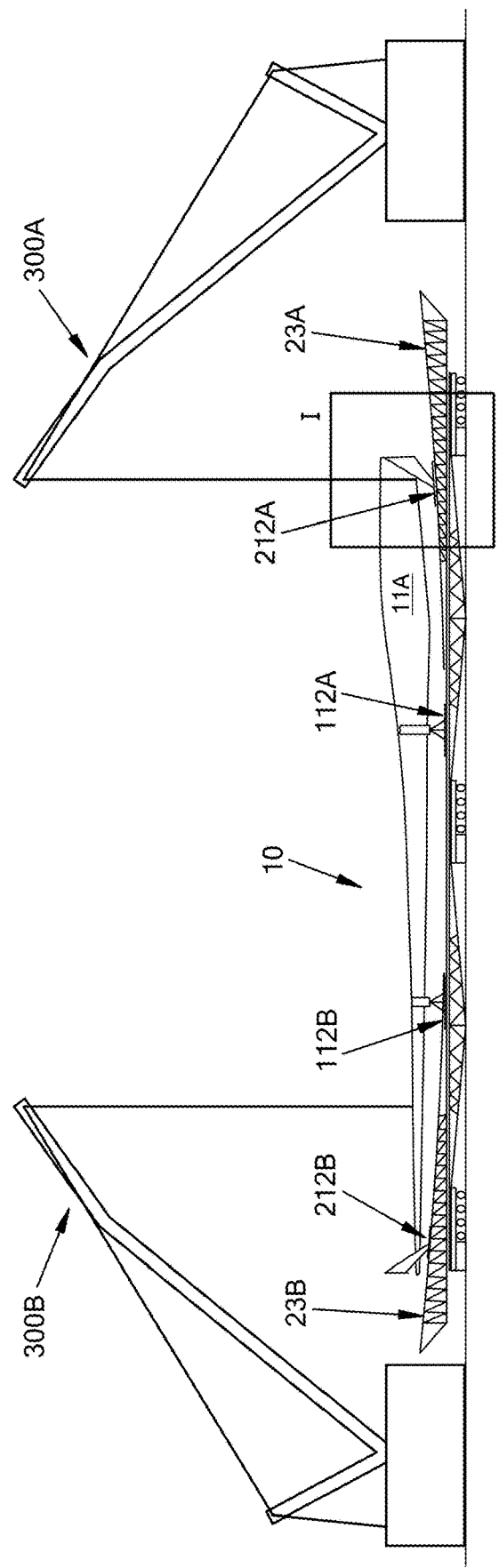
FIG. 9A
FIG. 9B

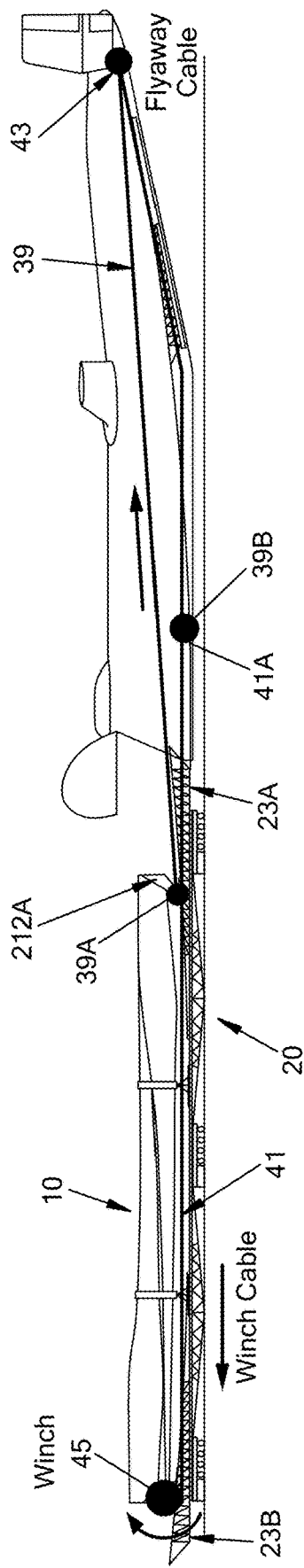
FIG. 10C1
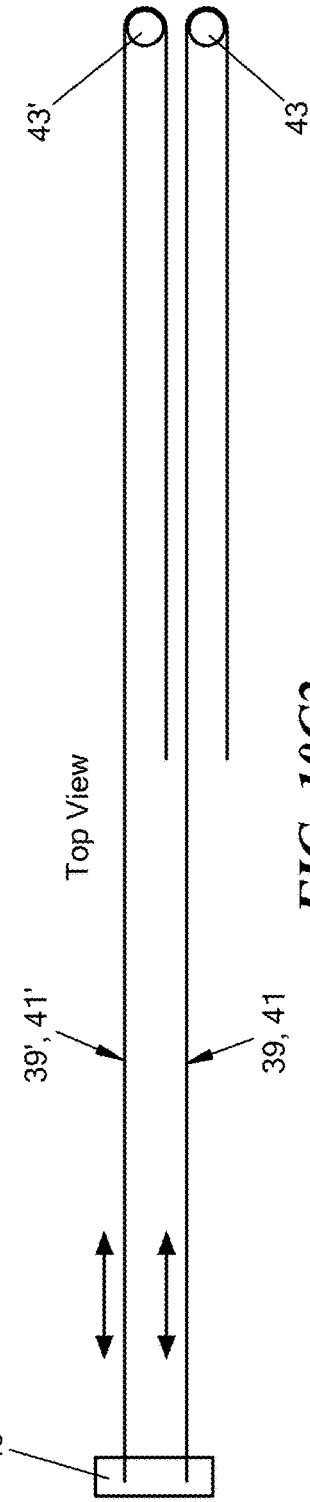
FIG. 10C2

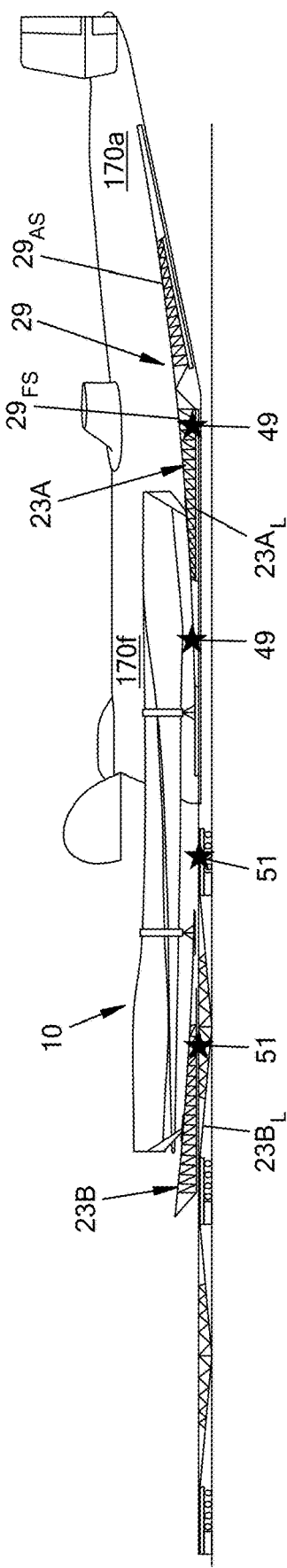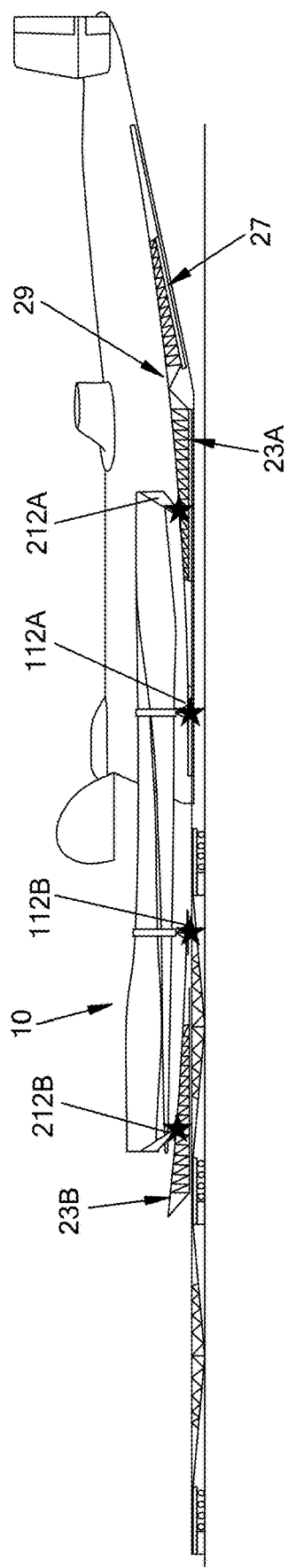
FIG. 10F
FIG. 10G under*US 11,440,660 B1*

SYSTEMS AND METHODS FOR LOADING AND UNLOADING A CARGO AIRCRAFT UTILIZING A CURVED PATH

CROSS-REFERENCE TO RELATED APPLICATIONS

This application is a U.S. national stage filing from International Application Number PCT/US2021/021794, filed Mar. 10, 2021, the contents of which is incorporated by reference herein in its entirety.

FIELD

The present disclosure relates to systems and methods for loading and unloading large cargo onto or off of a cargo aircraft, and more particularly provides for methods, systems, and related components thereof that can be used to easily stow or retrieve large cargo onto or off of the aircraft in a fast and efficient manner, including moving the large cargo along a curved path during loading or unloading, and placing the cargo in a location where it can be safely secured and transported by way of flying the aircraft. One non-limiting use discussed herein is transporting components of wind turbines, such as one or more wind turbine blades.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Another challenge presented by transporting large cargo, such as wind turbine blades, or other sizes and types of cargos as well, is the often unique tooling that is required to load and unload the cargo. Neither the aircraft itself, nor the tooling associated with any of packaging the large cargo, moving the large cargo onto the aircraft, and/or securing the large cargo within the plane provides a ready-made, consistent solution so that the large cargo, sometimes referred to as a large payload, can be easily placed on and taken off the plane in an "assembly line-like" manner. Instead, large cargo is typically weighed and measured each time it is placed on a cargo aircraft, making sure the right requirements are met in terms of placing a center of gravity of the payload at a safe location with respect to a center of gravity of the aircraft. This becomes a time-intensive and labor-intensive process that severely limits how quickly large cargo can be transported. This can make air transport of large cargo undesirable, with others opting to move the large cargo by rail or truck. Even to the extent there may be some tooling for individual types of large cargo, there is not currently any such tooling for transporting wind turbine blades and other components of a wind turbine.

Recent developments have been made related to a kinked fuselage in a cargo aircraft, e.g., for transporting large cargo. As a result of the unique nature of this configuration, new challenges arise when trying to load or unload large cargo into or out of the non-linear cargo bay. For example, a large payload, such as a wind turbine blade, rises vertically towards an upper surface or "roof" of the cargo bay as the payload moves aft through a kinked portion of the cargo bay. Such displacement of the cargo can create complications in providing adequate support to the payload in the final loaded position. One solution can be to utilize powered fixtures in which a height of the fixture can be adjusted to accommodate the shifting vertical position of the payload. Such actuators, however, can be large in size, thus requiring a larger fuselage cross-section, and have high force requirements. They also create another possible degree of failure as compared to a fixture that does not have to be adjusted when passing the large payload into the cargo bay.

Accordingly, there is a need for tooling systems, related components, and methods that can be implemented to allow for the consistent loading and unloading of cargo (also referred to herein as payload) onto or off of a large aircraft, including aircrafts that included kinked fuselages, forming an "assembly line-like" process whereby cargo can be continuously loaded and unloaded in an efficient manner.

SUMMARY

The present application is directed to systems and methods for loading or unloading large cargo in an efficient manner, e.g., by moving the cargo along a curved path during loading or unloading thereof. The system includes various tooling and fixtures that are specifically designed to enable easy loading of large cargo items into or out of a large cargo aircraft, including moving the large cargo in a forward or aft direction while concurrently rotating the large cargo about a center point of an arc such that the large cargo moves along a curved or arc path in a forward or aft direction within the aircraft. To this end, a curved path can extend through at least a portion of the cargo bay along which the large cargo can travel. For example, one or more support structures can be disposed in the cargo bay of the aircraft and can form a curved path along which the large cargo can travel. In this manner, an attitude of the cargo can beneficially change as the cargo moves in the forward-aft direction, in many instances without further external manipulation beyond movement of the cargo along the path, thereby eliminating the need for powered fixtures to support the cargo.

In one aspect, a method of loading or unloading a payload into or out of a cargo aircraft is performed in conjunction with a cargo aircraft that includes an interior cargo bay having a forward bay portion located in a forward end of the cargo aircraft, an aft bay portion located in an aft end of the cargo aircraft, and a kinked bay portion disposed between the forward bay portion and the aft bay portion. The kinked bay portion defines a location at which the aft end of the cargo aircraft begins to raise at an angle relative to a longitudinal-lateral plane of the cargo aircraft. When loading a payload into the interior cargo bay, the method includes advancing the payload towards and aft end of the cargo aircraft. When unloading a payload out of the interior cargo bay of the aircraft, the method includes advancing the payload towards the forward end of the cargo aircraft. Whether loading or unloading, advancing the payload includes moving the payload along a curved path formed by at least one support structure disposed in the interior cargo bay of the cargo aircraft. The at least one support structure extends a varying vertical distance above a corresponding portion of a bottom contact surface of the interior cargo bay over a length of the at least one support structure.

The systems and methods described herein can have a number of additional features and/or variations, all of which are within the scope of the present disclosure. For example, moving the payload along the curved path can further include moving the payload such that a portion of the payload that extends beyond the kinked portion of the cargo bay and into the aft portion of the cargo bay remains a fixed radial height above the curved path. Moving the payload along the curved path can include moving the payload such that the payload rotates about a center point of an arc while concurrently moving the forward or aft direction. In some embodiments, the curved path can be formed by at least one rail of the at least one support structure. The at least one rail can include a plurality of linear rail segments extending at an angle relative to one another to approximate a curve. In some embodiments, when loading the payload into the interior cargo bay of the cargo aircraft, advancing the payload towards the aft end of the cargo aircraft can include passing the payload through an opening formed by opening a nose cargo floor in the forward end of the cargo aircraft. When unloading the payload out of the interior cargo bay of the cargo aircraft, the method can include passing the payload to an environment outside the cargo aircraft through an opening formed by opening a nose cargo door located in the forward end of the cargo aircraft.

In some embodiments, the payload can include at least one payload-receiving fixtures, and moving the payload along the curved path can further include coupling the at least one payload-receiving fixture of the plurality of payload-receiving fixtures to the at least one support structure and advancing the at least one payload-receiving fixture along the curved path. The curved path can extend from the forward bay portion through the kinked bay portion and into the aft bay portion. In some embodiments, a terminal end of one of the at least one support structures can be disposed in the aft bay portion.

The at least one support structure can include a first support structure and a second support structure, with the curved path formed by the first support structure fixed in the aft bay portion to the bottom contact surface of the interior cargo bay and the second support structure fixed in the forward bay portion to the bottom contact surface of the interior cargo bay. In some embodiments, the at least one support structure can include a first support structure fixed in the aft bay portion to the bottom contact surface of the interior cargo bay and a second support structure. The curved path can be formed by at least one rail of the first support structure aligned with at least one rail of the second support structure. The method can further include, when loading the payload into the interior cargo bay of the cargo aircraft, moving the second support structure from a position external of the cargo aircraft into the forward bay portion of the cargo bay and securing the second support structure in the forward bay portion to the bottom contact surface of the interior cargo bay. When unloading the payload from the interior cargo bay, the method can further include unlocking the second support structure from the bottom contact surface of the interior cargo bay in the forward bay portion and moving the second support structure out of the forward may portion to a position external of the cargo aircraft. In some embodiments, moving the second support structure form the position external of the cargo aircraft into the forward bay portion of the cargo bay can further include translating the second support structure from the position external of the cargo aircraft along a linear path into the forward bay portion of the cargo bay.

Moving the payload along the curved path can include moving the payload through the kinked bay portion towards the aft end of the cargo aircraft such that a distal end of the payload raises relative to the longitudinal-lateral plane of the cargo aircraft. In some such embodiments, the method can include moving the payload along the curved path until the distal end of the payload is received within a portion of the aft bay portion located within a fuselage tailcone of the cargo aircraft. In some embodiments, moving the payload along the curved path can include moving the payload through the kinked bay portion towards the forward end of the cargo aircraft such that a distal end of the payload lowers relative to the longitudinal-lateral plane of the cargo aircraft.

In some embodiments the payload can have a length of at least about 65 meters, at least about 75 meters, at least about 85 meters, at least about 100 meters, or at least about 120 meters. The payload can include one or more components of a wind turbine such that the plurality of payload-receiving fixtures receives the one or more components of the wind turbine.

In another aspect, a method of loading a cargo aircraft includes translating a payload and a support structure to which the payload is removably coupled into an interior cargo bay of a cargo aircraft along a linear path, de-coupling the payload from the support structure, and moving the payload into an aft portion of the interior cargo bay along a curved path at least partially formed by the support structure such that, as the payload proceeds in the aft direction, an aft portion of the payload approaches a bottom contact surface of the aft portion of the interior cargo bay.

As noted above, the systems and methods described herein can have a number of additional features and/or variations, all of which are within the scope of the present disclosure. For example, the method can further include securing the support structure to a bottom contact surface of a forward portion of the interior cargo bay such that the support structure is stationary within the forward portion of the cargo bay. A first portion of the curved path can be formed by the support structure and a second portion of the curved path can be formed by a second support structure disposed in the aft portion of the cargo bay. Securing the support structure to the bottom contact surface of the forward portion of the interior cargo bay can include securing the support structure to at least one base rail coupled to the bottom contact surface of the forward portion of the interior cargo bay. In some embodiments, the payload can include a plurality of payload-receiving fixtures, and moving the payload into the aft portion of the cargo bay along the curved path can include advancing at least one payload-receiving fixture along one or more rails of at least one of the support structure or the second support structure.

The interior cargo bay can include a kinked bay portion disposed between the forward bay portion and the aft bay portion. The kinked bay portion can define a location at which the aft end of the cargo aircraft begins to raise relative to a longitudinal-lateral plane of the cargo aircraft. Moving the payload into the aft portion of the cargo bay can include moving the payload such that a portion of the payload that extends beyond the kinked portion of the cargo bay and into the aft portion of the cargo bay remains a fixed radial height above the curved path. In some embodiments the payload can have a length of at least about 65 meters, at least about 75 meters, at least about 85 meters, at least about 100 meters, or at least about 120 meters. The payload can include one or more components of a wind turbine such that the plurality of payload-receiving fixtures receives the one or more components of the wind turbine. Translating the payload and support structure into the interior cargo bay of the cargo aircraft can include passing the payload and support structure through an opening formed by opening a nose cargo door located in a forward end of the cargo aircraft.

In another aspect, a system for at least one of loading a payload onto a cargo aircraft or unloading a payload from a cargo aircraft includes at least one rail disposed in an interior cargo bay of a cargo aircraft. The interior cargo bay has a forward bay portion located in a forward end of the cargo aircraft, an aft bay portion located in an aft end of the cargo aircraft, and a kinked bay portion disposed between the forward bay portion and the aft bay portion. The kinked bay portion defines a location at which the aft end of the cargo aircraft beings to raise relative to a longitudinal-lateral plane of the cargo aircraft such that an aft-most terminal end of the aft bay portion is disposed above the longitudinal-lateral plane of the cargo aircraft. The at least one rail extends from the forward bay portion, through the kinked bay portion, and into the aft bay portion, with a vertical distance above which the at least one rail extends from a bottom contact surface of the interior cargo bay that varies along a length of the at least one rail.

As noted above, the systems and methods described herein can have a number of additional features and/or variations, all of which are within the scope of the present disclosure. For example, the vertical distance above which the at least one rail extends from the bottom contact surface of the interior cargo bay can decrease in the aft direction from the kinked bay portion to the aft bay portion. The system can further include a first support structure coupled to the bottom contact surface of the cargo bay in the forward bay portion and a second support structure coupled to the bottom contact surface of the cargo bay in the aft bay portion. The first support structure can include a first portion of the at least one rail and the second support structure can include a second portion of the at least one rail. The first support structure can be removably coupled to the bottom contact surface of the cargo plane. In some embodiments, the system can further include one or more transport vehicles that can move along a ground surface. The first support structure can removably couple to the one or more transport vehicles. The system can include a cargo nose door that is configured to open to a portion of the forward end of the cargo aircraft such that the forward bay portion is accessible from an outside environment when the cargo nose door is open.

The at least one rail of the system can include a plurality of linear rail segments that can extend at an angle relative to one another to approximate a curve. In some embodiments, the at least one rail can include at least two rails disposed approximately parallel to each other. A terminal end of the at least one rail can be disposed in the aft portion of the cargo bay. The aft portion of the cargo bay can extend at an angle relative to a forward portion of the cargo bay. The payload can move along the curved path formed by the at least one rail such that an aft end of the payload is held within the aft bay portion. The payload can move along the curved path formed by the at least one rail such that the aft end of the payload can approach the bottom contact surface in the aft bay portion In some embodiments, the payload can include a plurality of payload-receiving fixtures that can couple to the at least one rail such that the plurality of payload-receiving fixtures can translate along a length of the at least one rail. The payload can include one or more components of a wind turbine, and the payload-receiving fixtures can be configured to receive the one or more components of the wind turbine. In some embodiments the payload can have a length of at least about 65 meters, at least about 75 meters, at least about 85 meters, at least about 100 meters, or at least about 120 meters.

BRIEF DESCRIPTION OF DRAWINGS

This disclosure will be more fully understood from the following detailed description taken in conjunction with the accompanying drawings, in which:

FIG. 2A is a side view of an alternative embodiment of an aircraft;

FIG. 2B is a side transparent view of the aircraft of FIG. 2A;

FIG. 6A is a side view of one embodiment of a transportation vehicle having a ground support structure, a forward support structure, and a payload disposed thereon;

FIG. 6B is a perspective view of the transportation vehicle of FIG. 6A;

FIG. 7A is a schematic side view of the aircraft of FIG. 1A with an aft support structure disposed therein with a payload, forward support structure, and ground support structure disposed on the transport vehicle of FIG. 6A, the transport vehicle being proximal to the aircraft;

FIG. 7B is a schematic side view of the aircraft of FIG. 7A illustrating a snapshot of translating the forward support structure into the interior cargo bay, with the payload removed for clarity;

FIG. 9A is a schematic illustration of one step in one embodiment of assembling a payload package onto the transport vehicle of FIG. 6A for loading onto an aircraft;

FIG. 9B is a schematic illustration of two cranes lowering a turbine blade for assembly of a payload package onto the transport vehicle of FIG. 9A;

FIG. 10C1 is the side, partial cross-sectional view of the aircraft, the ground support structure, the forward support structure, and the payload of FIG. 10B illustrating a first snapshot of a schematic illustration of one embodiment of using a cargo-loading system in conjunction with a cargo loading process in accordance with the present disclosure;

FIG. 10C2 is a schematic top-down view of the cargo-loading system of FIG. 10C1 used in conjunction with the embodiment of the cargo loading process illustrated with respect to FIGS. 10A-10L;

FIG. 10F is the side, partial cross-sectional view of the aircraft of FIG. 10E showing the payload partially disposed within the interior cargo bay, locking the forward support structure into the forward bay of the interior cargo bay, and locking the ground support structure to the transport vehicle;

FIG. 10G is the side, partial cross-sectional view of the aircraft of FIG. 10F showing an action of unlocking the payload from the ground support structure and the forward support structure;

DETAILED DESCRIPTION

Figure 1A:
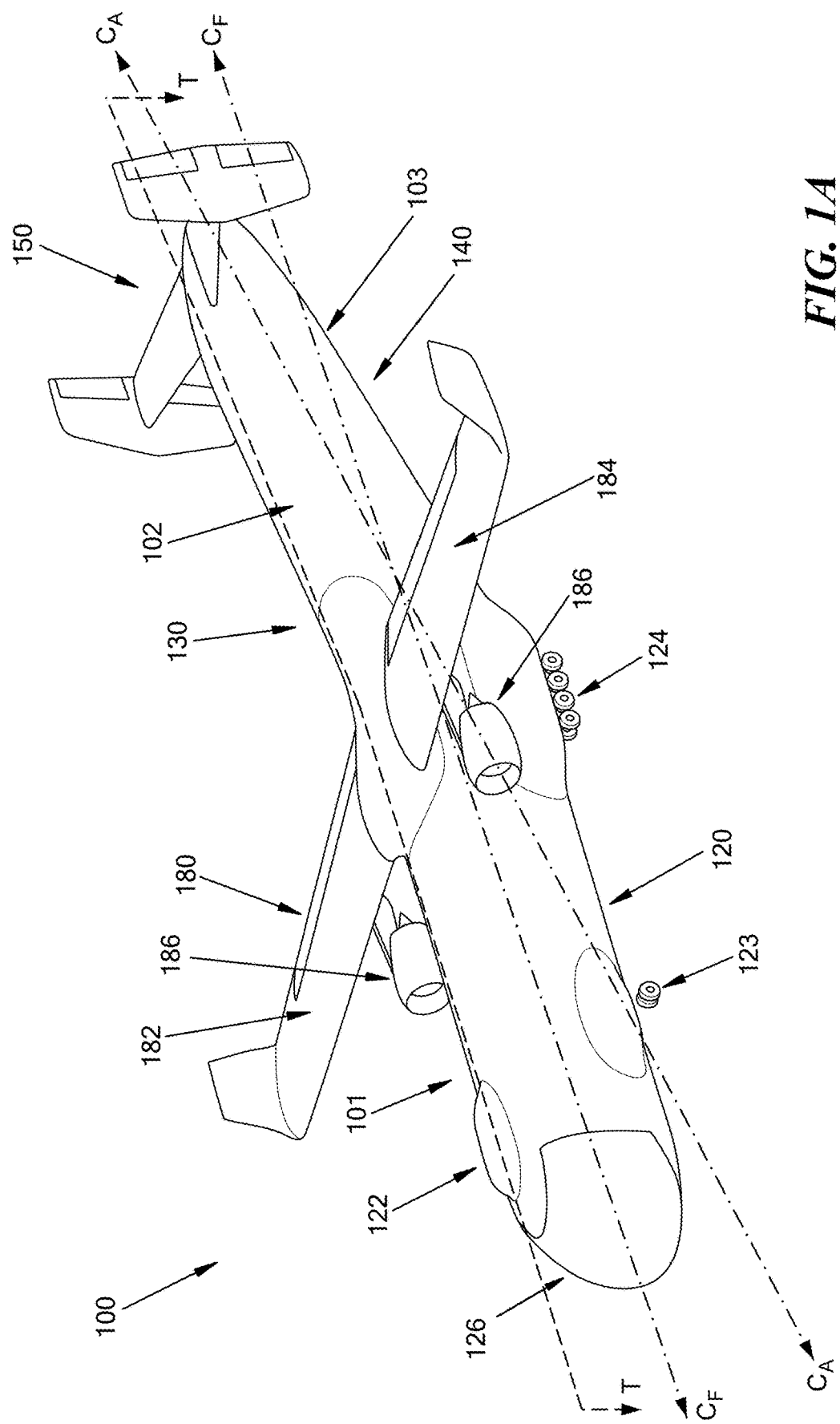
FIG. 1A is an isometric view of one embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into work systems, methods, aircraft, and components related to each of the same, as provided for herein. Certain markings found in the drawings are for illustrative purposes and do not constitute what an actual component looks like. For example, in some instances an "X" or a circle can indicate a point of disconnection, connection, locking, or unlocking, as will be understood in view of the accompanying disclosure.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present application is directed to systems and methods for loading and unloading an aircraft in a quick, efficient, safe, and damage-free manner. While the illustrations and descriptions herein are with particular reference to an aircraft, the principles of the present disclosure are not limited to aircrafts and can be applied to other methods of loading large payloads onto other modes of transportation (e.g., ships) and the like. Loading and/or unloading cargo in accordance with the present disclosure includes moving the cargo along a curved path as the cargo moves in a forward or aft direction within a cargo bay of the aircraft. Moving the cargo along the curved path can result in an attitude adjustment of the cargo, i.e., as a result of the cargo rotating about a center point of an arc from movement of the cargo in conjunction with a forward or aft movement along the curved path, with respect to the aircraft. In one interpretation, this movement along the curved path, i.e., rotation of the payload about an arc concurrently with forward or aft movement of the payload, can be referred to as translation along the curved path, in the sense that the payload can translate along one or more support structure that can form the curved path, as discussed in detail below. Before describing these methods and system components associated with the same, the configuration of the aircraft itself is discussed.

Aircraft

Figure 1B:
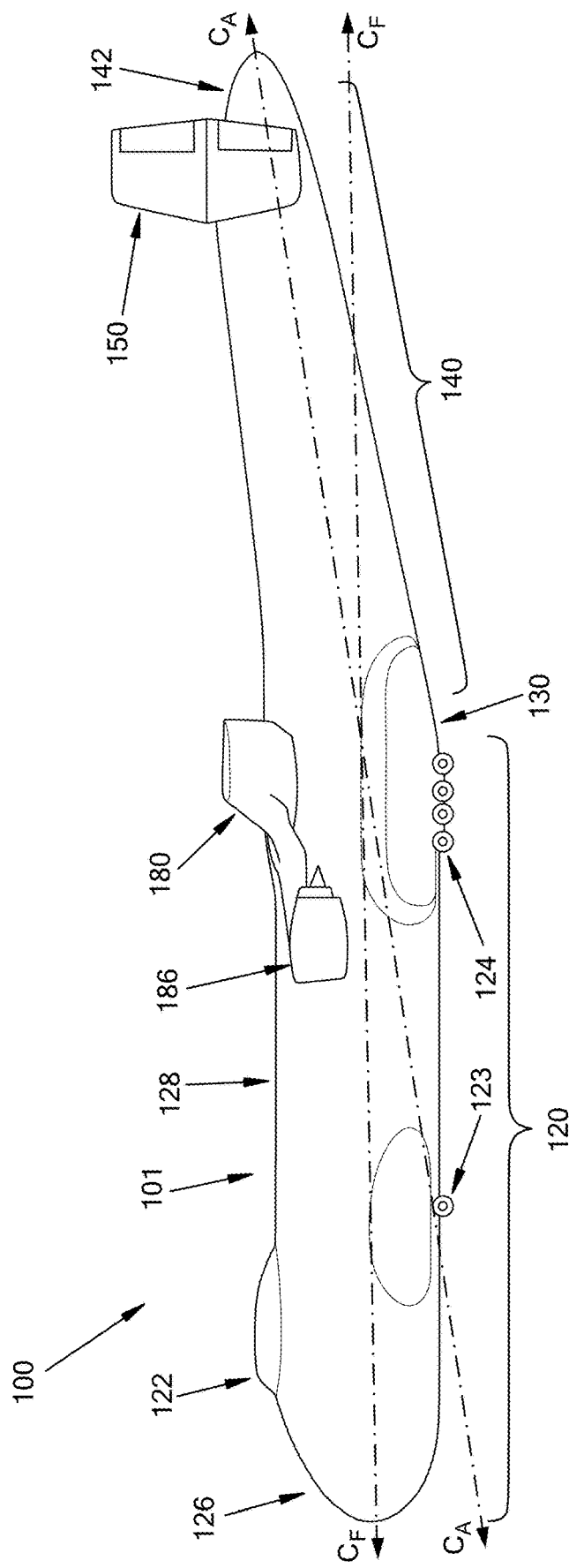
FIG. 1B is a side view of the aircraft of FIG. 1A.
Figure 1C:
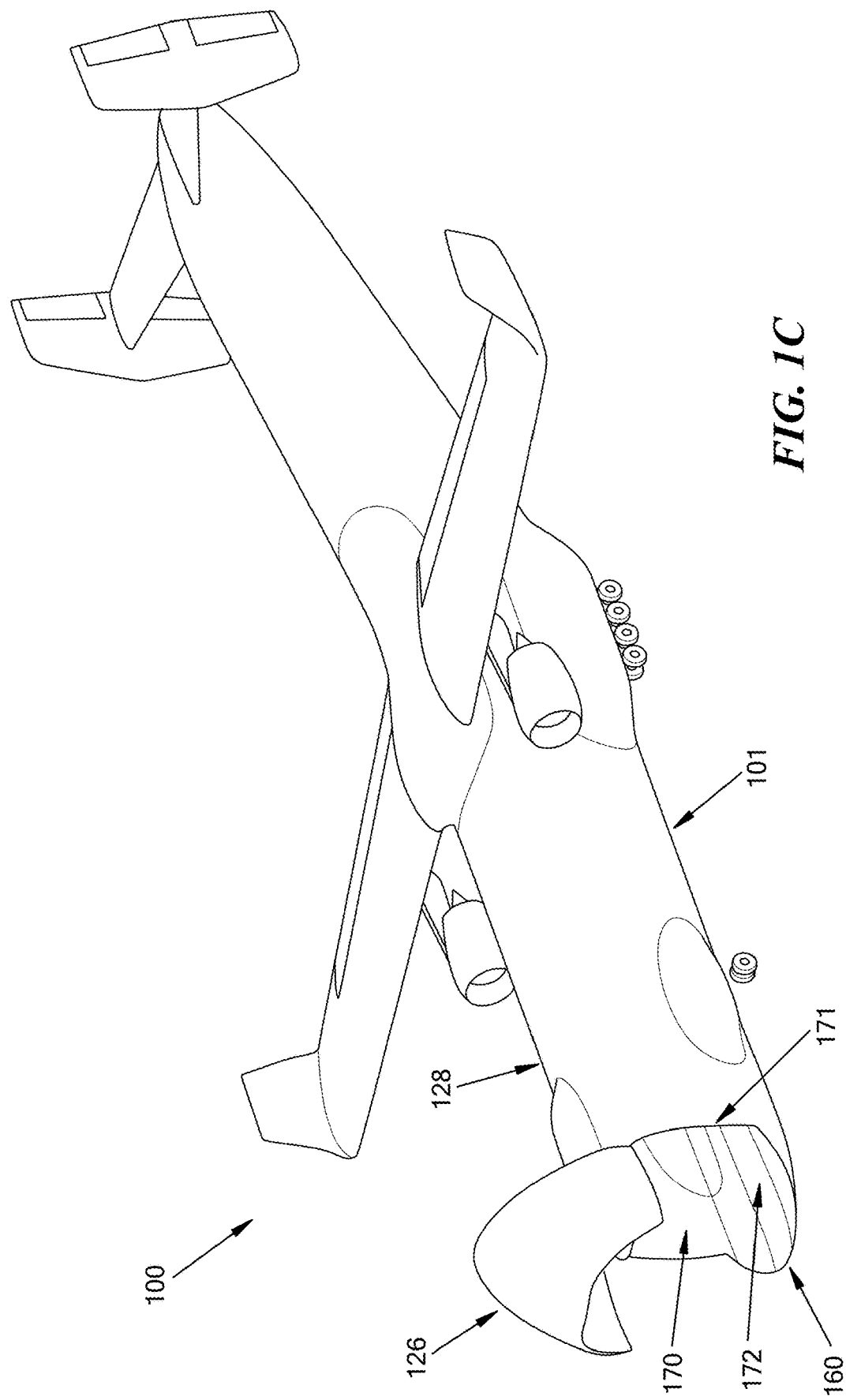
FIG. 1C is an isometric view of the aircraft of FIG. 1A with a nose cone door in an open position to provide access to an interior cargo bay of the aircraft.

The focus of the present disclosures is described with respect to a large aircraft 100, such as an airplane, illustrated in FIGS. 1A-1C, along with the loading of a large payload into the aircraft, illustrated at least in FIGS. 7A-7E and unloading of the same. Additional details about the aircraft and payload may be described with respect to the other figures of the present disclosure as well. In the illustrated embodiment, a payload 10 is a combination of two wind turbine blades 11A and 11B, although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 100 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 1C, the nose cone 126 is functional as a door, optionally being referred to as the nose cone door, thus allowing access to an interior cargo bay 170 defined by the fuselage 101 via a cargo opening 171 exposed by moving the nose cone door 126 into an open or loading position (the position illustrated in FIG. 1C; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 1C, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forward fuselage 101 is the portion that is not the nose cone 126, and thus the forward fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

With reference to FIG. 1C, a bottom contact surface 172 (also referred to herein as a floor) can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a. The bottom contact surface 172 can define a lower-most or bottom-most surface of the interior cargo bay 170. The bottom contact surface 172 can be formed by a permanent floor or structure of the cargo aircraft 100, one or more removable panels or pieces, or a combination thereof. In some embodiments, the floor 172 can be configured in a manner akin to most floors of cargo bays known in the art. In some other embodiments, one or more base rails can be disposed in the interior cargo bay 170 and can be used to assist in loading a payload, such as the payload 10, and/or support structures, such as the forward support structure 23A (illustrated, for example, in FIG. 5, and described in detail below) into the interior cargo bay 170. The base rail(s) can extend from the forward end 120, through the kinked portion 130, and into and up to almost an entirety of the aft end 140, and thus can have the same pitch relative to ground as the floor 172 itself. Additional structures, fixtures, and tooling designed to be used in conjunction with such base rails, e.g., that can roll or otherwise move along the base rails, for loading and/or unloading a payload along a curved path within the cargo bay 170, are discussed in detail.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other commonly-owned patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Kinked Fuselage

FIG. 2A is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle $\alpha_{400k}$ of the aft fuselage 440. The kink location 431 is contained in the kinked portion 430 disposed between and connecting the forward and aft ends 420, 440. FIG. 2B shows the forward centerline $C_{F400}$ as being an approximate midpoint between a top-most outer or upper surface 402*f* and a bottom-most outer or lower surface 403*f* of the fuselage 401 forward of a lateral axis of rotation A', with the aft centerline $C_{A400}$ being an approximate midpoint between an upper surface 402a and a lower surface 403a of the fuselage 401 aft of the lateral axis of rotation. FIG. 2B shows the kink 431 between the forward centerline $C_{F400}$ and the aft centerline $C_{A400}$ as being an approximate change in the angle of a plane 410' substantially perpendicular to the centerline $C_{F400}$ and most of the upper and lower surfaces 402a, 403a extending aft from the kink 431, such that the fuselage 401 aft of the kink 431 has a substantial portion of an approximately constant height or cross-sectional area. This represents only one example, and in other instances the upper surface 402a does not necessarily extend approximately parallel to the lower surface 402b at all even if the aft fuselage still defines a kink 431 in the centerline.

In FIG. 2B, the angle of the aft centerline $C_{A400}$ with respect to the forward centerline $C_{F400}$ defines a kink or bend angle (illustrated as $\alpha_{400K}$ in FIG. 2A), which can be approximately equal to average of an angle $\alpha_{upper}$ of the after upper surface 402a and an angle $\alpha_{lower}$ of the lower surface 403a with respect to the forward centerline $C_{F400}$ and forward upper and lower surfaces 402f, 403f for the case of a constant cross-section forward fuselage 401, as shown in FIG. 2B (hence, FIG. 2B indicating the upper and lower surfaces 402a, 403a defining the respective upper and lower angles $\alpha_{upper}$, $\alpha_{lower}$). In some instances, the angles $\alpha_{upper}$, Mower of the aft upper and lower surfaces 402a, 403a vary with respect to the angle of the aft centerline $C_{A400}$, with the location of a substantial upward deflection in the overall centerline (e.g., kink 431) being defined by the overall shape and slope of the aft fuselage with respect to the forward fuselage (or more generally the overall shape and slope of the aft end 440 with respect to the forward end 420). For example, for the aircraft 100 of FIG. 1B, the lower surface defines a lower angle $\alpha_{lower}$, which is approximately equal to the tailstrike angle of approximately 12 degrees, and the upper surface angle $\alpha_{upper}$ in the aft fuselage is approximately between 6 and 7 degrees. In some exemplary embodiments, the result kink angle of the aft centerline $C_{A400}$ can be approximately in the range of about 0.5 degrees to about 25 degrees, and in some instance it is about 10 degrees with respect to a longitudinal-lateral plane of the cargo aircraft 100, i.e., a plane in which the forward centerline $C_{F400}$ is disposed, the plane extends substantially parallel to the ground or a ground plane $P_{400G}$. Further, the kink angle α400K can be approximately equal to a degree of maximal rotation of the aircraft during the takeoff operation. Still further, a length of the aft end 140, i.e., the portion that is angled with respect to the forward centerline $C_{F400}$, can be approximately in the range of about 15% to 65%, and in some instances about 35% to about 50% of a length of the entire fuselage 101, and in some embodiments it can be about 49% the length of the fuselage 101.

Figure 2C:
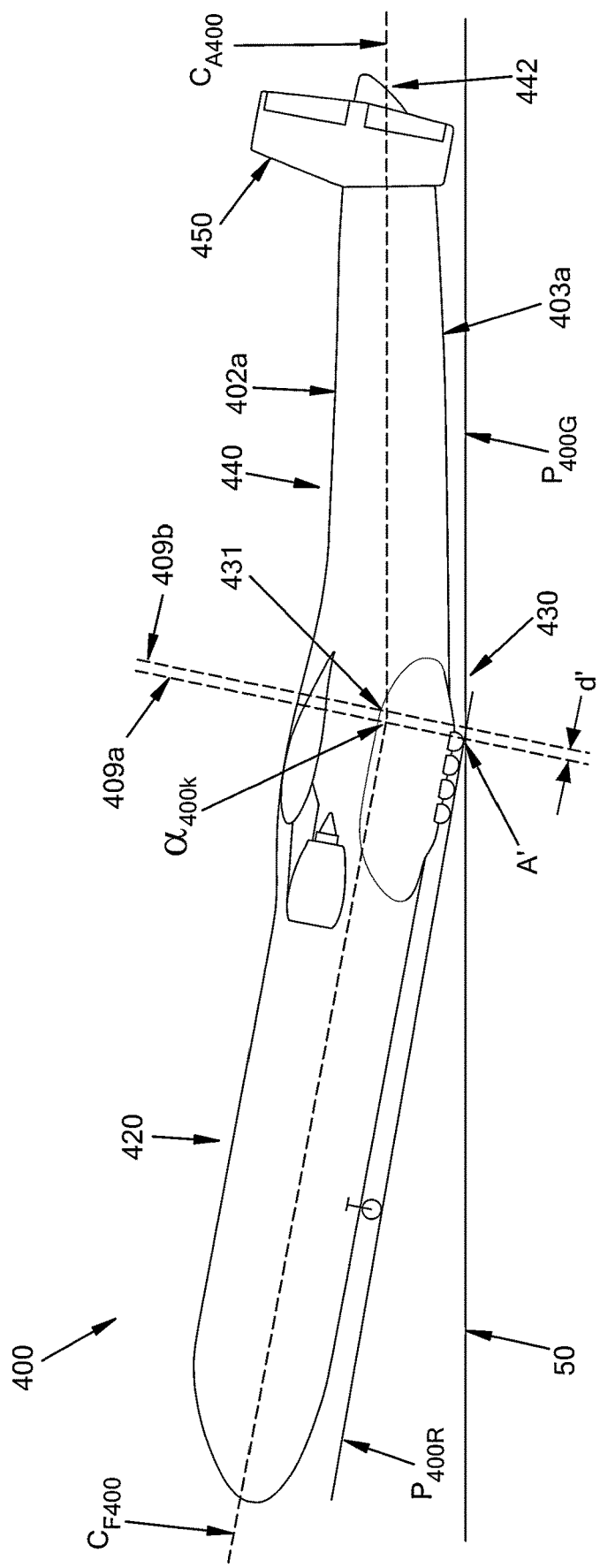
FIG. 2C is a side view of the aircraft of FIG. 2B in a take-off position.
Figure 3:
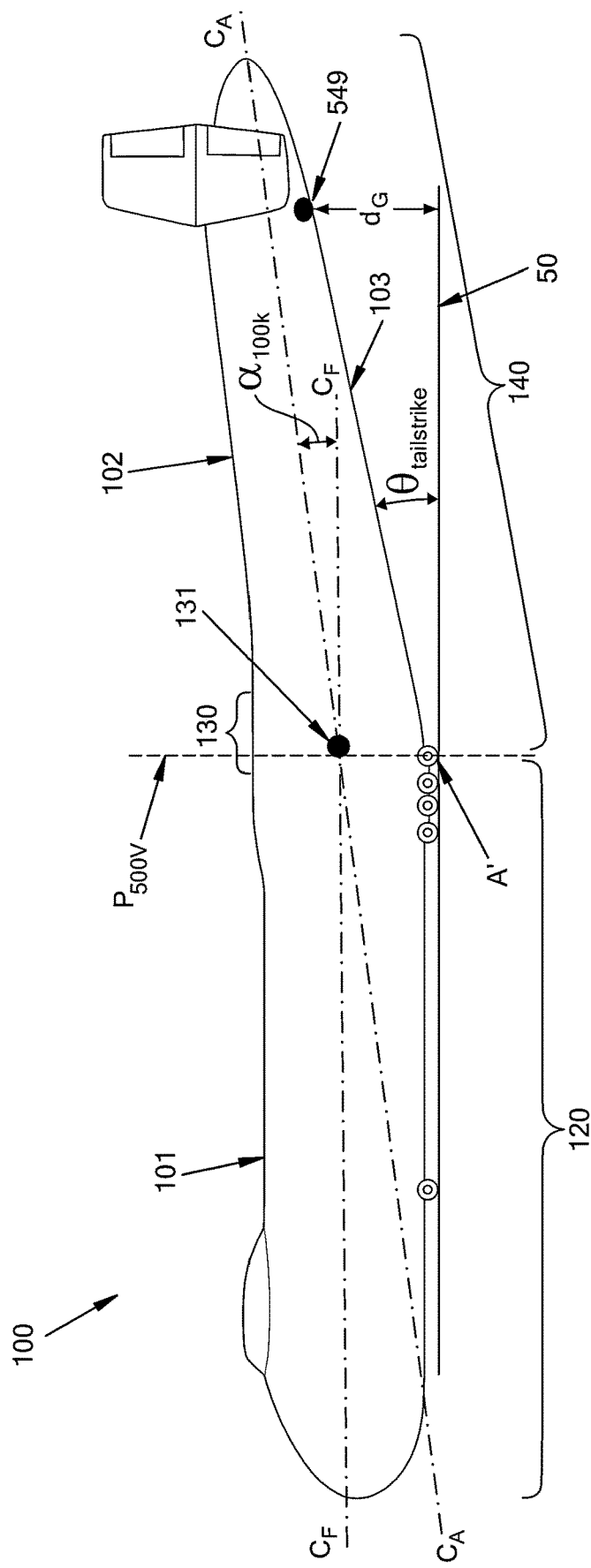
FIG. 3 is the side view of the aircraft of FIG. 1A with some additional details removed for clarity.

In FIG. 2C, the cargo aircraft 400 is shown on the ground 50 and rotated about the lateral axis of rotation to illustrate, for example, a takeoff pitch-up maneuver. In FIG. 2C, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403a (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle $\alpha_{400K}$ of the kink 431 is approximately the maximum safe angle of rotation of the aircraft 400 about the lateral axis of rotation A'. FIG. 2C shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $\alpha_{400K}$ of the kink 431 or a slightly larger angle, as shown, the aft end 440 is highly elongated without risking a tail strike. Accordingly, minimizing d' approximately sets the lower angle $\alpha_{lower}$ as an upper limit to the safe angle of rotation about the lateral pitch axis. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. FIG. 3 shows this in further detail for the cargo aircraft 100 of FIG. 1A.

In FIG. 3, the aft centerline $C_A$ and forward centerline $C_F$ of the fuselage 101 are shown intersecting at a kink location 131 just aft of the vertical plane $P_{500V}$ of the lateral axis of rotation A', which occurs within the kinked portion 130 connecting the forward end or fuselage 120 to the aft end or fuselage 140. The lower surface 103 of the aft fuselage 140 approximately defines $\theta_{tailstrike}$ of the cargo aircraft 100, which is slightly larger than a kink angle $\alpha_{100K}$ defined by the upslope of the aft centerline $C_A$ with respect to the forward centerline $C_F$. Additionally, in some examples, the aft fuselage can include a sensor 549 configured to measure the distance $d_G$ of the lower surface 103 of the aft fuselage 140 to the ground 50 to assist the pilot and/or computer in control of the aircraft 100 in maximally rotating the aircraft 100 about the lateral pitch axis without tailstrike.

Figure 4A:
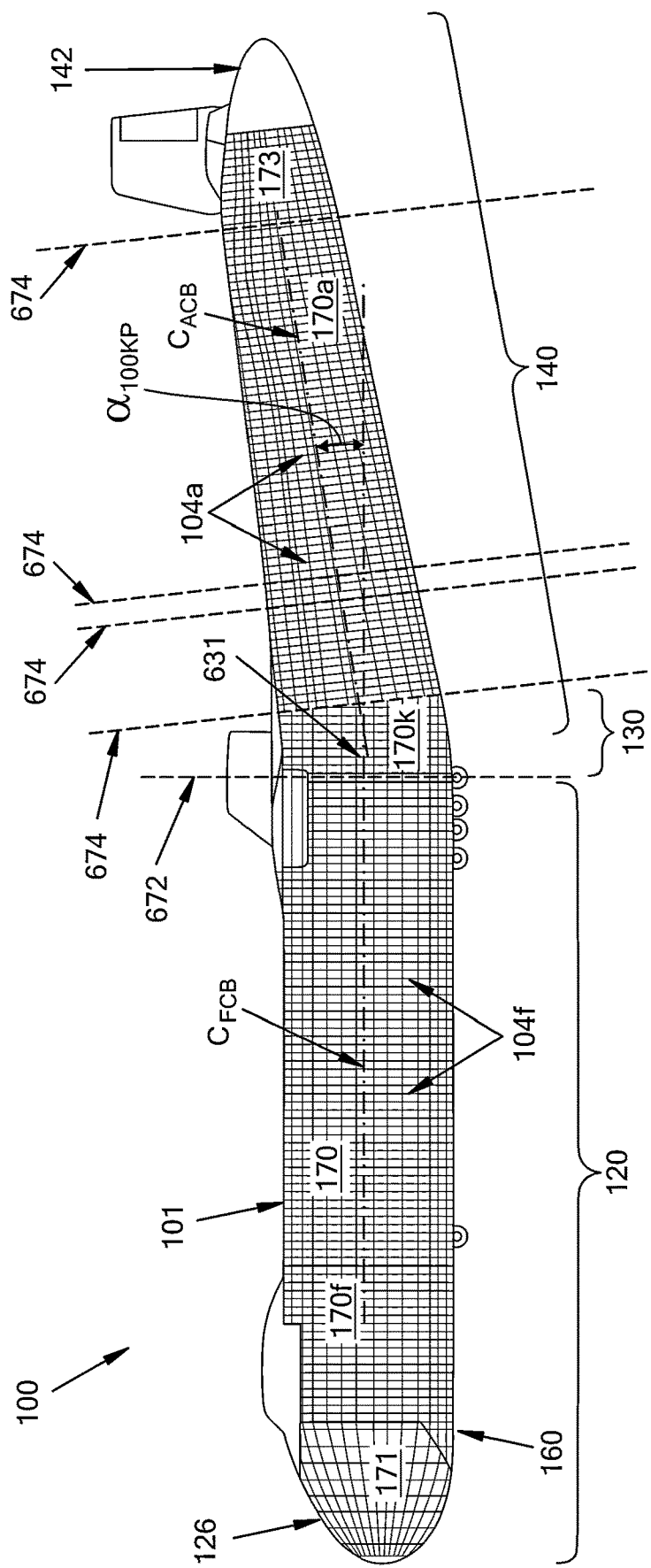
FIG. 4A is a side cross-sectional view of the aircraft of FIG. 3, including an interior cargo bay of the aircraft.

FIG. 4A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 3) and the aft region 170a can generally define an aft cargo centerline $C_{ACB}$ that can be substantially colinear or parallel to the aft fuselage centerline $C_A$ (shown in FIG. 3). Accordingly, in the kinked portion 130 of the fuselage 101, which itself can include a comparable kinked portion 170k of the cargo bay 170, where the aft fuselage centerline $C_A$ bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100K}$ of the fuselage 101. The aft cargo centerline $C_{ACB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

Figure 4B:
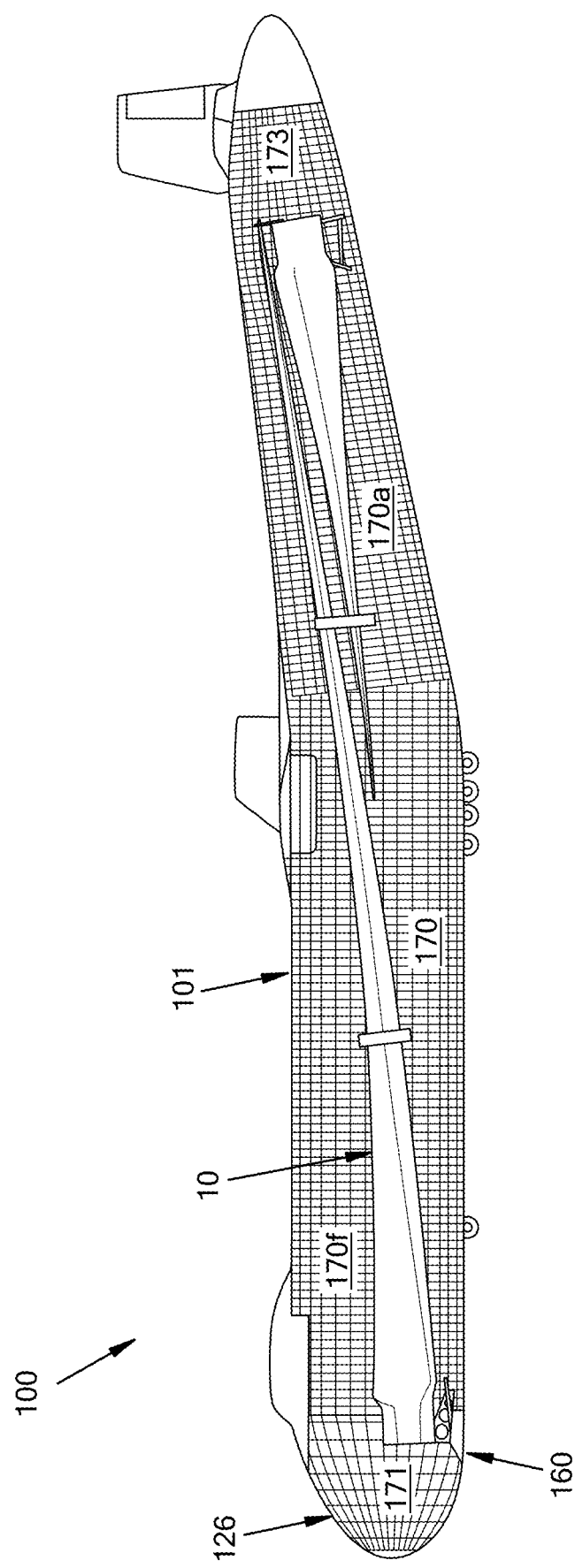
FIG. 4B is the side cross-sectional view of the aircraft of FIG. 4A with an exemplary payload disposed in the interior cargo bay.
Figure 4C:
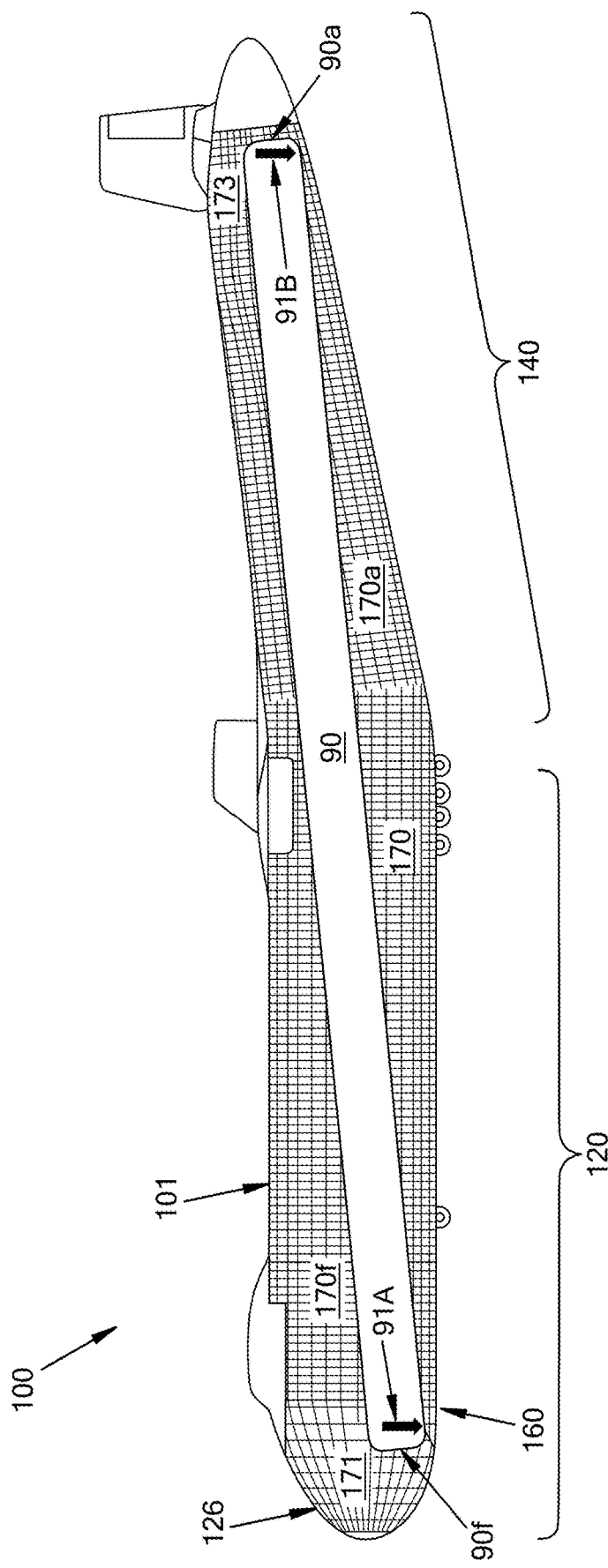
FIG. 4C is the side cross-sectional view of the aircraft of FIG. 4A with a schematic of an exemplary maximum-length payload disposed in the interior cargo bay.

FIG. 4A shows the aft region 170a of the cargo bay 170 extending through almost all of the aft fuselage 140, which is a distinct advantage of the configurations discussed herein. An aft-most terminal end of the aft bay portion can be disposed above the longitudinal-lateral plane of the cargo aircraft 100. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 (FIG. 4A) is forward or aft of the fuselage kink 131 (FIG. 3) such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuse fuselage while increasing the maximum straight-line payload length for a given overall aircraft length and tailstrike angle, as shown at least in FIGS. 4B and 4C FIG. 4B shows a side cross-sectional view of the fuselage 101 of the cargo aircraft 100 of FIG. 4A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

FIG. 4C is the same cross-sectional view of the fuselage 101 of the cargo aircraft 100 of FIG. 4B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Figure 4D:
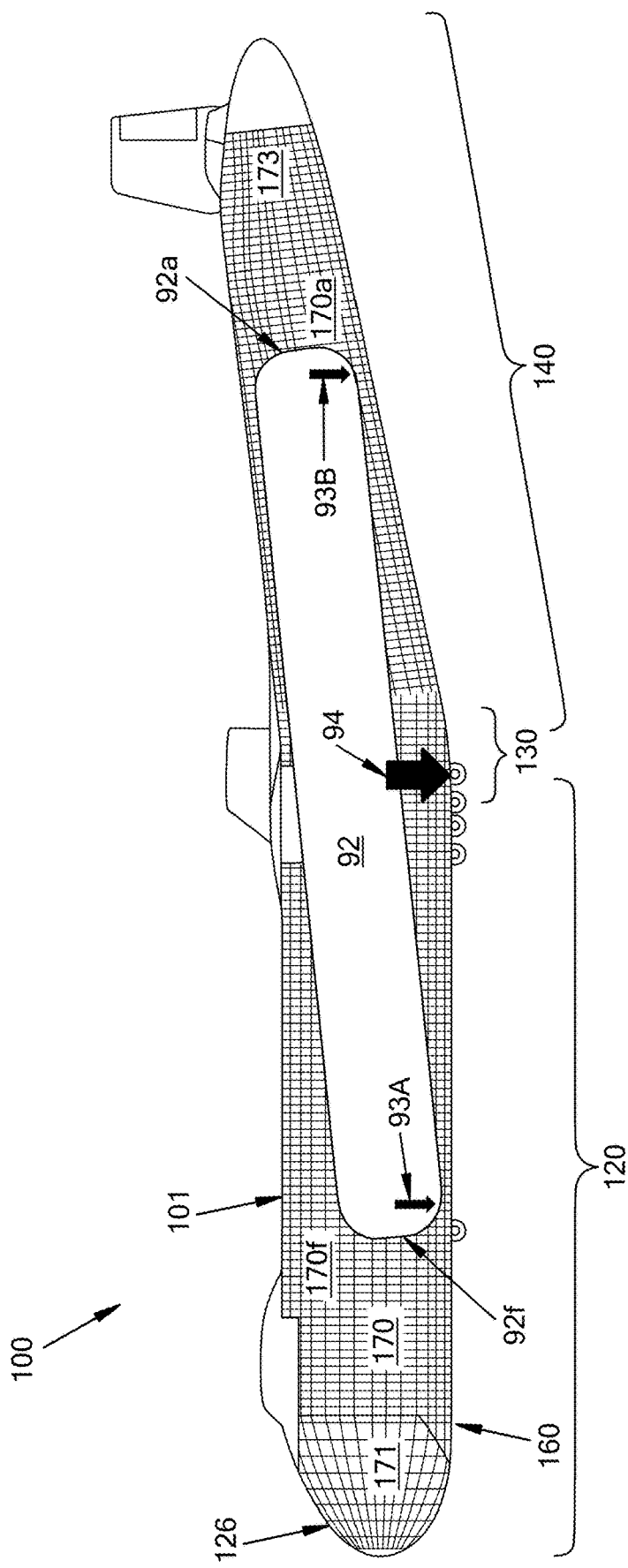
FIG. 4D is the side cross-sectional view of the aircraft of FIG. 4A with a schematic of an exemplary maximum-weight payload disposed in the interior cargo bay of the aircraft.

FIG. 4D is the same cross-sectional view of the fuselage 101 of the cargo aircraft 100 of FIG. 4A with a maximum weight payload 92 secured in the cargo bay 170. A forward end 92f of the maximum weight payload 92 can be secured in the forward region 170f of the interior cargo bay 170 with a first portion of the weight of the payload 92 (shown as vector 93A) being carried by the forward fuselage 120 and an aft end 92a of the maximum weight payload 92 can be secured in the aft region 170a of the interior cargo bay 170 with a second portion of the weight of the payload 92 (shown as vector 93B) being carried by the aft fuselage 140.

Advantageously, the substantial length of the cargo bay 170 forward and aft of the a center-of-gravity of the aircraft 100 (e.g., approximately aligned with the kinked region 130) enables positioning of the maximum weight payload 92 such that the payload center-of-gravity (shown as vector 94) substantially close (i.e., within about 30% of wing Mean Aerodynamic Cord (MAC) or about 4% of total aircraft length) to or aligned with the center-of-gravity of the aircraft 100. In some examples, at least about 10% of the weight of maximum weight payload 92 is carried in the aft region 170a. In some examples of carrying a maximum weight payload, especially payloads approaching a maximum length, about 40% to about 50% could be carried in the aft region 170a in order to center the payload's center of gravity at a nominal location in the cargo bay 170.

Additional details about a kinked fuselage configuration are provided in commonly-owned International Patent Application No. PCT/US20/49787, filed on Sep. 8, 2020, entitled "AIRCRAFT FUSELAGE CONFIGURATIONS FOR AVOIDING TAIL STRIKE WHILE ALLOWING LONG PAYLOADS," the content of which is incorporated by reference herein in its entirety.

Transport Vehicle, Support Structures, Fixtures, and Aspects Related to the Same The present disclosure provides for, among other things, loading and/or unloading of large cargo in an efficient manner without the need for manual or powered adjustment of the payload during fore-aft movement of the payload within the cargo bay. As described in detail below, this can be accomplished by moving the payload along a curved path concurrently with a fore-aft motion within the cargo bay during at least a portion of the loading or unloading process, for example, following a "slide aboard" or linear translation of the payload into the cargo bay (or out of the cargo bay during an unloading procedure). One or more support structures can be disposed, either removably or permanently, within the cargo bay that can form the curved path for the payload to travel along. As used herein, "curved path" refers to a path defined by a circular arc, such that as the payload moves along the path the payload rotates about an arc center point, resulting in the payload moving along the arc. In other words, as the payload moves along the curved path, the payload remains a fixed radial height (as measured along a radius from the center point of the arc to the curved path)

about the curved path, i.e., a portion or portions of the one or more support structures that form the curved path.

Figure 5:
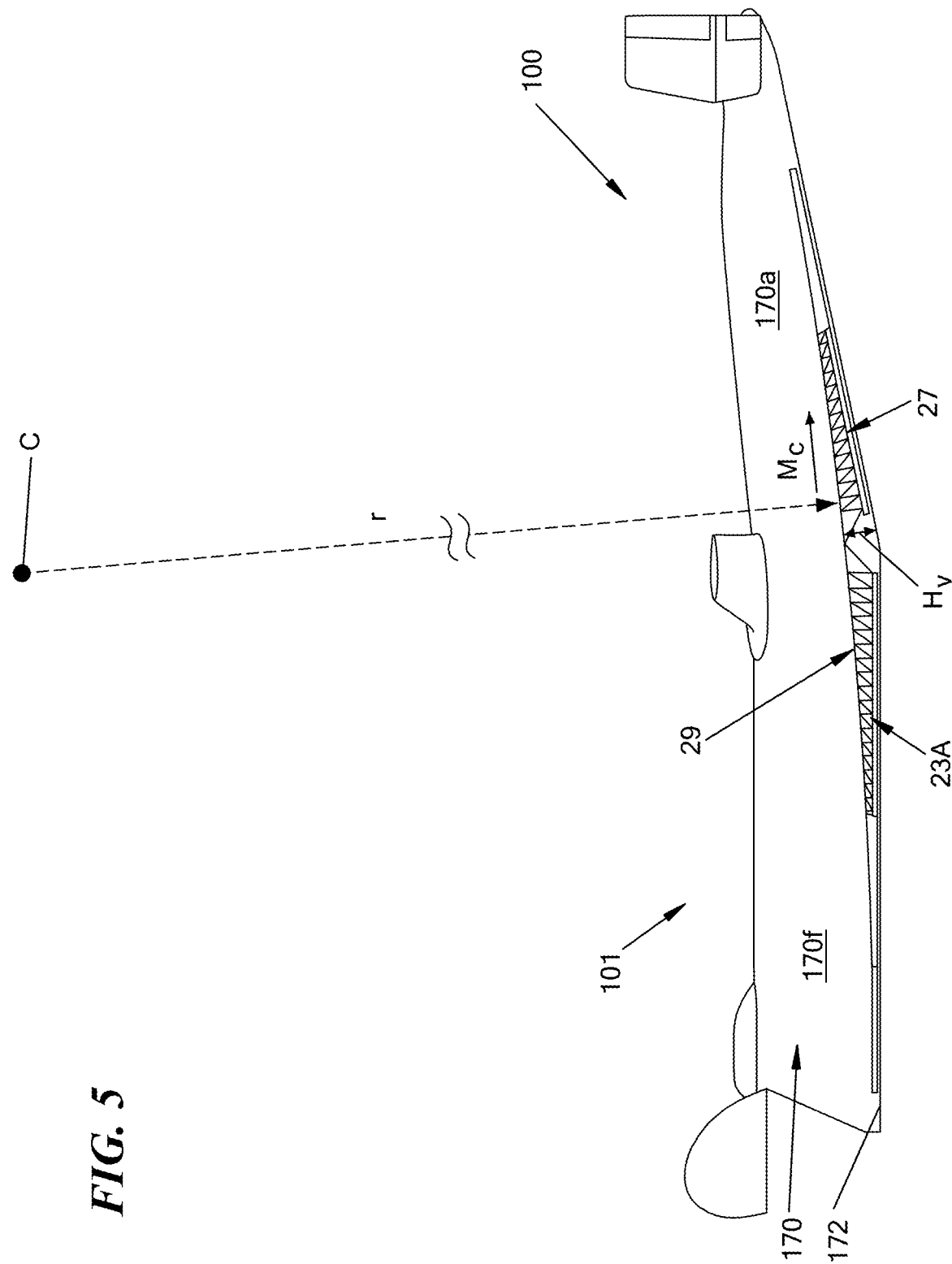
FIG. 5 is a side partial cross-sectional view of the aircraft of FIG. 1C, the fuselage of the aircraft being illustrated in cross-sectional view, with an aft support structure and a forward support structured disposed within the interior cargo bay and with half of the fuselage being removed for illustrative purposes.

By way of high-level introduction, FIG. 5 illustrates one embodiment of the aircraft 100 with a curved path extending through at least a portion of the interior cargo bay 170 in accordance with the present disclosure. More particularly, a forward support structure 23A and an aft support structure 27 can form the curved path 29, with motion therealong indicated by arrow Mc, which can extend at least partially through the kinked bay portion 170k into the aft bay 170a. In some embodiments, the curved path can extend from the forward bay, through the kinked bay, and into the aft bay. The forward and aft support structures 23A, 27 can be secured, either permanently or removably, to the bottom contact surface 172 of the interior cargo bay 170. In some embodiments, one or both of the forward and aft support structures 23A, 27 can be secured directly to the bottom contact surface 172 of the interior cargo bay 170. In other embodiments one or both of the forward and aft support structures 23A, 27 can be secured to one or more base rails or similar feature disposed on or connected to the bottom contact surface 172. The forward and aft support structures 23A, 27 can extend a varying vertical distance $H_V$ above the bottom contact surface 172 to which the structures are secured over a length of each structure 23A, 27 such that a top or upper end of each structure forms the curved path. In some embodiments, at least one rail 29, 31 (FIG. 7D) can form or extend along the upper end of each of the forward and aft support structures 23A, 27. The forward and aft support structures 23A, 27 can be disposed within the cargo bay 170 such that the at least one rail 29, 31 of the support structures 23A, 27 align to form the curved path.

The payload can move along the support structures, e.g., by rolling or sliding along the support structures, such that the payload travels along the curved path concurrently with forward-aft motion of the payload. The curved path 29, 31 formed by the forward support structure 23A and aft support structure 27 can be defined by a circular arc, with the path extending along a radial section of the arc relative to an arc center point. To accommodate the large size of the payload 10 and appropriate dimensions of the aircraft 100, the arc center point C can be located well above the aircraft 100. In other words, a radius r of the arc along which the curved path 29, 31 is formed can be very large such that, in some instances, to the naked eye it may appear that a payload is moving along a diagonal as the payload travels in the fore or aft direction along the curved path 29, 31. The large radial dimension can allow for the curved path 29, 31 to be formed as an approximation of a curve using piece-wise linear segments with a negligible amount of deviation from an ideal curved profile. Accordingly, in some embodiments, the at least one rail that forms the curved path can be a series of piecewise-linear rail segments that approximate a curve. By way of non-limiting example, a radial dimension r of the arc, as measured from the upper end of the support structures 23A, 27 that form the curved path to the center point C of the arc, can be approximately between about 800 feet to about 6000 feet, or more approximately between about 1200 feet to about 3000 feet. In some embodiments the radial dimension r of the arc, as measured from the upper end of the support structures 23A, 27 that form the curved path to the center point C of the arc, can be greater than about 1500 feet, greater than about 2000 feet, or greater than about 2500 feet. Further description of methods, systems, and structures of the present disclosure is provided below.

FIGS. 6A-8 illustrate in greater detail components of systems that can be used to load and/or unload a payload in accordance with the present disclosure, i.e., moving the payload along a curved path as the payload travels in the forward-aft direction with respect to a cargo aircraft during at least a portion of the loading or unloading process. FIG. 6A illustrates one embodiment of a transport vehicle or transport vehicle system 20 that can include a plurality of transports 22 and vehicle support spans or lower trusses 24 and can be utilized to move a payload 10 to a cargo aircraft for loading (or away from the cargo aircraft for unloading). The transport vehicle 20 is shown in greater detail in FIG. 6B. Returning to FIG. 6A, a forward support structure 23A and a ground support structure 23B can be disposed on and selectively coupled to the transport vehicle 20 such that the support structures 23A, 23B can selectively move relative to and along the transport vehicle 20. In some embodiments, the support structures 23A, 23B, 27 can include one or more trusses, but other configurations for support structures are possible. A more detailed discussion of one embodiment of truss-style support structures is set forth below in connection with FIGS. 7D and 7E.

The forward and ground support structures 23A, 23B can be locked or otherwise secured to the transport vehicle such that the support structures remain stationary with respect to the transport vehicle, or can be unlocked or otherwise configured to permit translation of the support structures relative to or along the transport vehicle. The support structures 23A, 23B can include, or otherwise be used with, appropriate features and devices to secure it to the transport vehicle, such as tiedown rings, manual or power-operated locking pins, e.g., that can interface with counterpart components on the transport vehicle such as a clevis pin receptacle or open hook, gear racks, or articulated struts, among others. Such locking features and devices can be applied to various aspects of the present disclosure that utilize selective locking, e.g., locking a payload-receiving fixture to a support structure, locking a support structure to a bottom contact surface of a cargo bay, locking a support structure to a transport vehicle, etc.

The payload 10 can be selectively coupled to the forward and ground support structures 23A, 23B such that the payload can selectively move relative to and along forward and ground support structures 23A, 23B. In some embodiments, the payload 10 can include a plurality of payload-receiving fixtures 12 that can receive a large cargo, such as turbine blades 11A, 11B, such that the large cargo and the fixtures 12 can move as a unit relative to the forward and ground support structures 23A, 23B. Details of the payload-receiving fixtures 12 are described below in connection with FIGS. 8 and 91. Each payload-receiving fixture can be locked or otherwise secured to forward and ground support structures 23A, 23B such that the payload-receiving fixtures remain stationary with respect to the support structures, or can be unlocked or otherwise configured to permit translation of the payload-receiving fixtures 12 relative to or along the support structures. The payload-receiving fixtures can be locked or unlocked using any of the methods or mechanisms described above in connection with the support structures 23A, 23B, or equivalent methods or mechanisms as would be recognized by one skilled in the art.

As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units. As will be described in detail below, a first or forward support structure 23A and a back or ground support structure 23B can be removably coupled to the vehicle 20. The fixtures 12 can be removably coupled to the support structures 23 such that the fixtures 12 can move both with the support structure 23 and relative thereto. It will be appreciated that while two support structures 23A, 23B are illustrated, a greater or fewer number of support structures can be removably coupled to the vehicle 20, so long as the support structures can safely and securely support the payload 10 and accompanying fixtures 12.

FIG. 6B illustrates one embodiment of the transport vehicle 20 in greater detail. The vehicle system 20 can include a plurality of transporters 22 and a support span, as shown trusses 24, extending between each of the transporters 22. The transporters 22 can be wheeled vehicles configured to move along a surface, such as ground, up or down a ramp, and/or in an interior cargo bay of an aircraft, among other surfaces. The transporters 22 can be operated independent of one another, or they can be operable collectively as a single unit. The transporters 22 can be self-propelled and/or self-powered such that an outside mechanism, such as pushing or towing vehicle, does not need to contact the transporters 22, or any part of the system 20, to advance, drive, or otherwise move the transporters 22 and system 20. As shown, the transporters 22 include wheels 22w. Alternatively, or additionally, with respect to any of the transporters provided for herein or otherwise derivable from the present disclosures, other transportation means can be used that allow for movement across a ground, including, for example skis, skids, linked tracks (e.g., tractor tracks, military tank tracks), articulated legs, or air cushions in the manner of a hovercraft. Control of the transporters 22 and/or the system 20 can be performed using any known techniques for controlling a vehicle remotely, including but not limited to one or more controllers or control pads in communication with systems and/or other components provided for on the transporters (e.g., power system, electrical controls, motor, etc.).

Disposed between each transporter 22 can be one or more support spans. In the illustrated embodiment, the support spans are trusses, although a person skilled in the art will recognize a variety of structures that can be used to couple transporters 22 together and provide adequate support for a payload. The trusses 24 can include a plurality of rails 24a, 24b that are disposed substantially parallel to each other, along with various crossbeams that provide additional strength to the truss 24. In embodiments in which base rails are disposed in the aircraft, the rails of the truss can be complementary in size to the base rails on the aircraft to allow for easy transition from one to the other. The length and number of trusses can depend, at least in part, on the number of transporters 22 being used and the size and weight of the payload 10. More generally, fewer or more transporters 22 and trusses 24 can be used as desired. In the illustrated embodiment, the trusses 24 extend across an entire top surface of each transporter 22, although in other embodiments the trusses can extend along only a portion of the top surface of one or more of the transporters 22. Generally the support spans are configured in a manner such that the do not interfere with the operation of the system 20, and thus, for example, a height of the trusses 24 in the illustrated embodiment is such that they do not contact the ground. However, the trusses may optionally be permitted to sag and intentionally contact the ground under some loading situations to alleviate stresses within the trusses and thereby reduce the amount of material required to construct them.

FIGS. 7A-7E provide for a schematic illustration of one exemplary embodiment of loading a large payload 10 into the aircraft 100. For illustrative purposes, the left half of the fuselage 101 (with respect to the aircraft's direction of flight), i.e., the right half of the fuselage 101 when viewed from the front of the aircraft, has been removed from these figures. Further details of moving the payload 10 along the curved path will be described in connection with the same. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 (see FIG. 1C) can be used to help initially receive the payload.

As shown in FIG. 7A, the transport vehicle 20 can be driven or otherwise moved to the forward end 120 of the aircraft 100, proximate to the cargo opening 171. When driving or moving the transport vehicle 20 to the forward end 120 of the aircraft 100, the payload 10 can be locked or otherwise secured to the support structures 23A, 23B and the support structures can be locked or otherwise secured to the transport vehicle 20, such that the payload, support structures, and transport vehicle can move as one unit. An aft support structure 27 can be disposed within the aft portion 170a of the cargo bay 170 such that the aft support structure 27 is secured in a fixed position relative to the cargo bay 170. The aft support structure 27 can be either permanently or removably disposed in the aft cargo bay 170. For example, in some embodiments the aft support structure 27 can be formed integrally with the bottom contact surface 172 of the aft cargo bay 170a. In other embodiments, the aft support structure 27 can be either permanently or removably coupled to the bottom contact surface 172 of the aft cargo bay 170a, e.g., by locking a lower end of the aft support structure 27 to one or more base rails extending along the bottom contact surface of the aft cargo bay, and/or to the bottom contact surface 172 itself. Notably, the aft support structure 27 can remain stationary and securely disposed within the aft cargo bay 170a as the payload 10 is loaded into and/or unloaded from the cargo bay 170, regardless of the permanence and/or mechanism of coupling the aft support structure 27 within the aft cargo bay 170a.

Figure 7C:
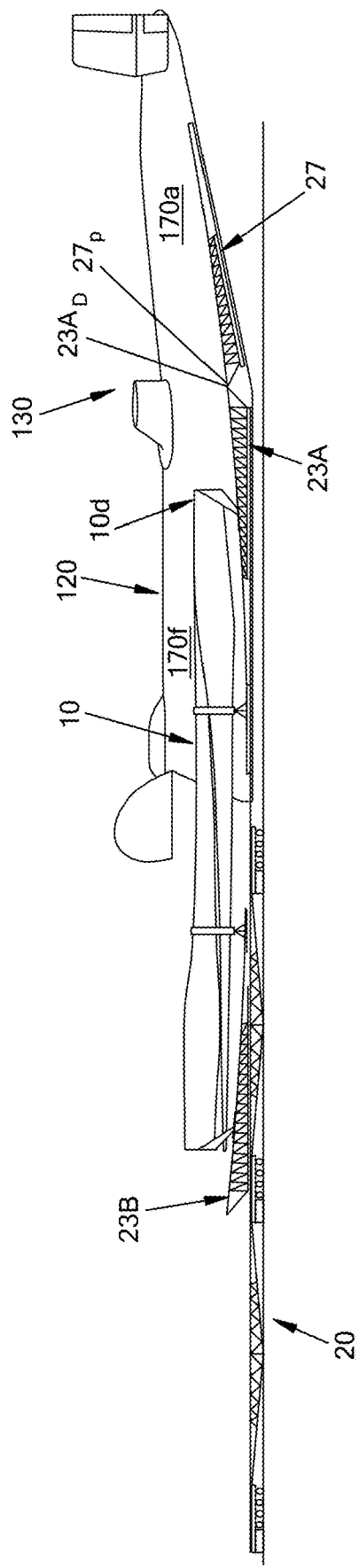
FIG. 7C is a schematic side view of the aircraft of FIG. 7A with the forward support structure disposed within the forward bay of the interior cargo bay and the payload partially disposed within the interior cargo bay following an initial translation into the forward bay.

The payload 10 can be moved from the transport vehicle 20 and into the interior cargo bay 170. From the orientation illustrated in FIG. 7A, i.e., with the transport vehicle 20, support structures 23A, 23B, and payload 10 proximate to the cargo opening 171, the support structures 23A, 23B can be placed in a movably coupled configuration relative to the transport vehicle 20. As a result, the structures 23A, 23B and payload 10 can remain coupled, but they can be movable relative to the transport vehicle 20. For example, the support structures 23A, 23B can be unlocked relative to the transport vehicle 20 at a plurality of locations 30 along a length of the transport vehicle. A person skilled in the art will appreciate that the illustrated locations 30 can be other locations along the length of the transport vehicle 20, and fewer or more locations can be used as desired. FIGS. 7B and 7C illustrate snapshots of an initial "slide aboard" phase in which the payload 10 and forward support structure 23A can be moved through the cargo opening 171 and into the forward portion 170f of the cargo bay 170. More particularly, FIG. 7B (which, for illustrative purposes, does not show the payload 10) shows one embodiment of a start position of the initial "slide aboard" phase just prior to movement of the support structures 23A, 23B and payload 10 relative to the transport vehicle 20. With the support structures 23A, 23B in the movably coupled configuration, the support structures 23A, 23B, together with the payload 10, can move towards the aircraft 100 in the direction of arrow Fi as shown in FIGS. 7B and 7C, relative to the transport vehicle 20. The payload 10, i.e., the fixtures 12, and the blades 11A, 11B received therein, can remain locked or otherwise secured to the support structures 23A, 23B as the support structures move such that the support structures and payload move together as a unit relative to the transport vehicle. In some embodiments, the motion Li of the support structures 23A, 23B and payload 10 can be pure linear translation such that the forward support structure 23A and the payload 10 can linearly translate through the cargo opening 171 and into the forward bay 170f.

Movement of the support structures 23A, 23B and payload 10 can be accomplished using various combinations of one or more winches, pulleys, cables, cranes, and/or power drive units, as described herein and derivable therefrom. For example, a combination of cables, pulleys, and spools can be utilized in the loading and/or unloading the cargo as illustrated in FIGS. 10A-10L. A more detailed description of such components and related methods is set forth below in connection with those figures. FIGS. 7A-7E are illustrated without any such cables, pulleys, and spools, etc. for illustrative purposes only.

FIG. 7C illustrates one embodiment of a final position of the "slide aboard" phase, in which the support structures 23A, 23B have translated relative to the transport vehicle 20 such that the forward support structure 23A is disposed within the forward bay portion 170f of the cargo bay 170, along with at least a portion of the payload 10 coupled to the forward support structure. More particularly, and as described in detail below, the forward support structure 23A can align with the aft support structure 27 that is disposed in the aft cargo bay 170a to form a path that extends from the forward bay, through the kinked bay, and into the aft bay. As used herein, the forward support structure 23A can be considered to be "aligned" with the aft support structure 27 when a distal end $23A_D$ of the forward support structure 23A contacts, abuts, or is otherwise placed in close proximity to a proximal end $27_P$ of the aft support structure 27 to provide a continuous or substantially continuous path along which the payload can travel without disruption.

The path formed by the forward support structure 23A and the aft support structure 27 can enable the payload 10 to move along a curved path in the aft direction from the forward bay, through the kinked bay, and into the aft bay 170a (or in a forward direction from the aft bay, e.g., for unloading the payload 10 from the cargo aircraft 100). As noted above, moving the payload along a curved path can refer to moving the payload along a path defined by a circular arc such that, as the payload moves along the path in the fore-aft direction, the payload concurrently rotates about a center point of the arc thereby resulting in the payload moving along the arc. For example, the forward support structure 23A and the aft support structure 27 can include at least one rail $29_{FS}$, $31_{FS}$, $29_{AS}$, $31_{AS}$ (see FIG. 7D) such that, when the forward support structure 23A is in the position illustrated in FIG. 7C, i.e., aligned with the aft support structure 27 in the final position of the slide-aboard phase, each rail $29_{FS}$, $31_{FS}$ of the forward support structure 23A can align with a corresponding rail $29_{AS}$, $31_{AS}$ of the aft support structure 27 to form a curved path 29, 31 along which the payload 10 can move in the forward-aft direction.

Figure 7D:
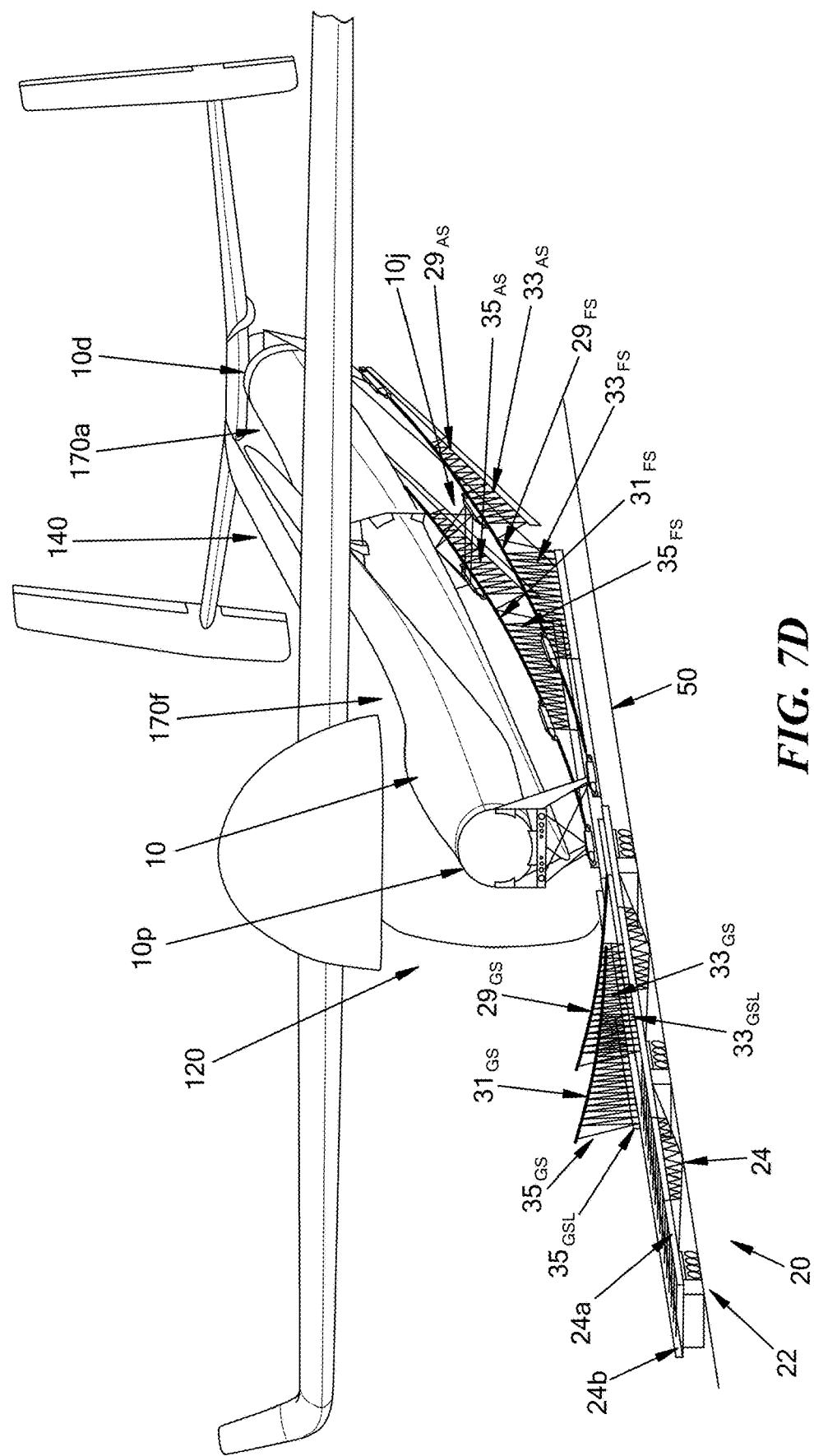
FIG. 7D is a front isometric view of the aircraft of FIG. 7C with the payload and forward support structure fully disposed within the interior cargo bay.
Figure 7E:
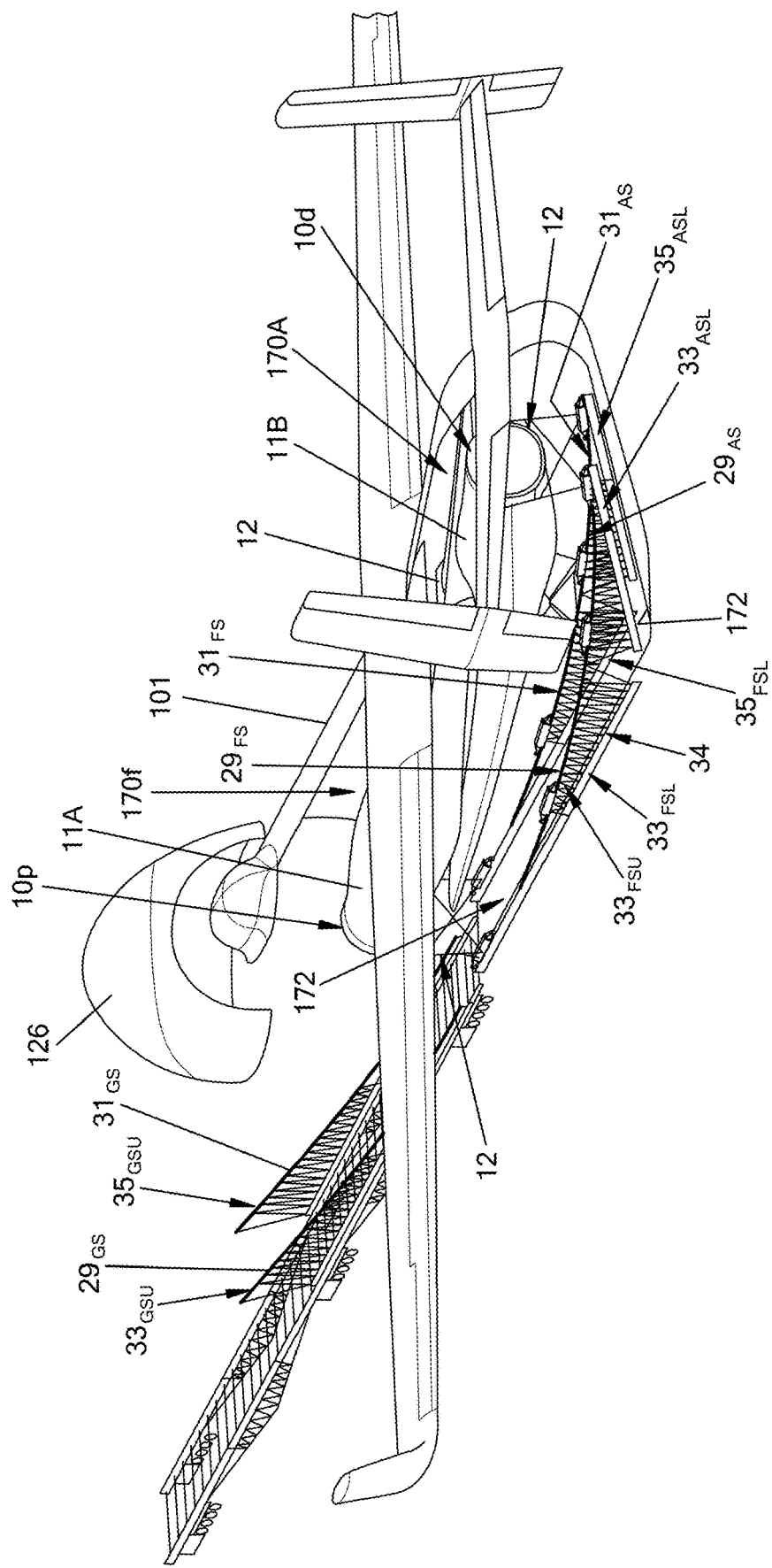
FIG. 7E is a rear isometric view of the aircraft of FIG. 7C with the payload and forward support structure fully disposed within the interior cargo bay.

In some embodiments, and as can be seen in FIGS. 7D and 7E, the forward support structure 23A and aft support structure 27 can include a first frame or truss $33_{FS}$, $33_{AS}$ and a second frame or truss $35_{FS}$, $35_{AS}$ that can extend substantially parallel to the first frame. The frames $33_{FS}$, $33^{AS}$, $35^{FS}$, $35_{AS}$, can extend longitudinally in the forward-aft direction. While the illustrated embodiment shows each support structure 23A, 27 with two frames $33_{FS}$, $33_{AS}$, $35_{FS}$, $35_{AS}$, a greater or fewer number of frames can be utilized, e.g., to provide an appropriate amount of stability and support for a given payload. Each frame can extend vertically from a lower end $33_{FSL}$, $33_{ASL}$, $35_{FSL}$, $35_{ASL}$ to an upper end $33_{FSU}$, $33_{ASU}$, $35_{FSU}$, $35_{ASU}$. A plurality of support beams 34 can extend between the upper and lower ends of each frame $33_{FS}$, $33_{AS}$, $35_{FS}$, $35_{AS}$ that can provide structural support and strength to the frame. A length of the beams 34 can vary longitudinally along each frame to accommodate a varying vertical height of the upper end of the frame.

The at least one rail $29_{FS}$, $31_{FS}$, $29_{AS}$, $31_{AS}$ can form or be formed along the upper end of each frame $33_{FS}$, $33_{AS}$, $35_{FS}$, $35_{AS}$ of the support structures 23A, 27. Similarly, the ground support structure 23B can include a first frame $33_{GS}$ and a second frame $35_{GS}$, with a rail $29_{GS}$, $31_{GS}$ formed at or forming an upper end $33_{GSU}$, $35_{GSU}$ of each frame. A lower end $33_{FSL}$, $35_{FSL}$, $33_{GSL}$, $35_{GSL}$ of each frame $33_{FS}$, $35_{FS}$, $33_{GS}$, $35_{GS}$ of the forward support structure 23A and the ground support structure 23B can be configured to removably couple to the transport vehicle 20 and, in the case of the forward support structure 23A, to the interior cargo bay 170, such that the forward and ground support structures can translate relative thereto. For example, the lower end of each frame can include one or more wheels that can roll along the transport vehicle 20 and bottom contact surface 172 of the cargo bay 170, e.g., along the rails 24a, 24b of the transport vehicle 20 and/or base rail(s) of the cargo bay 170. In some embodiments, the lower end of each frame $33_{AS}$, $35_{AS}$ of the aft support structure 27 can likewise be configured to removably couple to the interior cargo bay 170. In other embodiments, the lower end of each frame $33_{AS}$, $35_{AS}$ of the aft support structure 27 can be permanently fixed with respect to the interior cargo bay 170. For sake of brevity, in some embodiments in which a plurality of frames form a support structure, the terms forward support structure 23A, ground support structure 23B, and aft support structure 27 can be used to collectively and generally refer to the plurality of frames, as will be understood by one of ordinary skill in the art in view of the present disclosure where such an interpretation is appropriate.

As shown in FIG. 7C, the payload 10 is partially disposed in the interior cargo bay 170 and remains coupled to the forward support structure 23A and ground support structure 23B, and thus is partially still supported by the transport vehicle 20. A distal end 10d of the payload 10 is disposed in the forward bay 170f, as it has not yet reached the kinked portion 130 of the aircraft 100. The forward support structure 23A can be secured within the forward bay portion 170f of the cargo bay 170, e.g., by locking the forward support structure to the bottom contact surface 172 of the bay 170. The ground support structure 23B can be similarly secured to the transport vehicle 20. In this manner, the forward support structure 23A and the ground support structure 23B can remain stationary relative to the cargo bay 170 and vehicle transport 20 until further action is taken to unlock the forward and ground support structures 23A, 23B. The payload 10 can be unlocked from the ground and forward support structures 23A, 23B such that the payload 10 can move relative to the support structures and into the aft portion 170a of the cargo bay 170.

The system and/or methods used to move the support structures 23A, 23B and payload 10 into the partially loaded position illustrated in FIG. 7C, as discussed in detail below, can continue to be employed to move the payload 10 into the fully loaded position illustrated in FIGS. 7D and 7E, while the support structures 23A, 23B remain stationary. More particularly, the payload 10 can be moved in the aft direction along the curved path formed by the forward support structure 23A and the aft support structure 27 into the aft portion 170a of the cargo bay. FIGS. 7D and 7E illustrate a snapshot from a forward perspective and rear perspective, respectively, of the loading process in which the payload 10 is fully received within the interior cargo bay 170. As shown, the distal end 10d of the payload 10 is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 7D, and the payload does not necessarily have to be disposed on the tongue 160), and the intermediate portion of the payload 10 disposed between the proximal and distal ends 10p, 10d extends from the forward end 120, through the kinked portion 130, and into the aft end 140. As shown, the payload 10 is coupled to the forward and aft support structures 23A, 27 and secured by locking the payload-receiving fixtures 12 thereto. The forward and aft support structures 23A, 27, in turn, are coupled to the bottom contact surface 172 of the interior cargo bay 170 and secured relative thereto. The payload 10 can be loaded into the interior cargo bay 170 such that the distal end 10d of the payload 10 is received within the aft bay portion, as shown in FIGS. 7D and 7E, without adjustment by way of manual or powered adjustment of the fixtures 12, which, in other loading processes may be necessary to accommodate and/or counter upwards motion of the blades 11A, 11B in connection with aft-wards movement of the payload 10. Adjustable fixtures can be used in context with the present support structures 23A, 23B, 27, but one benefit of the present disclosure is being able to load and/or unload large payloads without having to rely upon that extra degree of freedom or adjustment. Once the payload 10 is fully disposed in the interior cargo bay 170, it can be secured within the cargo bay 170 using techniques provided for herein, in commonly-owned applications, or otherwise known to those skilled in the art.

Payload Receiving Fixtures

Figure 8:
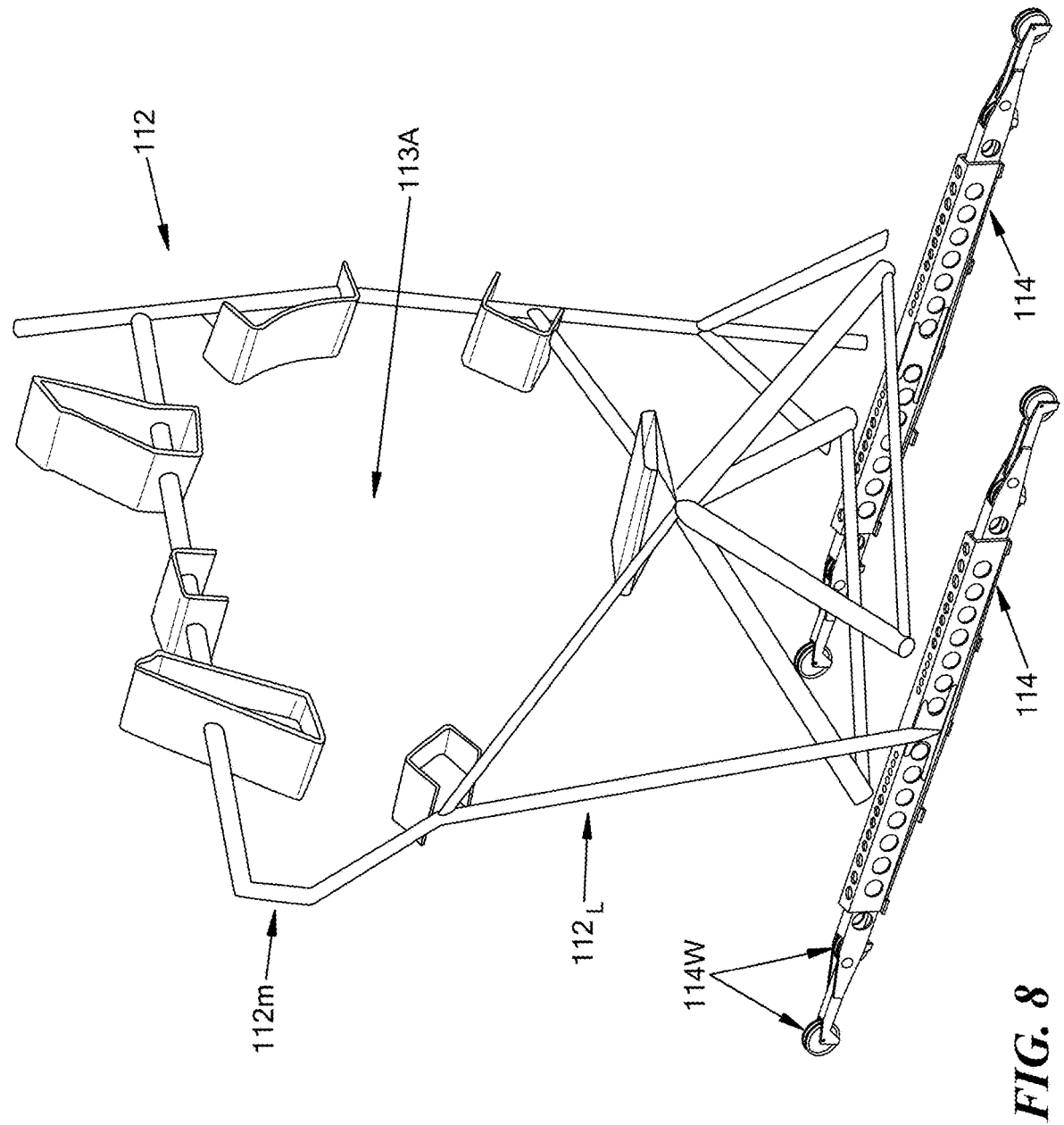
FIG. 8 is an isometric view of one embodiment of a payload-receiving fixture.
Figure 9C:
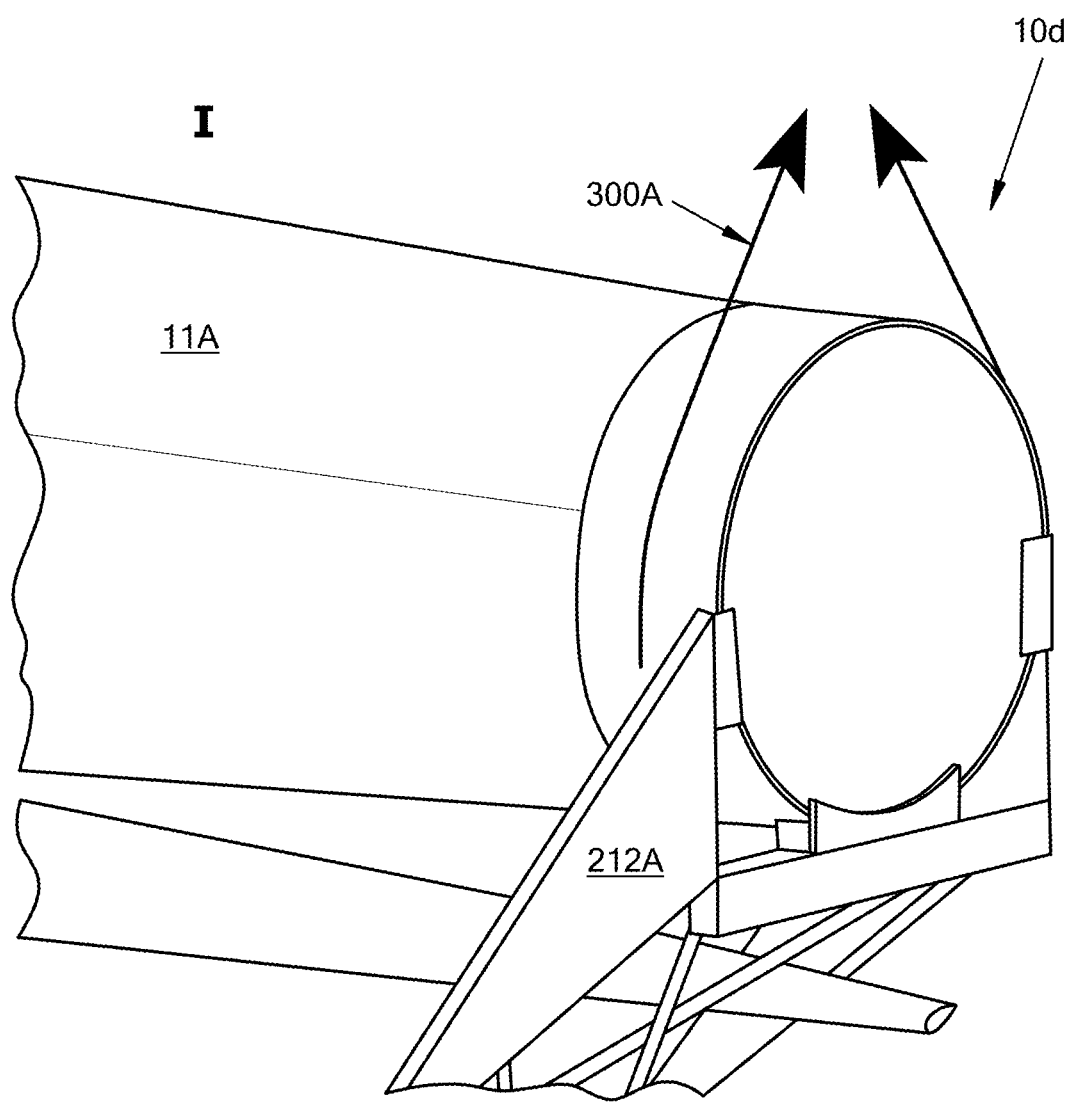
FIG. 9C is an enlarged and detailed isometric view of a payload-receiving fixture and a first turbine blade received therein as shown in Box I of FIG. 9B.

FIG. 8 illustrates one non-limiting embodiment of a payload-receiving fixture 112 that can be used in accordance with the present disclosure to couple and secure a large cargo, e.g., turbine blades 11A, 11B, within the interior cargo bay 170. While the present disclosure permits the transportation of a wide variety of large (and small for that matter) cargos, in the illustrated embodiment the payload 10 includes two wind turbine blades 11A, 11B. In at least some instances, the payload 10 can be referred to as a package, particularly when multiple objects (e.g., more than one blade, a blade(s) and ballast(s)) are involved, possibly secured together and manipulated together as single unit. A package can involve a single object though. The blades 11A, 11B are restrained in relative position with respect to each other by a plurality of payload-receiving fixtures 12, 112. The payload-receiving fixture illustrated in FIG. 8 can be configured to receive, support, and restrain a mid-section of one or more turbine blades 11A, 11B or other cargo. Accordingly, the payload-receiving fixture 112 of FIG. 7 can be referred to as a mid-span payload-receiving feature 112. The mid-payload receiving feature 112 can have a plurality of fixture components, including a lower component 112L, a mid-component 112M, and an upper component 112U (see FIG. 9I) that can be removably secured to one another, as described in detail below. A first payload-receiving recess 113A can be formed between the lower component 112L and the mid-component 112M of the payload-receiving fixture 112 and can receive a portion of one of the two turbine blades 11A, 11B therein. A second payload-receiving recess 113B (see FIG. 9I) can be formed between the mid-component 112M and the upper-component 112U of the payload-receiving fixture 112 and can receive a portion of the other one of the two turbine blades 11A, 11B therein. Another embodiment of a payload-receiving fixture 12 is a root payload-receiving fixture 212A, as shown in FIGS. 9A and 9C. The root payload-receiving fixture 212A can be configured to receive, support, and restrain a root or hub, e.g., a terminal end, of one or more turbine blades 11A, 11B or other cargo.

Other payload-receiving fixtures, either provided for herein or otherwise derivable in view of the present disclosures, can also be used in conjunction with packaging the blades 11A, 11B (or a payload more generally). Each fixture 112, 212 can be removably and slidably coupled to one or more of the support structures 23A, 23B, 27 such that the fixtures 112, 212 can selectively move relative to and along the support structures 23A, 23B, 27 by way of carriages 114, 214 (FIG. 9A), respectively, using techniques known to those skilled in the art for securing a large and/or heavy payload (or any payload for that matter, regardless of size or weight) to a truss, rail, or other structure. In other words, each fixture 112, 212 can be removably coupled to the one or more support structures 23A, 23B, 27 with a single translational degree of freedom. For example, the carriages 114, 214 can include a plurality of wheels 114w that can roll or slide along the rail(s) of the support structures 23A, 23B, 27 to selectively move the payload-receiving fixture 112, 212. The wheels 114w can be locked relative to the support structures 23A, 23B, 27 such that the payload-receiving fixture 112, 212 and the blades 11A, 11B or other cargo received therein can be held stationary or fixed relative to the support structures. Further, while the illustrated embodiment provides for two wind turbine blades, any number of wind turbine blades can be used in conjunction with the present disclosure, including but not limited to one blade, three blades, four blades, five blades, six blades, seven blades, eight blades, etc. As more blades are added, the size and weight of the payload may increase and/or the size of the blades may be reduced and/or the size of a cargo bay in which the blades are to be transported may be changed and/or a size of a transport vehicle or system may be changed accordingly.

Additional details about payload-receiving fixtures are provided in commonly-owned International Patent Application No. PCT/US20/49782, filed on Sep. 8, 2020, entitled "SYSTEMS, METHODS, AND VEHICLES FOR TRANSPORTING LARGE CARGO ONTO AND OFF A TRANSPORT VEHICLE," the content of which is incorporated by reference herein in its entirety.

Loading and Unloading Large Cargo Utilizing a Curved Path

An irregular payload can present unique challenges when loading or unloading the payload into or out of a cargo bay of an aircraft. For example, as an irregular payload is moved from the forward end of the cargo bay into the aft end of the cargo bay the payload can tend to ride up or rise vertically as the payload is moved through the kinked portion of the cargo bay. One way to accommodate such motion can be use one or more payload-receiving fixtures that can be powered or actuated to raise with the natural rise of the cargo. Such powered payload-receiving fixtures, however, can require a great amount of energy and an increase in size and weight of the payload-receiving fixture itself. Systems and methods of the present disclosure provide for loading and unloading the payload along a curved path such that the payload can move through the cargo bay without requiring adjustment of the payload-receiving fixtures. Accordingly, the size and weight of the payload-receiving fixtures can be minimized, and energy expenditure lowered during the loading and unloading process. One non-limiting embodiment of preparing and loading a cargo package onto a cargo aircraft utilizing a curved path in accordance with the present disclosure is described with respect to FIGS. 9A-10L.

Assembling a Cargo Payload Package

FIGS. 9A-9I illustrate one embodiment of a method of assembling a cargo package or payload 10 in accordance with the present disclosure, e.g., in preparation for loading onto a cargo aircraft. In the illustrated embodiment, the payload 10 includes two turbine blades 11A, 11B, however, the present disclosure is by no means limited to such components. FIG. 9A shows a transport vehicle 20 prepared to receive a payload 10 (see FIG. 9B) for loading into a cargo aircraft, as described above. The transport vehicle 20 can include transporters 22 and trusses 24 extending between the transporters. A forward support structure 23A and a ground support structure 23B can be locked or otherwise secured to the transport vehicle 20, for example, by locking a lower end $23A_L$, $23B_L$ of each support structure to one or more rails 24A, 24B (see FIG. 6B) of the transport vehicle 20.

A plurality of payload-receiving fixtures 212A, 212B, 112A, 112B can be placed on the support structures 23A, 23B and locked or otherwise secured to restrain relative movement between the payload-receiving fixtures and the support structures. In the illustrated embodiment, the plurality of payload-receiving fixtures can include two root payload-receiving fixtures 212A, 212B and two mid-span payload-receiving fixtures 112A, 112B. With respect to the mid-span payload receiving fixtures 112A, 112B, the lower components $112A_L$, $112B_L$ of each mid-span fixture can be present and secured to the forward support structure 23A and ground support structure 23B, respectively, as shown in the configuration of FIG. 9I, i.e., prior to placement of the turbine blades 11A, 11B within the payload-receiving fixtures. The mid-fixture component $112A_M$, $112B_M$ and upper-fixture components $112A_U$, $112B_U$ can be assembled at later steps in the illustrated embodiment. The number, type, and placement of payload-receiving fixtures can vary based on, for example, physical characteristics and handling requirements of a particular cargo. A variety of different payload-receiving fixtures, provided for herein, disclosed in other commonly-owned applications, and/or known to those skilled in the art can be used in conjunction with present disclosures.

With the payload-receiving fixtures 112A, 112B, 212A, 212B locked to the support structures 23A, 23B, and the support structures 23A, 23B locked to the transport vehicle 20, a turbine blade 11A can be placed within the payload-receiving fixtures as shown in FIG. 9B. It will be appreciated that the discussion pertaining to assembly of the cargo package set forth herein can be applied to instances in which the payload-receiving fixtures and support structures are located remotely from the transport vehicle. In such cases, the support structures, with the payload assembled and coupled thereto, can be moved as a single unit and loaded onto the transport vehicle. The turbine blade 11A can be lowered into one or more of the payload-receiving fixtures 112A, 112B, 212A, 212B, for example by one or more cranes 300A, 300B or other appropriate means, and secured within the one or more payload-receiving fixtures. For example, a root of the blade 11A can be secured to the root payload-receiving fixture 212A that is coupled and secured to the forward support structure 23A, as shown in FIGS. 9B and 9C. The root of the blade 11A can be secured with respect to the root payload-receiving fixture 212A using any techniques known to those skilled in the art, such as passing fasteners (e.g., screws) into and through pre-formed holes disposed around an opening of the fixture 212A that receives the root of the blade 11A. The turbine blade 11A can extend through and be secured to at least one of mid-span payload-receiving fixtures 112A, 112B. The turbine blade 11A can extend through and be secured to at least the mid-span payload-receiving fixture 112B that is coupled and secured to the ground support structure 23B. The embodiment of the cargo package assembly process illustrated in FIGS. 9A-9I can utilize two cranes 300A, 300B to perform various steps as described herein. In some figures, only one crane is shown for sake of simplicity, and one skilled in the art will appreciate that the second crane may remain present and may operate in a similar fashion. Any number of cranes can be used and re-used through the cargo package assembly process, including a different crane for each loading step or the same crane across multiple steps.

Figure 9D:
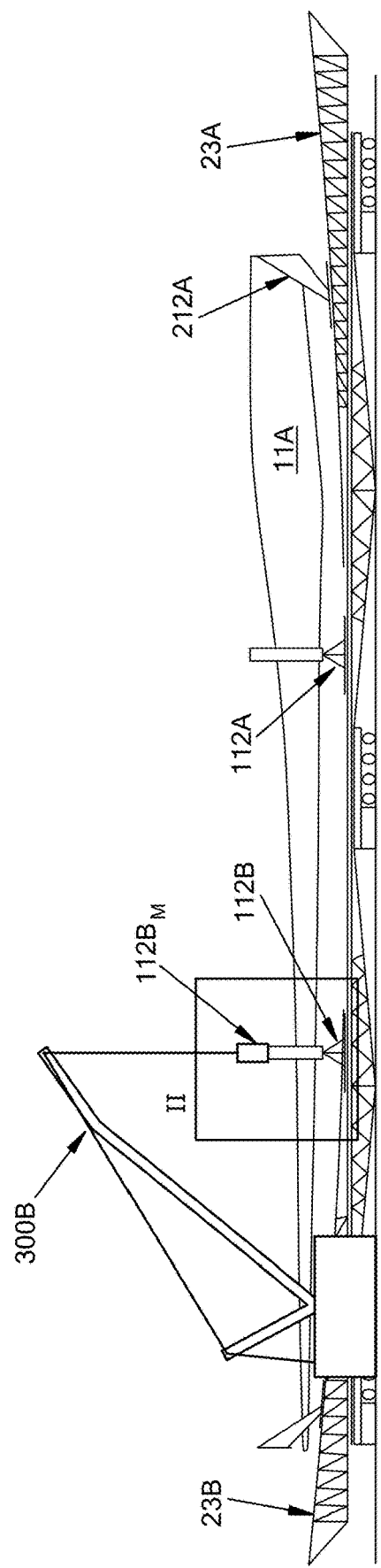
FIG. 9D is a schematic illustration of one of the cranes of FIG. 9B lowering a middle-component of a mid-span payload receiving fixture to become part of the payload package of FIG. 9B.
Figure 9E:
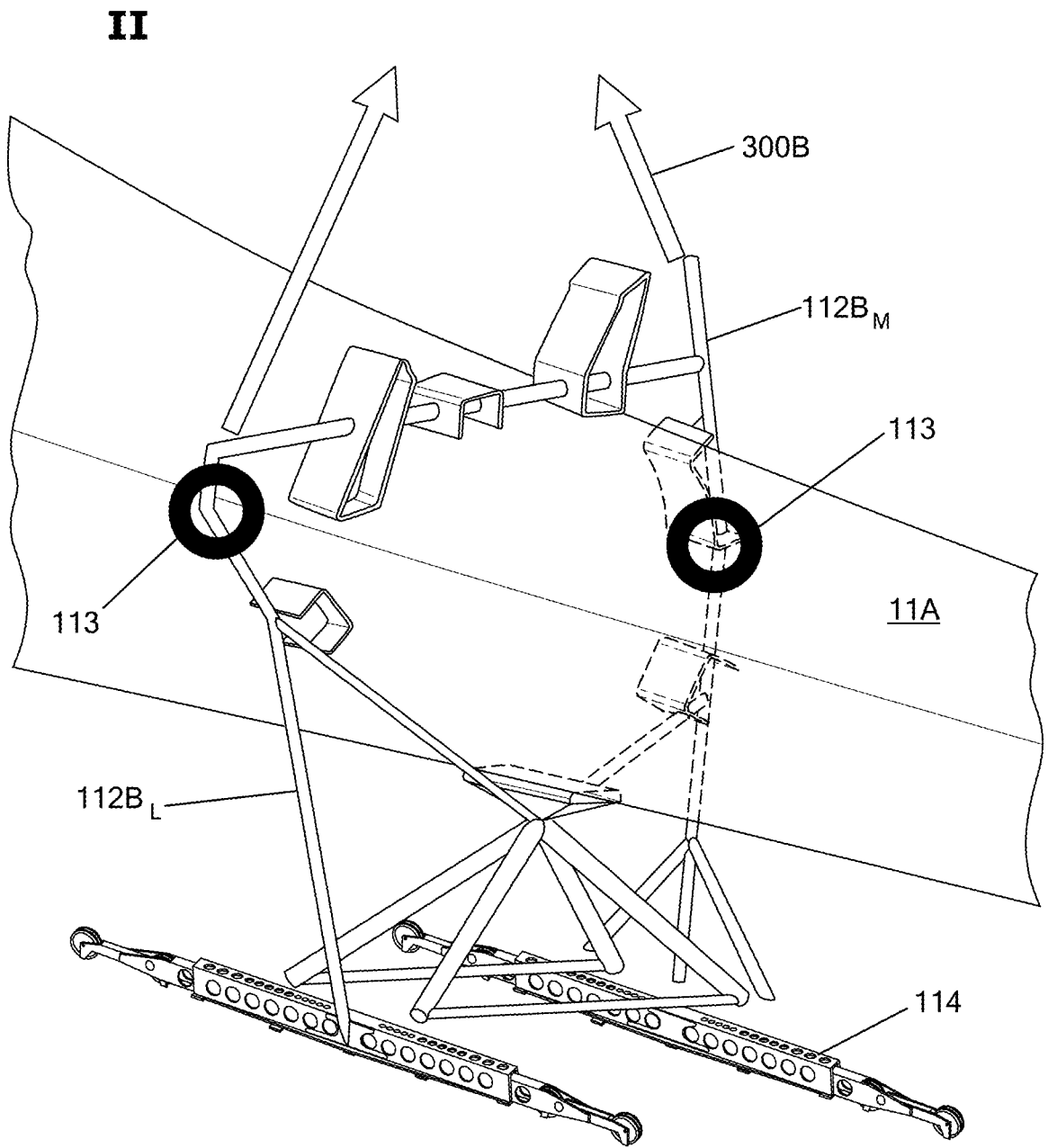
FIG. 9E is an enlarged and detailed isometric view of the crane lowering the middle-component of the mid-span payload receiving fixture as shown in Box II of FIG. 9D.

As shown in FIGS. 9D and 9E, the mid-fixture component 112B$_M$ of the mid-span payload-receiving fixture 112B can be connected to the lower-fixture component 112B$_L$ to secure the turbine blade 11A received within the lower-fixture component. For example, the mid-fixture component 112B$_M$ can be lowered towards the blade 11A and lower-fixture component 112B$_L$ and secured thereto. FIG. 9E shows in greater detail the mid-fixture component 112B$_M$ lowered in by the crane 300B such that the mid-fixture component is located above the turbine blade 11A in alignment with the lower-fixture component 112B$_L$. The mid-fixture component 112B$_M$ can couple to the lower-fixture component 112B$_L$, for example at coupling locations 113 located on either side of the turbine blade 11A, such that the turbine blade 11A is held securely within the mid-span payload-receiving fixture 112B between the lower-fixture component 112B$_L$ and the mid-fixture component 112B$_M$.

Figure 9F:
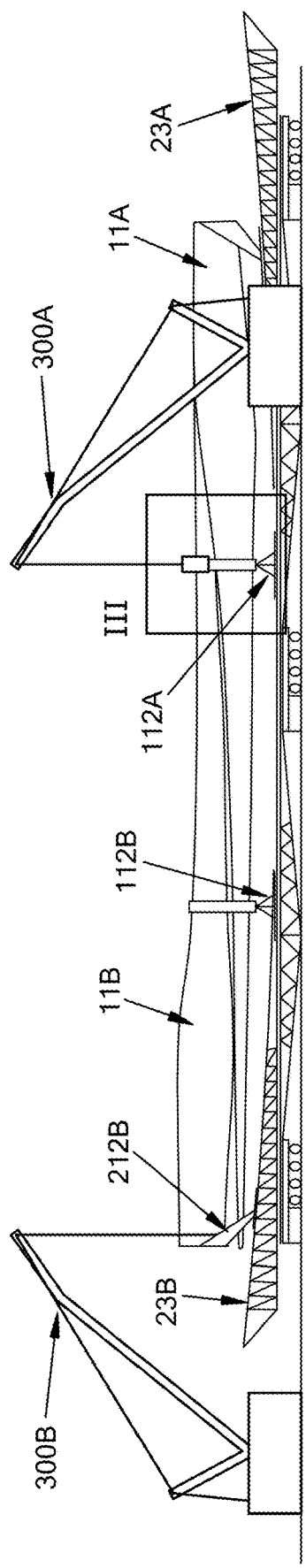
FIG. 9F is a schematic illustration of the two cranes of FIG. 9B lowering a second turbine blade for assembly of a payload package.
Figure 9G:
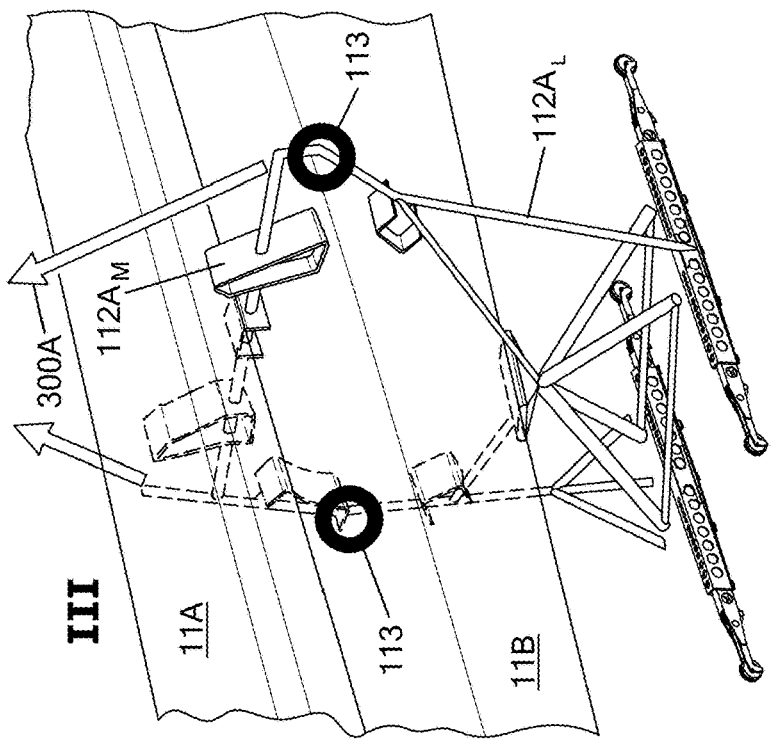
FIG. 9G is an enlarged and detailed isometric view of the mid-span payload-receiving fixture of FIG. 9C with the second turbine blade received therein as shown in Box III of FIG. 9F.
Figure 9H:
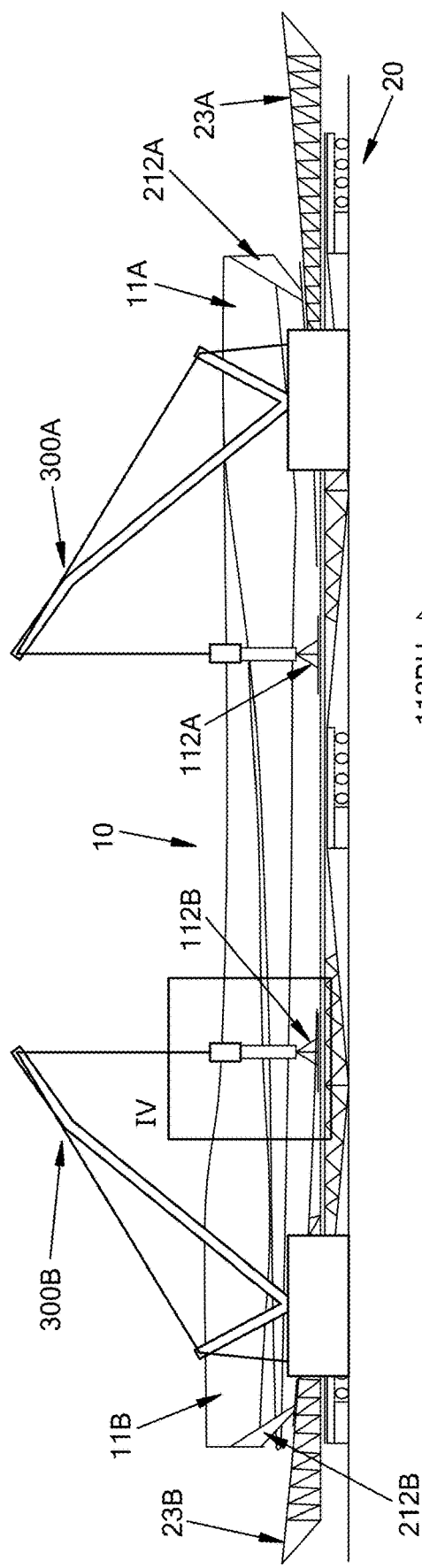
FIG. 9H is a schematic illustration of the two cranes of FIG. 9F lowering upper components of two mid-span payload receiving fixtures.
Figure 9I:
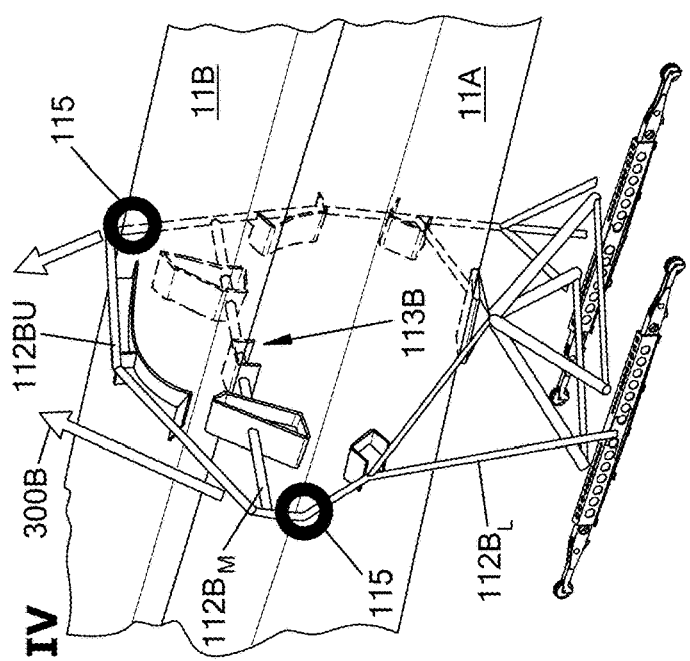
FIG. 9I is an enlarged and detailed isometric view of one of the two cranes lowering one of the two upper components of the mid-span payload receiving feature of FIG. 9D, as shown in Box IV of FIG. 9H.

A similar series of steps can be performed to assemble the second turbine blade 11B to be part of the payload 10 and load the payload 10 onto the transport vehicle 20. As shown in FIG. 9F, the second turbine blade 11B can be lowered by the cranes 300A, 300B and placed within one or more of the payload-receiving fixtures. In the illustrated embodiment, a root of the turbine blade 11B can be placed within the root payload-receiving fixture 212B secured to the ground support structure 23B. The root of the turbine blade 11B can be secured therein. A portion of the turbine blade 11B can also be received within the mid-span payload receiving fixtures 112A, 112B. For example, the turbine blade 11B can be lowered or otherwise placed on the lower-fixture component 112A$_L$ of the mid-span payload receiving fixture 112A secured to the forward support structure 23A (see FIG. 9G), and can be lowered or otherwise placed on the mid-fixture component 112B$_M$ of the payload-receiving fixture 112B secured to the ground support structure 23B (see FIG. 9I). As described above with respect to FIGS. 9D and 9E, the mid-fixture component 112A$_M$ of the payload-receiving fixture 112 can be lowered and secured to the lower-fixture component 112A$_L$ such that the turbine blade 11B is received therebetween. The upper-fixture components 112A$_U$, 112B$_U$ for each of the mid-span payload receiving fixtures 112A, 112B can be lowered onto the mid-fixture components 112A$_M$, 112B$_M$, e.g., by the cranes 300A, 300B, as shown in FIG. 9H. FIG. 9I illustrates in greater detail the mid-span payload-receiving fixture 112B that is secured to the ground support structure 23B (not shown in FIG. 9I for illustrative purposes). More particularly, the crane 300B can lower the upper-fixture component 112B$_U$ such that the turbine blade 11B is located between the upper-fixture component 112B$_U$ and the mid-fixture components 112B$_M$ of the payload-receiving fixture 112B. The upper-fixture component 112B$_U$ can be coupled to the mid-fixture component 112B$_M$ at one or more coupling locations 115 such that the turbine blade 11B is securely received therebetween. While not shown, a similar process can be applied to the mid-span payload-receiving fixture 112A that is secured to the forward support structure 23A. In this manner, the turbine blades 11A, 11B can be securely received within the payload-receiving fixtures 112A, 112B, 212A, 212B and coupled to the support structures 23A, 23B and thus, the transport vehicle 20. The cranes 300A, 300B can be retracted or otherwise moved away from the payload package 10, which in this illustrated embodiment includes the turbine blades 11A, 11B and the payload-receiving fixtures 112A, 112B, 212A, 212B, support structures 23A, 23B, transport vehicle 10 such that the assembled payload package is ready for transport to an aircraft for loading (see FIG. 6A).

Loading a Payload into a Cargo Bay Utilizing a Curved Path

In general terms, loading a payload 10 onto a cargo aircraft 100 in accordance with the present disclosure can include an initial "slide-aboard" or translation phase of the payload 10 into the forward end 120 of the aircraft 100, and subsequent aft movement of the payload 10 along a curved path into the aft portion 170a of the cargo bay. The slide-aboard phase can include translating the forward support structure 23A into the forward portion 170f of the cargo bay, either prior to or concurrent with translation of the payload 10, and into alignment with the aft support structure 27 disposed within the aft portion 170a of the cargo bay. As discussed above, the forward and aft support structures 23A, 27 can form a path along which the payload can move in the aft direction in an arc-like motion, i.e., rotating about a center point of an arc while concurrently moving aft within the cargo bay 170. With the curved path formed, e.g., by rails 29, 31 of the forward and aft support structures 23A, 27, the payload can be moved aft-ward from the forward portion 170f, through the kinked portion 170k, and into the aft portion 170a of the cargo bay to a final fully-loaded position. Notably, movement of the payload 10 along the curved path into the aft bay 170a can change an attitude of the payload relative to the bottom contact surface 172 of the cargo bay, such that a distal end 10d of the payload 10 approaches the bottom contact surface of the aft bay 170a of the cargo bay as the payload 10 moves in the aft direction beyond the kinked bay 170k. In this manner, a vertical distance, or height, that the payload 10 extends above the bottom contact surface 172 in the aft portion 170a of the cargo bay can be reduced as compared to a purely linear movement of the payload into the aft bay.

FIGS. 10A-10L illustrate one embodiment of loading a large cargo, e.g., the payload package 10 assembled as described above, onto the cargo aircraft 100. Components of FIGS. 10A-10L can have the same or similar features of the like-numbered components described in detail above. Accordingly, description of the structure, operation, and use of such features and/or components are omitted herein for the sake of brevity. It will be appreciated that FIGS. 10A-10L illustrate but one possible method of loading the large cargo in accordance with the present disclosure and variations thereon are within the scope of the present disclosure. For example, while certain cable and pulley configurations and steps are described below in connection with loading the payload 10, alternative mechanisms, components, and steps may be used to move a payload through a curved path (e.g., a curved path formed by rails 29, 31 of support structures 23A, 27) in accordance with the present disclosure.

Figure 10A:
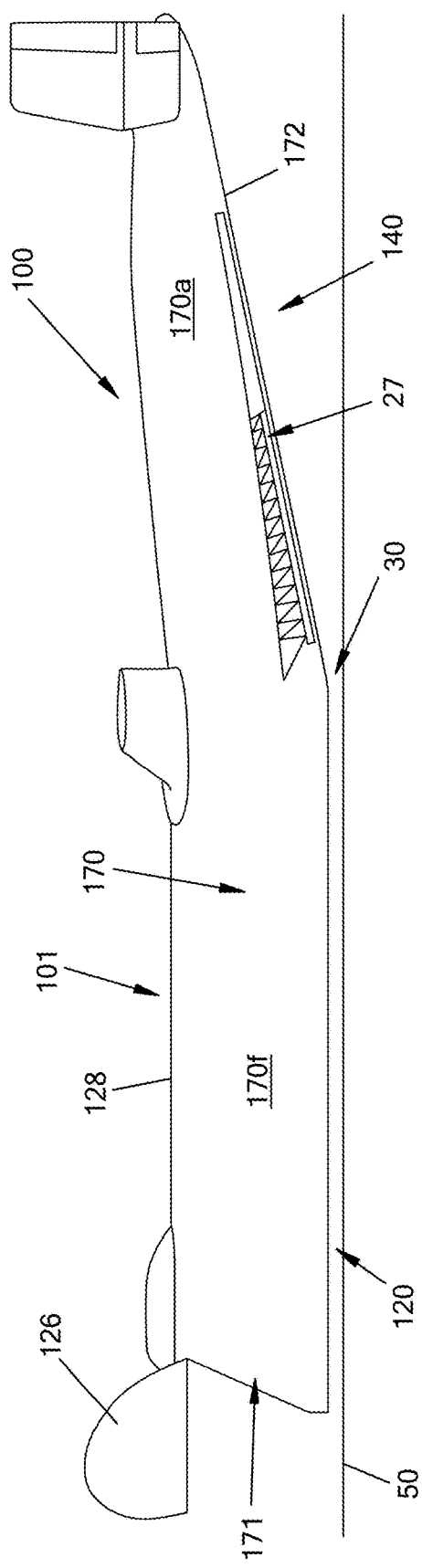
FIG. 10A is a side, partial cross-sectional view of the aircraft of FIG. 1C, the fuselage of the aircraft being illustrated in cross-sectional view, with an aft support structure disposed within an aft portion of the interior cargo bay.

FIG. 10A illustrates the cargo aircraft 100, in a simplified manner for purposes of clarity, in a cargo-loading ready position. More particularly, the cargo aircraft 100 can be opened, such as by swinging the cargo nose door 126 upwards into its open position, exposing the portion of the interior cargo bay 170 associated with the fixed portion 128 of the fuselage 101, which can extend from the forward end 120, through the kinked portion 130, and through essentially the entirety of the aft end 140 of the aircraft. The cargo opening 171 provides access to the interior cargo bay 170. It will be appreciated that various components of the aircraft 100, such as wheels, landing gear, etc. are not shown in FIG. 10A, or FIGS. 10B-10L, for purposes of clarity of the illustration. Such components can be seen elsewhere in the figure set, for example, in FIGS. 1A-1C, and/or are understood to exist in their typical locations on aircrafts by those skilled in the art. The aft support structure 27 can be disposed within the aft portion 170*a* of the cargo bay and secured therein such that the aft support structure 27 is stationary relative to the bottom contact surface 172 of the cargo bay 170.

Figure 10B:
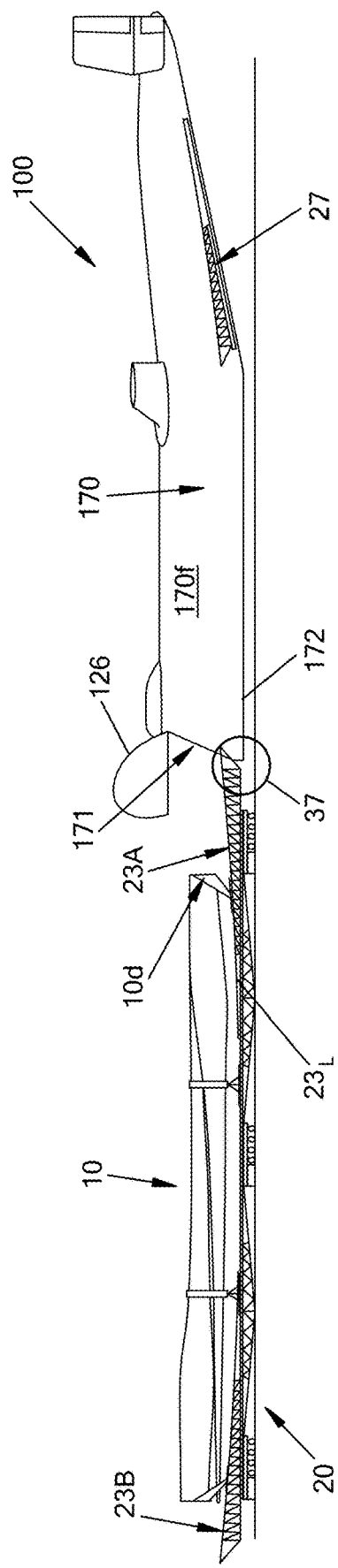
FIG. 10B is the side, partial cross-sectional view of the aircraft of FIG. 10A with the ground support structure, the forward support structure, and the payload coupled to the transport vehicle of FIG. 6A disposed proximal to the aircraft.

As shown in FIG. 10B, the transport vehicle 20, and thus the payload 10 and support structures 23A, 23B secured thereto, can be driven or otherwise moved into alignment with the forward end 120 of the aircraft 100 such that the forward support structure 23A and the payload 10 secured thereto can be moved into the forward portion 170*f* of the cargo bay 10. For example, transport vehicle 20 can be docked to the aircraft 100, such as by locking or otherwise securing the transport vehicle at the cargo opening 171, as generally illustrated in FIG. 10B within the circle 37, such that the forward support structure 23A and the payload 10 can pass through the cargo opening 171 and into the forward portion 170*f* of the cargo bay, e.g., by aligning the lower end 23$_L$ of the forward support structure 23A with the bottom contact surface 172 of the cargo bay and/or one or more base rails associated with the bottom contact surface.

FIG. 10C1 schematically illustrates one embodiment of a set-up that can be utilized with the present disclosure to load the payload 10 into the cargo aircraft 100. More particularly, the set-up of FIG. 10C1 can be used to accomplish the initial linear translation (as shown, left-to-right) of the forward support structure 23A and payload 10 into the forward bay portion 170*f* of the cargo bay 170 and subsequent movement of the payload 10 aft-ward along the curved path, as described below. The system illustrated in FIGS. 10C1 and FIG. 10C2 includes a flyaway cable 39, a winch cable 41, a turnaround pulley 43, and a winch spool 45. The flyaway cable 39 can be connected to one of the plurality of payload-receiving fixtures 112A, 112B, 212A, 212B. For example, a first terminal end 39A of the flyaway cable 39 can be connected to the payload-receiving fixture coupled to the forward support structure 23A located closest to the cargo opening 171, in this case the root payload-receiving fixture 212A. The flyaway cable 39 can maintain this connection point throughout the entirety of the loading process, i.e., during both translation of the payload 10 and support structures 23A, 23B and subsequent movement of the payload 10 along the curved path. In other embodiments, the first terminal end 39A of the flyaway cable can be connected directly to the forward support structure 23A, however such a configuration may require disconnecting the first terminal end of the cable once the forward support structure 23A is secured within the forward portion 170*f* of the cargo bay and re-connecting the cable to the payload 10.

The flyaway cable 39 can extend from the first terminal end 39A, through substantially the entirety of the cargo bay 170, through the turnaround pulley 43 located in the aft portion 170*a* of the cargo bay, and to a second terminal end 39B. In some embodiments, the turnaround pulley 43 can be coupled to a structural component of the aircraft 100, for example one or more base rails that can extend along at least a portion of the bottom contact surface 172 of the cargo bay 170, such that a reaction force from the turnaround pulley 43 can be distributed by the structural component. A portion of the flyaway cable 39 that extends between the first terminal end 39A and the turnaround pulley 43 can be referred to as an "upper portion" while a portion of the flyaway cable 39 that extends between the turnaround pulley 43 and the second terminal end 39B can be referred to as a "lower portion." The flyaway cable 39 can be connected to the winch cable 41 at a connection point 42. In the illustrated embodiment the connection point of the flyaway cable 39 to the winch cable 41 occurs within the interior cargo bay 170 and, more particularly, in the forward portion 170*f* of the cargo bay. In other embodiments, the connection location of the flyaway cable 39 to the winch cable 41 and the lengths of the cables themselves can vary based, at least in part, on dimensions of the payload 10, aircraft 100, and operational handling requirements. The winch cable 41 can extend from the connection point with the flyaway cable 39 to the spool 45. The spool 45 can be located towards the terminal end of the transport vehicle 20 that is furthest away from the aircraft 100. With the cables attached, the spool 45 can be rotated to take up excess slack from the flyaway and winch cables 39, 41. Rotating the spool 45 to take up excess slack, e.g., in the clockwise direction, can draw the winch cable 41 away from the aircraft 100 and into the spool 45 such that the flyaway cable 39 is drawn taut with the upper portion of the flyaway cable moving aft towards the turnaround pulley 43 and the lower portion of the flyaway cable moving forwards towards the spool 45.

While only a single flyaway cable 39, turnaround pulley 43, and winch cable 41 are visible in the illustration of FIG. 10C1, some embodiments can include additional redundancy, i.e., support to provide additional force to move the payload 10. For example, FIG. 10C2 illustrates a schematic top-view of a cable set-up that can be used in connection with the present disclosure that includes a second flyaway cable 39', winch cable 41', and turnaround pulley 43', which can be connected in the manner described above in parallel with the first flyaway cable 39, winch cable 41, and turnaround pulley 43. A single winch spool 45 can be used to simultaneously take up or release slack across all of the cables. By way of non-limiting example, each cable 39, 39', 41, 41' can have a diameter of about 0.75 inches, a minimum strength of about 58,000 pounds, a margin of safety greater than about 2.5, a weight of about 0.13 pounds per foot, and less than about 1% stretch. Cable selection can be based, at least in part, on a maximum payload weight, desired factor of safety, and other factors that would be appreciated by a person skilled in the art in view of the present disclosures.

Figure 10D:
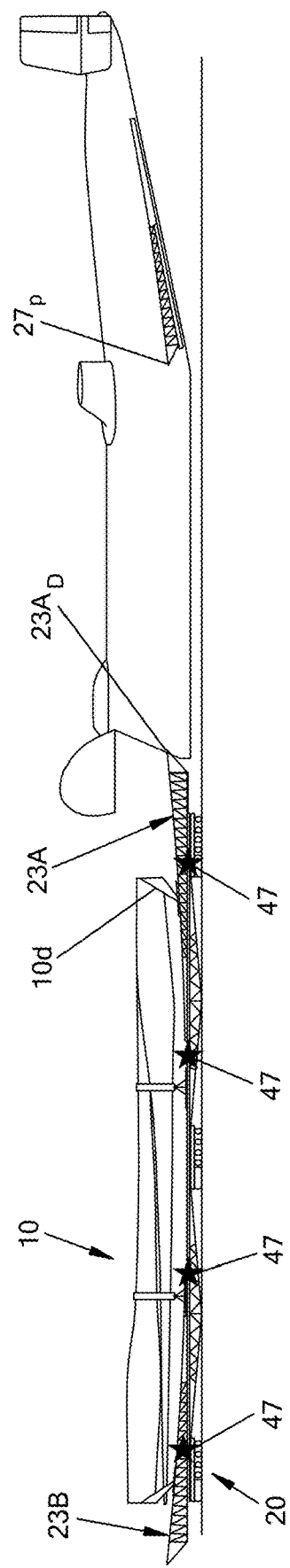
FIG. 10D is the side, partial cross-sectional view of the aircraft of FIG. 10C1 showing an action of unlocking the ground support structure and forward support structure from the transport vehicle.
Figure 10E:
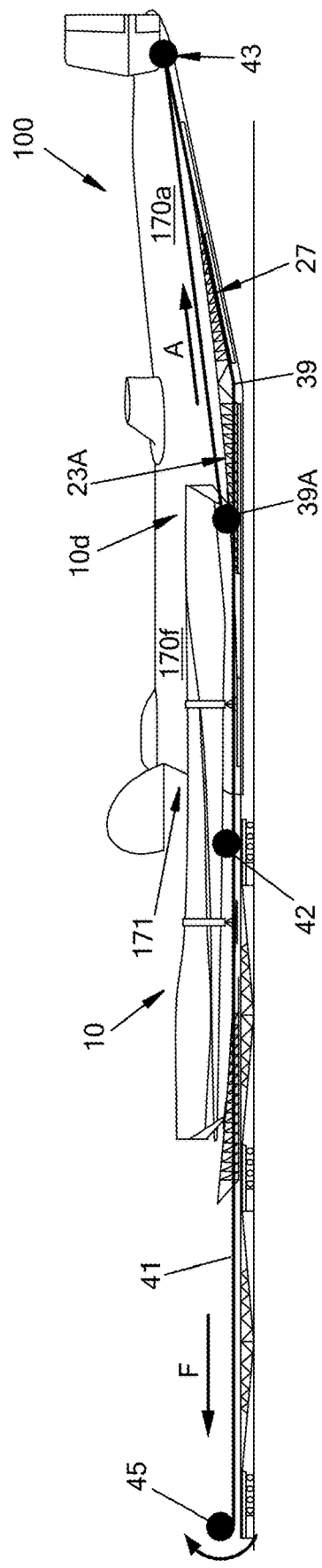
FIG. 10E is the side, partial cross-sectional view of the aircraft of FIG. 10D showing a snapshot of translating the payload and the forward support structure into the forward bay of the interior cargo bay.

With the set-up of FIG. 10C1 complete, the forward support structure 23A and ground support structure 23B can be placed in a configuration to allow relative movement between the support structures 23A, 23B and the transport vehicle 20, e.g., by unlocking the support structures 23A, 23B from the transport vehicle 20 at a plurality of connection points 47 as shown in FIG. 10D. It will be appreciated that while FIG. 10D does not show the cables, pulley(s), or spool described above in connection with FIGS. 10C1 and 10C2 (collectively referred to as a "winching system") for sake of simplicity of illustration, these components remain present. The distal end of the payload 10*d* and a distal end 23A$_D$ of the forward support structure 23A can remain exterior to the cargo bay 170. FIG. 10E illustrates a snapshot of the "slide-aboard" or translation phase of loading, which can be accomplished by winching or spooling the cables 39, 41. More particularly, the spool 45 can be driven or otherwise rotated to pull the winch cable 41 in the forward direction F, i.e., towards the spool 45 and away from the aircraft 100. This, in turn, pulls the lower portion of the flyaway cable 39 in the forward direction, drawing the upper portion of the flyaway cable in the aft direction A towards the turnaround pulley 43.

As the upper portion of the flyaway cable 39 is connected to the payload 10, which is secured to the forward and ground support structures 23A, 23B, the aft-ward force on the upper portion of the flyaway cable 39 causes the payload 10, and thus the first support structure 23A and ground support structure 23B, to move in the aft direction. More particularly, the first support structure 23A and ground support structure 23B can translate in the aft-direction, with the payload 10 coupled thereto, such that the first support structure 23A and the payload 10 pass through the cargo opening 171 and into the forward portion 170f of the cargo bay. The portion of the first support structure 23A that extends beyond the cargo opening 171 and into the cargo bay 170 can translate linearly along the bottom contact surface 172 of the cargo bay, e.g., by rolling, sliding, or otherwise moving along one or more base rails that can extend along the bottom contact surface. The portion of the first support structure 23A that remains external to the cargo bay 170 and the ground support structure 23B can translate linearly along the transport vehicle 20, e.g., by rolling, sliding, or otherwise moving along the one or more rails 24a, 24b of the vehicle. In this manner, the forward support structure 23A, and at least a portion of the payload 10, can move into the forward portion 170f of the cargo bay 170 by linearly translating through the cargo opening 171 of the aircraft 100. The payload 10 and forward support structure 23A can continue to be winched aboard the aircraft 100 by driving the spool 45 until the forward support structure 23A is aligned with the aft support structure 27 disposed within the aft portion 170a of the cargo bay. As noted above, such alignment can occur when the distal end $23A_D$ (see FIG. 10D) of the first support structure abuts, contacts, or is brought into close proximity to the proximal end $27_P$ (see FIG. 10D) of the aft support structure 27 to form a continuous, or substantially continuous, path along which the payload 10 can move without disruption. One or more rail segment $29_{FS}$, $31_{FS}$ of the forward support structure 23A can align with a counterpart one or more rail segment $29_{AS}$, $31_{AS}$ of the aft support structure 27 to form the continuous path 29, 31 (see FIG. 7E and FIG. 10F). In some embodiments, as illustrated in FIG. 10E, the connection point between the lower portion of the flyaway cable 39 and the winch cable 41 can be located exterior to the cargo bay 170, while in other embodiments the connection point may remain within the cargo bay.

FIG. 10F illustrates the action of immobilizing the forward support structure 23A and the ground support structure 23B. With the forward support structure 23A in alignment with the aft support structure 27, the forward support structure can be locked or otherwise secured within the forward portion 170f of the cargo bay 170. For example, the lower end $23A_L$ of the forward support structure 23A can be locked to the bottom contact surface 172 in the forward portion of the cargo bay 170 at a plurality of locations 49. The lower end $23B_L$ of the ground support structure 23B can be locked or otherwise secured to the transport vehicle 20 at a plurality of locations 51 if desired. Accordingly, the forward support structure 23A and ground support structure 23B can remain stationary relative to the cargo bay 170 and transport vehicle 20. FIG. 10G illustrates the action of mobilizing the payload 10 relative to the forward and ground support structures 23A, 23B such that the payload 10 can translate or move relative to the support structures. For example, the carriage 114 of each payload-receiving fixture 212A, 112A, 112B, 212B can be unlocked or otherwise maneuvered such that the wheels 114w of each carriage can move relative to the forward and ground support structures 23A, 23B. For illustrative purposes, FIGS. 10F and 10G do not show components of the winching system, however such components remain present during the illustrated steps of these figures.

Figure 10H:
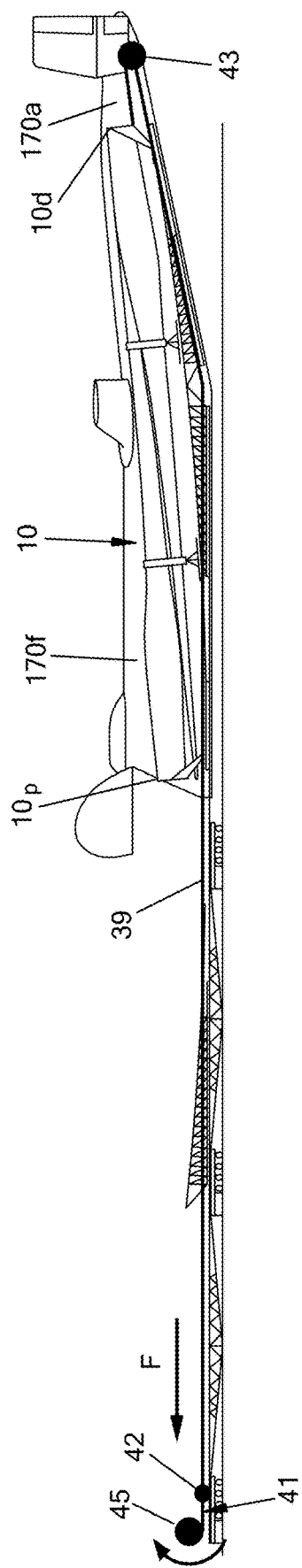
FIG. 10H is the side, partial cross-sectional view of the aircraft of FIG. 10G showing a snapshot of the payload disposed fully within the interior cargo bay.
Figure 10I:
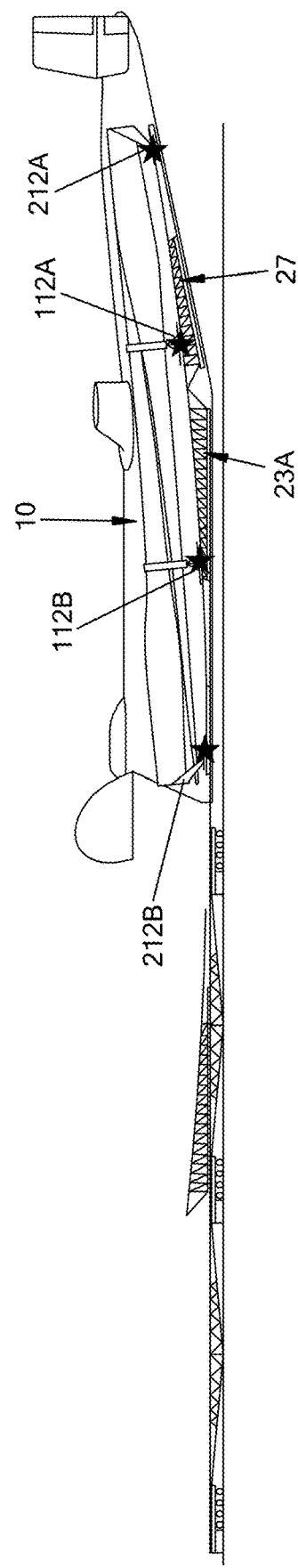
FIG. 10I is the side, partial cross-sectional view of the aircraft of FIG. 10H showing an action of locking the payload relative to the aft support structure and the forward support structure within the interior cargo bay.

The payload 10 can be further advanced into the cargo bay 170 by moving the payload aft-wards along the curved path formed by the forward and aft support structures 23A, 27. To this end, the spool 45 can be driven to pull the winch cable 41 and lower portion of the flyaway cable 39 into the spool, i.e., in the forward direction F, until the payload 10 is fully disposed in the cargo bay 170, as shown in FIG. 10H. As the winch cable 41 is pulled forward into the spool 45, the lower portion of the flyaway cable 39 and the connection point 42 between the winch cable and flyaway cable are pulled forward. This, in turn, pulls the payload 10 aft-ward as the upper portion of the flyaway cable moves through the turnaround pulley 43 such that the payload moves aft-ward along the curved path 29. As shown, the distal end 10d of the payload 10, along with two payload-receiving fixtures 212A, 112A, are disposed in the aft portion 170a of the cargo bay 170. The two payload-receiving fixtures 212A, 112A in the aft portion 170a of the cargo bay can be coupled to the aft support structure 27, e.g., the carriages 114 of these payload-receiving fixtures can be in contact with one or more rails $29_{AS}$, $31_{AS}$ of the aft support structure. The proximal end 10p of the payload 10, along with two payload-receiving fixtures 212B, 112B, are disposed in the forward portion 170f of the cargo bay 170. The two payload-receiving fixtures 212B, 112B in the forward portion 170f of the cargo bay can be coupled to the forward support structure 23A, e.g., the carriages 114 of these payload-receiving fixtures can be in contact with one or more rails $29_{FS}$, $31_{FS}$ of the forward support structure. With the payload 10 fully disposed within the cargo bay 170, the payload can be locked into or otherwise secured in place, as shown in FIG. 10I. For example, the carriages 114 of the each of the payload-receiving fixtures 112A, 112B, 212A, 212B can be locked to the respective forward or aft support structures 23A, 27 such that the payload 10 is held stationary with respect to the support structures and thus the cargo bay 170. Any number of locking mechanisms for securing the payload-receiving fixtures 112A, 112B, 212A, 212B with respect to the support structures 23A, 27 can be used, including the various locking mechanisms provided for herein or otherwise known to those skilled in the art.

Figure 10J:
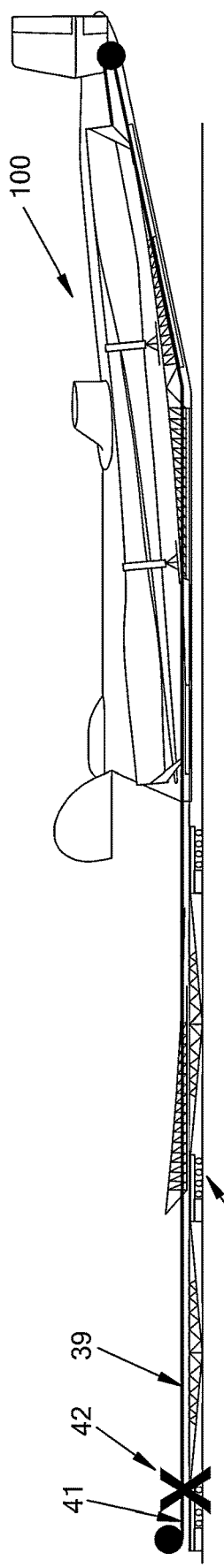
FIG. 10J is the side, partial cross-sectional view of the aircraft of FIG. 10I with a fly-away cable of the cargo-loading system disconnected from a winch cable of the cargo-loading system.
Figure 10K:
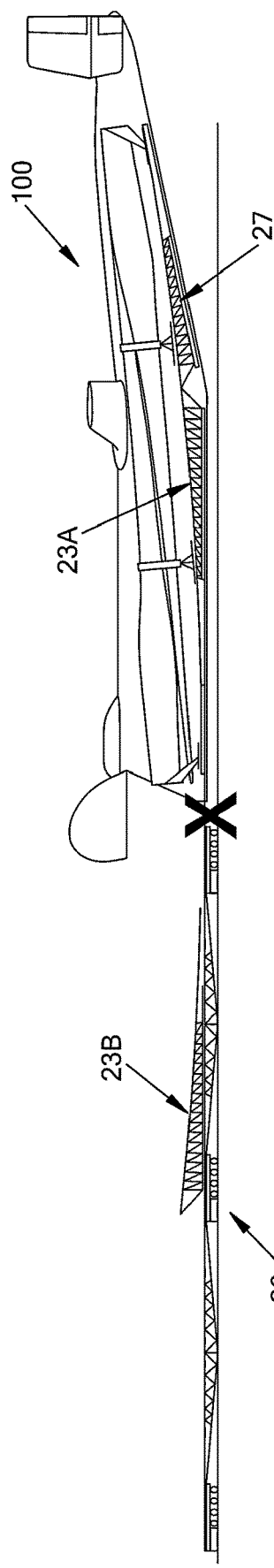
FIG. 10K is the side, partial cross-sectional view of the aircraft of FIG. 10J with the transport vehicle de-docking from the aircraft.
Figure 10L:
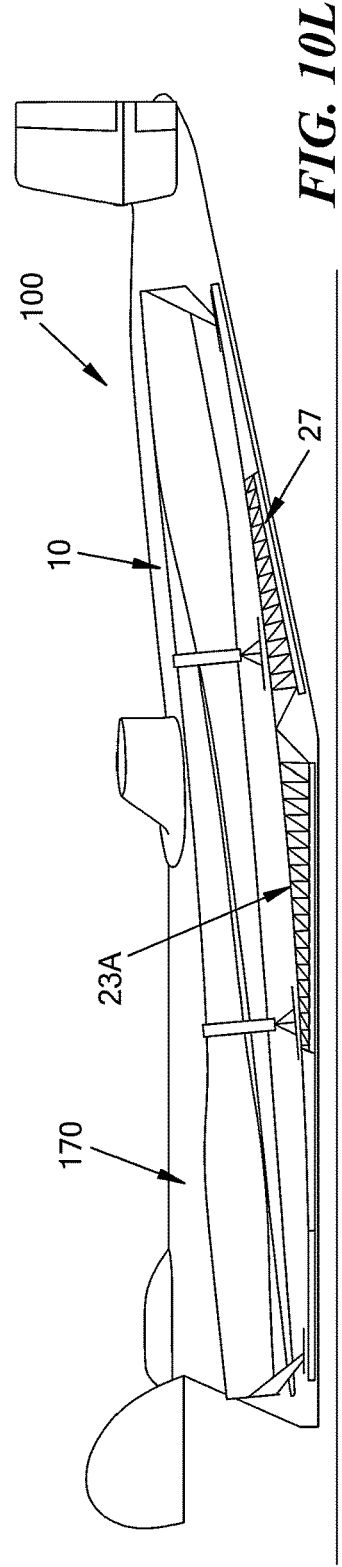
FIG. 10L is the side, partial cross-sectional view of the aircraft of FIG. 10K with the payload fully loaded and ready for transport.

With the payload 10 disposed and locked within the cargo bay 170, as shown in FIG. 10I, the flyaway cable 39 can be disconnected from the winch cable 41. For example, the cable joint 42 can be disconnected to release the flyaway cable 39 as shown in FIG. 10J. The winch cable 41 can remain wound around the spool 41. The flyaway cable 39 can then be secured and stored for flight. For example, the lower portion of the flyaway cable 39 can be secured to one or more structures disposed within the cargo bay using tiedowns or other similar locking devices, spooled or otherwise gathered for storage within the cargo bay 170, etc. The transport vehicle 20, with the ground support structure 23B coupled thereto, can be undocked from the aircraft 100 or otherwise placed in a mobile state (see FIG. 10K) and moved away from the aircraft 100 (see FIG. 10L). The payload 10 is now loaded into the cargo bay 170 of the cargo aircraft 100 for transport.

Once the payload 10 has been transported to its desired destination, it can be unloaded from the cargo bay 170. Unloading can be similar in many respects to loading, generally reversing the progression illustrated with respect to the loading process in FIGS. 10A-10L, and thus the details, and an illustrated step-through of the same, is unnecessary. Upon arrival the transport vehicle 20 can be docked to the aircraft 100, the flyaway cable 39 can be released and/or unspooled and the lower portion of the flyaway cable can be connected to the winch cable 41. The payload 10 can be unlocked from the forward and aft support structures 23A, 27 disposed within the cargo bay 170 and the payload 10 can be belayed out of the cargo bay 170 through the cargo opening 171 at the forward end 120 of the aircraft 100. The payload 10 can move forward along the curved path formed by the forward and aft trusses 23A, 27 under the force of the payload's own weight. The ground support structure 23B that is secured to the transport vehicle 20 just exterior to the cargo opening 171 can form a curved path with forward support structure 23A such that the payload 10 reaches a minimum energy state and comes to a stop with the proximal end 10p of the payload 10 located over the ground support structure 23B exterior to the cargo bay 170 while the distal end 10d of the payload is located over the forward support structure 23A in the forward portion 170f of the cargo bay. The payload 10 can be locked in place such that the payload is held stationary relative to the ground and forward support structures 23A, 23B while the winch cable 41 is disconnected from the lower portion of the flyaway cable 39. The winch cable 41, or a separate unloading winch cable, among other ways translation movement can be imparted on the payload 10, can then be connected to the forward-most payload-receiving fixture, in this case the root payload-receiving fixture 212B located over the ground support structure 23B, and the spool 45 can be driven to take up slack in the winch cable. The payload 10 can be unlocked from the ground and forward support structures 23B, 23A and the payload 10 can be winched forward to center or align the payload 10 between the ground support structure 23B and the forward support structure 23A. The payload 10 can then be locked to the ground and forward support structures 23A, 23B restricting relative movement therebetween. The ground and forward support structures 23B, 23A can be unlocked relative to the transport vehicle 20 and forward cargo bay 170f, respectively. The spool 45 can be driven to pull the winch cable or the unloading winch cable forward thereby causing the ground and forward support structures 23B, 23A to translate linearly in the forward direction until the support structures 23B, 23A are disposed on the transport vehicle 20. The ground and forward support structures 23B, 23A can be locked relative to the transport vehicle 20, the flyaway cable 39 and winch cable can be disconnected and secured, and the transport vehicle 20 can move away from the aircraft 100 with the payload 10 secured thereto.

After the transport vehicle 20 with the payload 10 is removed from the aircraft 100, the payload 10 can be disassembled. Disassembling the payload can be similar in many respects to assembling the payload, and thus the details and an illustrated step-through of the same is unnecessary. With the payload-receiving fixtures locked to the ground and forward support structures 23B, 23A and the ground and forward support structures locked to the transport vehicle 20, the upper-fixture components of the mid-span payload-receiving fixtures 112A, 112B can be craned off or otherwise removed from the turbine blades 11A, 11B. The upper turbine blade 11B can be craned off using, for example, the mid-component of one of the mid-span payload-receiving fixtures 112A, 112B. The remaining mid-fixture component of the other mid-span payload receiving fixture can also be removed. The lower turbine blade 11A can be craned off the payload-receiving fixtures, leaving the empty payload-receiving fixtures 212A, 212B, 112A, 112B coupled to the ground and forward support structures 23B, 23A on the transport vehicle 20. The disassembly process can generally be accomplished by reversing the progression illustrated with respect to the payload package assembly in FIGS. 9A-9I.

Figure 11:
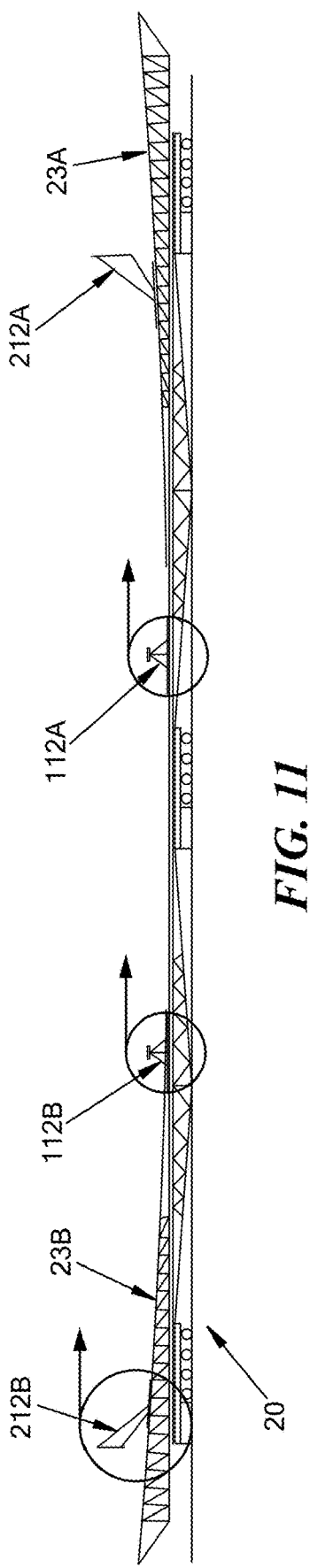
FIG. 11 is a schematic side view related to preparing the payload-receiving fixtures, ground support structure, and forward support structure of FIG. 6A for a backhaul flight.

Following disassembly of the payload package 10, the aircraft 100 can be prepared for a backhaul or return flight in which components of the above-described systems can be transported to a different location for future use and/or storage. FIG. 11 illustrates a backhaul preparation step following removal of the turbine blades 11A, 11B from the payload-receiving fixtures 212A, 112A, 112B, 212B. The empty payload-receiving fixtures 212A, 112A, 112B, 212B can be unlocked from the forward and ground support structures 23A, 23B and moved along the support structures towards the distal end 23A$_D$ of the forward support structure 23A such that each of the payload-receiving fixtures are coupled to the forward support structure. In some instances, one or more of the payload-receiving fixtures already coupled to the forward support structure as a result of the unloading process may not need to be adjusted or moved relative to the forward support structure to accommodate the remaining payload-receiving fixtures on the forward support structure, for example the root payload-receiving fixture 212A. The payload-receiving fixtures 212A, 112A, 112B, 212B can be locked or otherwise secured to the forward support structure 23A. The forward support structure 23A, along with the payload-receiving fixtures 212A, 112A, 112B, 212B, can then be loaded into the forward cargo bay 170f of the aircraft 100 and secured thereto for transport by the aircraft 100. In some embodiments, the forward support structure 23A can be loaded into the forward cargo bay 170f in a manner similar to that described above in connection with the loading of the payload 10. For example, the transport vehicle 20 can be docked to the forward end 120 of the aircraft 100 with the cargo door 126 in the open position providing access to the interior cargo bay 170 via the cargo opening 171. The forward support structure 23A can be then be translated into the forward cargo bay 170f, e.g., by winching the forward support structure into the cargo bay. To this end, the fly-away cable 39 can be connected at a first end to a payload-receiving fixture coupled to the forward support structure 23A or to the forward support structure itself. The fly-away cable can extend through the interior cargo bay 170, through the pulley 43 to connect to the winch cable 41. The forward and ground support structures 23A, 23B can be unlocked from the transport vehicle 20 and the winch spool 45 can be wound to pull the winch cable 41 and lower portion of the fly-away cable 39 away from the aircraft 100 into the spool, thereby winching or translating the forward support structure 23A into the forward cargo bay 170f. Once the forward support structure 23A is located fully within the forward cargo bay 170f, the forward support structure 23A can be secured to the bottom contact surface 172 of the cargo bay 170, the winch 41 and fly-away cables 39 disconnected and secured for flight. The transport vehicle 20, with the ground support structure 23B coupled thereto, can be disconnected or undocked from the aircraft 100 and moved away from the cargo opening 171.

Figure 12:
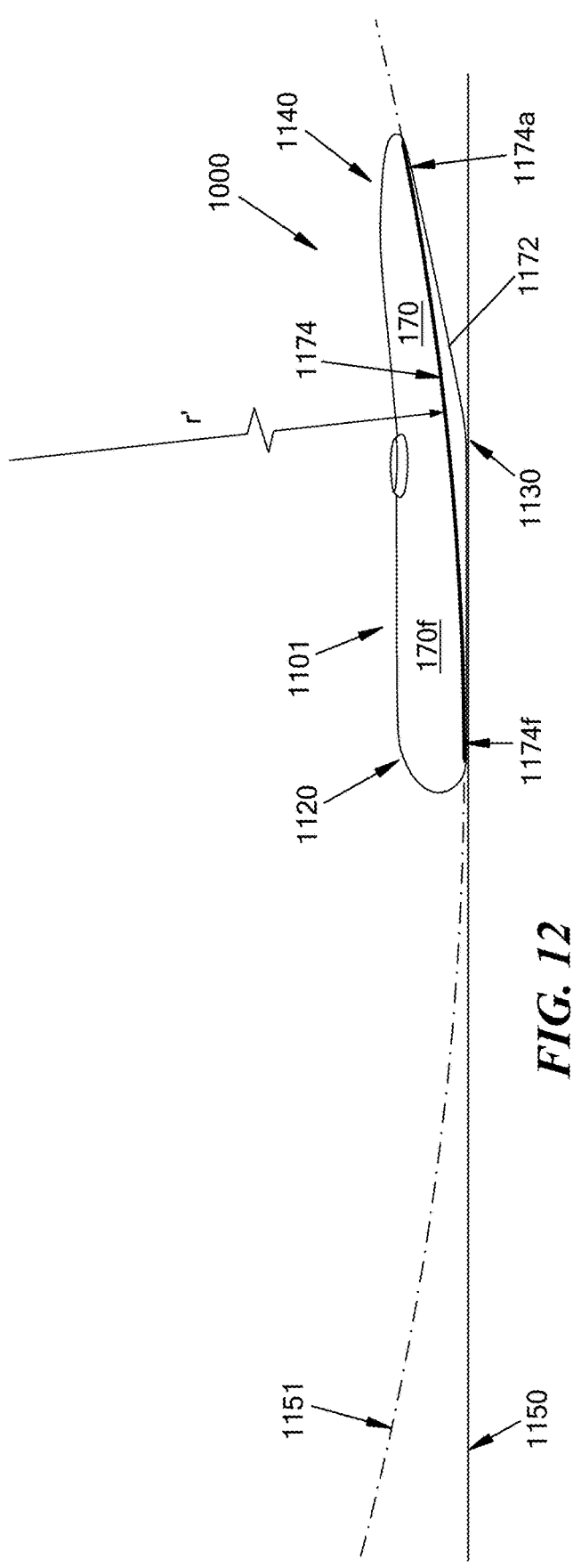
FIG. 12 is a schematic side view illustration of one embodiment of an aircraft having one or more curved base rails.

Additional Embodiments Utilizing a Curved Path for Loading and/or Unloading Cargo FIG. 12 shows a side view of an aircraft 1000 that, in many respects, can be similar or identical to the aircraft 100 described above with respect to FIGS. 1A-1C, with like-numbered components having generally the same features. It will be appreciated that various components of the aircraft 1000, such as wings, wheels, landing gear, etc. are not shown in FIG. 12. Such components can be seen elsewhere in the figure set, for example, in FIGS. 1A-1C, and/or are understood to exist in their typical locations on aircrafts by those skilled in the art. The aircraft 1000, and thus its fuselage 1101, includes a forward end 1120 and an aft end 1140, with a kinked portion 1130 connecting the forward end to the aft end. Accordingly, an interior cargo bay 1170 of the aircraft 1000 has a forward bay 1170*f*, a kinked bay 1170*k*, and an aft bay 1170*a*. In contrast to the above-described embodiments, however, the aircraft 1000 can include at least one curved base rail 1174 that can extend through substantially the entire length of the cargo bay 1170. The curved base rail 1174 can be defined by a first point of horizontal tangency 1174F in the forward bay 170*f* and a second point of horizontal tangency 1174A in the aft bay 170*a*. At these two points 1174*f*, 1174*a* the curved base rail 1174 can be tangent, or at least substantially tangent, to the bottom contact surface 1172 of the cargo bay 1170. In some embodiments, a radius r' can be approximately between about 800 feet to about 6000 feet, or more approximately between about 1200 feet to about 3000 feet, between about 1500 feet to about 2000 feet, between about 1600 feet to about 1700 feet, or between about 1630 feet to about 1680 feet, such as about 1678 feet. A payload 10, including, for example, turbine blades 11A, 11B and a plurality of payload-receiving fixtures 12, can slide along the curved base rail 1174 in an aft direction for loading and/or a forward direction for unloading. For example, the payload-receiving carriages 12 can include one or more wheels 114*w* that can align with and slide along the curved base rail 1174 such that the payload 10 moves along the curved path formed by the curved base rail 1174 during loading or unloading. The curved path can extend forward or proximal of the aircraft 1000, for example along one or more transport vehicles, support structures, or other ground handling equipment that can be used to place the payload 10 at a cargo opening (not shown in FIG. 12 as a nose cone 1126 of the aircraft 1000 is in the closed position) during loading or receive the payload at the cargo opening during unloading. As a result of the large radius of the curved path, the curved path can extend high above a ground surface 1150 forward of the aircraft 1000, as illustrated by arrow 1151 in FIG. 12. Accordingly, tall ground handling equipment may be required.

Figure 13:
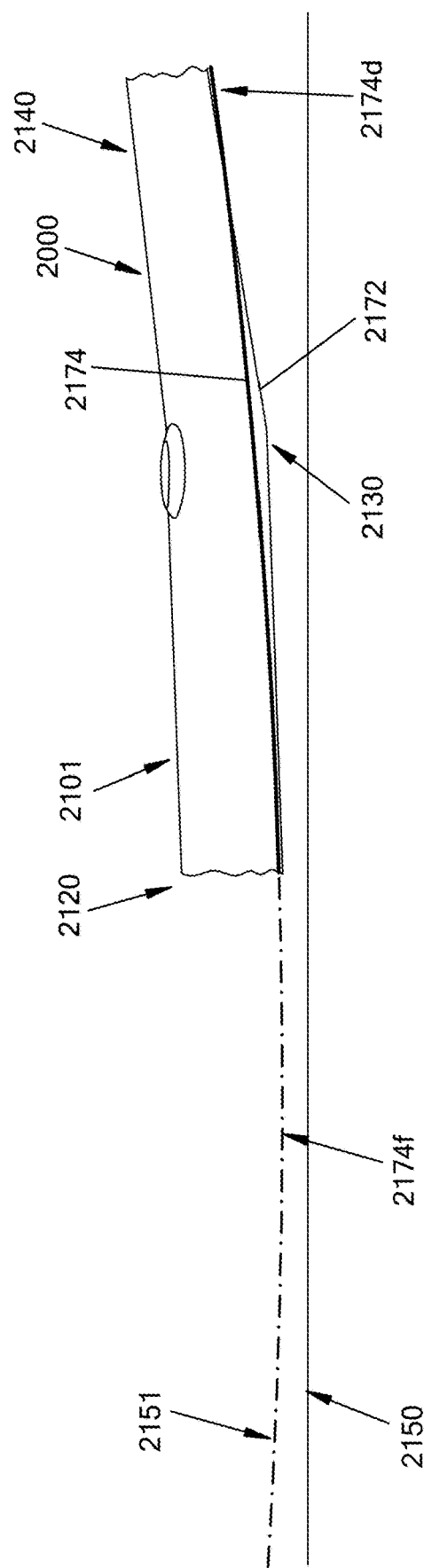
FIG. 13 is a schematic side view illustration of a partial fuselage of another embodiment of an aircraft having one or more curved base rails.

FIG. 13 illustrates another embodiment of an aircraft 2000 that can be used in connection with at least one curved base rail 2174 in a manner similar to that described above in connection with FIG. 12. The aircraft 2000 can be the nearly the same or identical to the aircraft 1000, with like-numbered components having generally similar features, except that the aircraft of FIG. 13 can have an inclined barrel, i.e., an inclined forward fuselage 2101. FIG. 13 shows a cross-sectional view of only a portion of the fuselage 2101 for illustrative purposes. It will be appreciated that various components of the aircraft 2000, such as wings, nose cone, wheels, landing gear, etc. are not shown in FIG. 12. Such components can be seen elsewhere in the figure set, for example, in FIGS. 1A-1C, and/or are understood to exist in their typical locations on aircrafts by those skilled in the art. The forward fuselage 2101 can have a constant, or substantially constant, cross-section that extends at a downward incline in the direction of the nose (not shown), i.e., towards the forward end 2120 of the aircraft 2000. In some embodiments the angle of inclination can be up to about six (6) degrees, up to about four (4) degrees, or up to about two (2) degrees, the latter of which is illustrated in FIG. 13. Angling the forward fuselage 2101 in this manner can shift a forward horizontal point of tangency 1174*f* of the curved path defined by the curved base rail 2174 forward of the nose of the aircraft 2000, i.e., at a point forward of and exterior to the aircraft. Nose-down inclination of the barrel can increase a radius of curvature of the curved path such that the amount that the curved path extends high above a ground surface 2150 forward of the aircraft 2000 can be reduced as compared to the embodiment described in connection with FIG. 12 (and as illustrated by the arrow 2151 in FIG. 13). For example, in some embodiments, the equivalent of the radius r' from FIG. 12 for the embodiment illustrated in FIG. 13 can be approximately between about 800 feet to about 6000 feet, or more approximately between about 1200 feet to about 3000 feet, between about 2000 feet to about 3000 feet, between about 2200 feet to about 2800 feet, or between about 2600 feet to about 2700 feet, such as about 2610 feet. In some embodiments, the curved base rail 2174 can have a minor deviation 2174D from a pure curved profile towards the aft end 2140 of the aircraft 2000, for example to aid in flattening curve. This may result in some cargo bending and/or utilizing a powered and/or adjustable payload-receiving fixture to account for the same (e.g., a fixture having a vertical stroke of approximately 2 feet).

Examples of the above-described embodiments can include the following:

1. A method of loading or unloading a payload into or out of a cargo aircraft, comprising:

when loading a payload into an interior cargo bay of a cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft begins to raise at an angle relative to a longitudinal-lateral plane of the cargo aircraft, advancing the payload towards the aft end of the cargo aircraft; and when unloading a payload out of the interior cargo bay of the cargo aircraft, advancing the payload towards the forward end of the cargo aircraft, wherein, whether loading or unloading, advancing the payload further comprises moving the payload along a curved path formed by at least one support structure disposed in the interior cargo bay of the cargo aircraft, the at least one support structure extending a varying vertical distance above a corresponding portion of a bottom contact surface of the interior cargo bay over a length of the at least one support structure.

2. The method of claim 1, wherein moving the payload along the curved path further comprises moving the payload such that a portion of the payload that extends beyond the kinked portion of the cargo bay and into the aft portion of the cargo bay remains a fixed radial height above the curved path.

3. The method of claim 1, wherein moving the payload along the curved path further comprises moving the payload such that the payload rotates about a center point of an arc while concurrently moving in the forward or aft direction 4. The method of claim 1 or 2, wherein the curved path is formed by at least one rail of the at least one support structure.

5. The method of claim 4, wherein the at least one rail comprises a plurality of linear rail segments extending at an angle relative to one another to approximate a curve.

6. The method of any of claims 1 to 5, wherein the payload comprises at least one payload-receiving fixture, and wherein moving the payload along the curved path further comprises coupling at least one payload-receiving fixture of the plurality of payload-receiving fixtures to the at least one support structure and advancing the at least one payload-receiving fixture along the curved path.

7. The method of any of claims 1 to 6, wherein the curved path extends from the forward bay portion through the kinked bay portion and into the aft bay portion.

8. The method of any of claims 1 to 7,
wherein the at least one support structure comprises a first support structure and a second support structure, and
wherein the curved path is formed by the first support structure fixed in the aft bay portion to the bottom contact surface of the interior cargo bay and the second support structure fixed in the forward bay portion to the bottom contact surface of the interior cargo bay.

9. The method of any of claims 1 to 8,
wherein the at least one support structure comprises a first support structure fixed in the aft bay portion to the bottom contact surface of the interior cargo bay and a second support structure, and
wherein the method further comprises:
when loading the payload into the interior cargo bay of the cargo aircraft, moving the second support structure from a position external of the cargo aircraft into the forward bay portion of the cargo bay and securing the second support structure in the forward bay portion to the bottom contact surface of the interior cargo bay; and
when unloading the payload from the interior cargo bay, unlocking the second support structure from the bottom contact surface of the interior cargo bay in the forward bay portion and moving the second support structure out of the forward bay portion to a position external of the cargo aircraft.

10. The method of claim 9, wherein moving the second support structure from the position external of the cargo aircraft into the forward bay portion of the cargo bay further comprises translating the second support structure from the position external of the cargo aircraft along a linear path into the forward bay portion of the cargo bay.

11. The method of any of claims 7 to 10, wherein the curved path is formed by at least one rail of the first support structure aligned with at least one rail of the second support structure.

12. The method of any of claims 1 to 11, wherein moving the payload along the curved path further comprises moving the payload through the kinked bay portion towards the aft end of the cargo aircraft such that a distal end of the payload raises relative to the longitudinal-lateral plane of the cargo aircraft.

13. The method of claim 12, further comprising moving the payload along the curved path until the distal end of the payload is received with a portion of the aft bay portion located within a fuselage tailcone of the cargo aircraft.

14. The method of any of claims 1 to 13, wherein moving the payload along the curved path further comprises moving the payload through the kinked bay portion towards the forward end of the cargo aircraft such that a distal end of the payload lowers relative to the longitudinal-lateral plane of the cargo aircraft.

15. The method of any of claims 1 to 14, wherein a length of the payload is at least about 65 meters.

16. The method of claim 15, wherein the length of the payload is at least about 75 meters.

17. The method of claim 16, wherein the length of the payload is at least about 85 meters.

18. The method of claim 17, wherein the length of the payload is at least about 100 meters.

19. The method of claim 18, wherein the length of the payload is at least about 120 meters.

20. The method of any of claims 1 to 19, wherein the payload comprises one or more components of a wind turbine such that the plurality of payload-receiving fixtures are configured to receive the one or more components of the wind turbine.

21. The method of any of claims 1 to 20,
wherein, when loading the payload into the interior cargo bay of the cargo aircraft, advancing the payload towards the aft end of the cargo aircraft further comprises passing the payload through an opening formed by opening a nose cargo door located in the forward end of the cargo aircraft, and
wherein, when unloading the payload out of the interior cargo bay of the cargo aircraft, advancing the payload towards the forward end of the cargo aircraft further comprises passing the payload to an environment outside the cargo aircraft through an opening formed by opening a nose cargo door located in the forward end of the cargo aircraft.

22. The method of any of claims 1 to 21, wherein a terminal end of one of the at least one support structure is disposed in the aft bay portion and located above a plane extending through a top surface of a fuselage of the cargo plane in which the interior cargo bay is disposed.

23. A method of loading a cargo aircraft, comprising:
translating a payload and a support structure to which the payload is removably coupled into an interior cargo bay of a cargo aircraft along a linear path;
de-coupling the payload from the support structure; and
moving the payload into an aft portion of the interior cargo bay along a curved path at least partially formed by the support structure such that as the payload proceeds in the aft direction, an aft portion of the payload approaches a bottom contact surface of the aft portion of the interior cargo bay.

24. The method of claim 23, further comprising:
securing the support structure to a bottom contact surface of a forward portion of the interior cargo bay such that the support structure is stationary within the forward portion of the cargo bay,
wherein a first portion of the curved path is formed by the support structure and a second portion of the curved path is formed by a second support structure disposed in the aft portion of the cargo bay.

25. The method of claim 24, wherein the payload comprises a plurality of payload-receiving fixtures, and moving the payload into the aft portion of the cargo bay along the curved path further comprises advancing at least one payload-receiving fixture of the plurality of payload-receiving fixtures along one or more rails of at least one of the support structure or the second support structure.

26. The method of claim 24 or 25, wherein securing the support structure to the bottom contact surface of the forward portion of the interior cargo bay further comprises securing the support structure to at least one base rail coupled to the bottom contact surface of the forward portion of the interior cargo bay.

27. The method of any of claims 23 to 26,
wherein the interior cargo bay further comprises a kinked bay portion disposed between the forward bay portion and the aft bay portion, the kinked bay portion defining a location at which the aft end of the cargo aircraft begins to raise relative to a longitudinal-lateral plane of the cargo aircraft, and
wherein moving the payload into the aft portion of the cargo bay further comprises moving the payload such that a portion of the payload that extends beyond the kinked portion of the cargo bay and into the aft portion of the cargo bay remains a fixed radial height above the curved path.

28. The method of any of claims 23 to 27, wherein a length of the payload is at least about 65 meters.

29. The method of claim 28, wherein the length of the payload is at least about 75 meters.

30. The method of claim 29, wherein the length of the payload is at least about 85 meters.

31. The method of claim 30, wherein the length of the payload is at least about 100 meters.

32. The method of claim 31, wherein the length of the payload is at least about 120 meters.

33. The method of any of claims 23 to 32, wherein the payload comprises one or more components of a wind turbine such that the plurality of payload-receiving fixtures are configured to receive the one or more components of the wind turbine.

34. The method of any of claims 23 to 33, wherein translating the payload and support structure into the interior cargo bay of the cargo aircraft further comprises passing the payload and the support structure through an opening formed by opening a nose cargo door located in the forward end of the cargo aircraft.

35. A system for at least one of loading a payload onto a cargo aircraft or unloading a payload from a cargo aircraft, comprising:

at least one rail disposed in an interior cargo bay of a cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft beings to raise relative to a longitudinal-lateral plane of the cargo aircraft such that an aft-most terminal end of the aft bay portion is disposed above the longitudinal-lateral plane of the cargo aircraft, wherein the at least one rail extends from the forward bay portion, through the kinked bay portion, and into the aft bay portion, and wherein a vertical distance above which the at least one rail extends from an interior bottom contact surface of the interior cargo bay varies along a length of the at least one rail.

36. The system of claim 35, wherein the vertical distance above which the at least one rail extends from the interior bottom contact surface of the interior cargo decreases in the aft direction from the kinked bay portion to the aft bay portion.

37. The system of one of claims 35 or 36, further comprising:

a first support structure coupled to the bottom contact surface of the cargo bay in the forward bay portion; and a second support structure coupled to the bottom contact surface of the cargo bay in the aft bay portion, wherein the first support structure includes a first portion of the at least one rail and the second support structure includes a second portion of the at least one rail.

38. The system of claim 37, wherein the first support structure is removably coupled to the bottom contact surface of the cargo plane.

39. The system of claim 37 or 38, further comprising:

one or more transport vehicles configured to move along a ground surface, wherein the first support structure is configured to be removably coupled to the one or more transport vehicles.

40. The system of any of claims 35 to 39, wherein the aft portion of the cargo bay extends at an angle relative to a forward portion of the cargo bay.

41. The system of any of claims 35 to 40, wherein the at least one rail comprises a plurality of linear rail segments extending at an angle relative to one another to approximate a curve.

42. The system of any of claims 35 to 41, wherein the at least one rail comprises at least two rails disposed approximately parallel to each other.

43. The system of any of claims 35 to 42, further comprising a payload configured to move along a curved path formed by the at least one rail such that an aft end of the payload is held within the aft bay portion.

44. The system of claim 43, wherein the payload is configured to move along the curved path formed by the at least one rail such that the aft end of the payload approaches the bottom contact surface in the aft bay portion.

45. The system of claim 43 or 44, wherein the payload comprises a plurality of payload-receiving fixtures configured to couple to the at least one rail such that the plurality of payload-receiving fixtures are configured to translate along a length of the at least one rail.

46. The system of any claim 43 or 44, wherein the payload further comprises one or more components of a wind turbine such that the plurality of payload-receiving fixtures are configured to receive the one or more components of the wind turbine.

47. The system of any of claims 35 to 46 wherein a length of the payload is at least about 65 meters.

48. The system of claim 47, wherein the length of the payload is at least about 75 meters.

49. The system of claim 48, wherein the length of the payload is at least about 85 meters.

50. The system of claim 49, wherein the length of the payload is at least about 100 meters.

51. The system of claim 50, wherein the length of the payload is at least about 120 meters.

52. The system of any of claims 35 to 51, wherein a terminal end of the at least one rail is disposed in the aft bay portion and located above a plane extending through a top surface of a fuselage of the cargo plane in which the interior cargo bay is disposed.

53. The system of any of claims 35 to 52, further comprising:

a cargo nose door configured to open a portion of the forward end of the cargo aircraft such that the forward bay portion is accessible from an outside environment when the cargo nose door is open.

What is claimed is:

1. A method of loading or unloading a payload into or out of a cargo aircraft, comprising:

when loading a payload into an interior cargo bay of the cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft begins to raise at an angle relative to a longitudinal-lateral plane of the cargo aircraft, advancing the payload towards the aft end of the cargo aircraft; and when unloading the payload out of the interior cargo bay of the cargo aircraft, advancing the payload towards the forward end of the cargo aircraft, wherein, whether loading or unloading, advancing the payload further comprises moving the payload along a curved path formed by at least one support structure disposed in the interior cargo bay of the cargo aircraft, the at least one support structure extending a varying vertical distance above a corresponding portion of a bottom contact surface of the interior cargo bay over a length of the at least one support structure.

2. The method of claim 1, wherein moving the payload along the curved path further comprises moving the payload such that a portion of the payload that extends beyond the kinked portion of the cargo bay and into the aft portion of the cargo bay remains a fixed radial height above the curved path.

3. The method of claim 1, wherein moving the payload along the curved path further comprises moving the payload such that the payload rotates about a center point of an arc while concurrently moving in the forward or aft direction.

4. The method of claim 1, wherein the curved path is formed by at least one rail of the at least one support structure.

5. The method of claim 4, wherein the at least one rail comprises a plurality of linear rail segments extending at an angle relative to one another to approximate a curve.

6. The method of claim 1,
wherein the payload comprises at least one payload-receiving fixture, and
wherein moving the payload along the curved path further comprises coupling the at least one payload-receiving fixture of a plurality of payload-receiving fixtures to the at least one support structure and advancing the at least one payload-receiving fixture along the curved path.

7. The method of claim 1, wherein the curved path extends from the forward bay portion through the kinked bay portion and into the aft bay portion.

8. The method of claim 1,
wherein the at least one support structure comprises a first support structure and a second support structure, and
wherein the curved path is formed by the first support structure fixed in the aft bay portion to the bottom contact surface of the interior cargo bay and the second support structure fixed in the forward bay portion to the bottom contact surface of the interior cargo bay.

9. The method of claim 1,
wherein the at least one support structure comprises a first support structure fixed in the aft bay portion to the bottom contact surface of the interior cargo bay and a second support structure, and
wherein the method further comprises:
when loading the payload into the interior cargo bay of the cargo aircraft, moving the second support structure from a position external of the cargo aircraft into the forward bay portion of the cargo bay and securing the second support structure in the forward bay portion to the bottom contact surface of the interior cargo bay; and
when unloading the payload from the interior cargo bay, unlocking the second support structure from the bottom contact surface of the interior cargo bay in the forward bay portion and moving the second support structure out of the forward bay portion to a position external of the cargo aircraft.

10. The method of claim 1, wherein moving the payload along the curved path further comprises moving the payload through the kinked bay portion towards the aft end of the cargo aircraft such that a distal end of the payload raises relative to the longitudinal-lateral plane of the cargo aircraft.

11. The method of claim 1, wherein the payload comprises one or more components of a wind turbine such that the plurality of payload-receiving fixtures are configured to receive the one or more components of the wind turbine.

12. The method of claim 1, wherein, when loading the payload into the interior cargo bay of the cargo aircraft, advancing the payload towards the aft end of the cargo aircraft further comprises passing the payload through an opening formed by opening a nose cargo door located in the forward end of the cargo aircraft, and wherein, when unloading the payload out of the interior cargo bay of the cargo aircraft, advancing the payload towards the forward end of the cargo aircraft further comprises passing the payload to an environment outside the cargo aircraft through an opening formed by opening a nose cargo door located in the forward end of the cargo aircraft.

13. A method of loading a cargo aircraft, comprising:
translating a payload and a support structure to which the payload is removably coupled into an interior cargo bay of a cargo aircraft along a linear path;
de-coupling the payload from the support structure; and
moving the payload into an aft portion of the interior cargo bay along a curved path at least partially formed by the support structure such that as the payload proceeds in the aft direction, an aft portion of the payload approaches a bottom contact surface of the aft portion of the interior cargo bay.

14. The method of claim 13, further comprising:
securing the support structure to a bottom contact surface of a forward portion of the interior cargo bay such that the support structure is stationary within the forward portion of the cargo bay,
wherein a first portion of the curved path is formed by the support structure and a second portion of the curved path is formed by a second support structure disposed in the aft portion of the cargo bay.

15. The method of claim 14, wherein the payload comprises a plurality of payload-receiving fixtures, and moving the payload into the aft portion of the cargo bay along the curved path further comprises advancing at least one payload-receiving fixture of the plurality of payload-receiving fixtures along one or more rails of at least one of the support structure or the second support structure.

16. The method of claim 14, wherein securing the support structure to the bottom contact surface of the forward portion of the interior cargo bay further comprises securing the support structure to at least one base rail coupled to the bottom contact surface of the forward portion of the interior cargo bay.

17. The method of claim 13,
wherein the interior cargo bay further comprises a kinked bay portion disposed between the forward bay portion and the aft bay portion, the kinked bay portion defining a location at which the aft end of the cargo aircraft begins to raise relative to a longitudinal-lateral plane of the cargo aircraft, and
wherein moving the payload into the aft portion of the cargo bay further comprises moving the payload such that a portion of the payload that extends beyond the kinked portion of the cargo bay and into the aft portion of the cargo bay remains a fixed radial height above the curved path.

18. The method of claim 15, wherein the payload comprises one or more components of a wind turbine such that the plurality of payload-receiving fixtures are configured to receive the one or more components of the wind turbine.

19. A system for at least one of loading a payload onto a cargo aircraft or unloading a payload from a cargo aircraft, comprising: at least one rail disposed in an interior cargo bay of a cargo aircraft, the interior cargo bay having a forward bay portion located in a forward end of the cargo aircraft, an aft bay portion located in an aft end of the cargo aircraft, and a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, wherein the at least one rail extends from the forward bay portion, through the kinked bay portion, and into the aft bay portion, and wherein a vertical distance above which the at least one rail extends from an interior bottom contact surface of the interior cargo bay varies along a length of the at least one rail.

20. The system of claim 19, wherein the vertical distance above which the at least one rail extends from the interior bottom contact surface of the interior cargo decreases in the aft direction from the kinked bay portion to the aft bay portion.

21. The system of claim 19, further comprising:
a first support structure coupled to the bottom contact surface of the cargo bay in the forward bay portion; and
a second support structure coupled to the bottom contact surface of the cargo bay in the aft bay portion,
wherein the first support structure includes a first portion of the at least one rail and the second support structure includes a second portion of the at least one rail.

22. The system of claim 19, wherein the aft portion of the cargo bay extends at an angle relative to a forward portion of the cargo bay.

23. The system of claim 19, wherein the at least one rail comprises a plurality of linear rail segments extending at an angle relative to one another to approximate a curve.

24. The system of claim 19, wherein the at least one rail comprises at least two rails disposed approximately parallel to each other.

25. The system of claim 19, further comprising a payload configured to move along a curved path formed by the at least one rail such that an aft end of the payload is held within the aft bay portion.

26. The system of claim 25, wherein the payload is configured to move along the curved path formed by the at least one rail such that the aft end of the payload approaches the bottom contact surface in the aft bay portion.

27. The system of claim 25, wherein the payload comprises a plurality of payload-receiving fixtures configured to couple to the at least one rail such that the plurality of payload-receiving fixtures are configured to translate along a length of the at least one rail.

28. The system of claim 27, wherein the payload further comprises one or more components of a wind turbine such that the plurality of payload-receiving fixtures are configured to receive the one or more components of the wind turbine.

29. The system of claim 19, wherein a terminal end of the at least one rail is disposed in the aft bay portion.

30. The system of claim 19, further comprising:
a cargo nose door configured to open a portion of the forward end of the cargo aircraft such that a terminal end of the at least one rail disposed in the forward bay portion is accessible from an outside environment when the cargo nose door is open.

* * * * *